(12) United States Patent
Bishop et al.

(10) Patent No.: US 11,834,125 B2
(45) Date of Patent: Dec. 5, 2023

(54) POWERED VEHICLE

(71) Applicant: Polaris Industries Inc., Medina, MN (US)

(72) Inventors: Jenika Bishop, Wyoming, MN (US); Giancarlo Battaglini, Chisago City, MN (US); James A. J. Holroyd, Stillwater, MN (US); Brett Nagel, North Branch, MN (US)

(73) Assignee: Polaris Industries Inc., Medina, MN (US)

( * ) Notice: Subject to any disclaimer, the term of this patent is extended or adjusted under 35 U.S.C. 154(b) by 248 days.

(21) Appl. No.: 17/128,837

(22) Filed: Dec. 21, 2020

(65) Prior Publication Data

US 2021/0197915 A1 Jul. 1, 2021

Related U.S. Application Data

(60) Provisional application No. 62/954,189, filed on Dec. 27, 2019.

(51) Int. Cl.
| | | |
|---|---|---|
| *B62K 5/027* | (2013.01) | |
| *B62M 11/04* | (2006.01) | |
| *F16H 61/688* | (2006.01) | |
| *B60K 6/24* | (2007.10) | |
| *B62K 5/05* | (2013.01) | |
| *B60K 6/32* | (2007.10) | |

(52) U.S. Cl.
CPC ............. *B62K 5/027* (2013.01); *B62M 11/04* (2013.01); *F16H 61/688* (2013.01); *B60K 6/24* (2013.01); *B60K 6/32* (2013.01); *B62K 5/05* (2013.01)

(58) Field of Classification Search
CPC .......... B62K 5/027; B62K 5/05; B62K 23/02; B62K 5/08; B62M 11/04; B62M 2025/006; F16H 61/688; F16H 61/0003; F16H 61/0025; F16H 63/18; F16H 63/38; F16H 59/18; F16H 59/24; F16H 59/44; F16H 59/68; F16H 2057/02008; F16H 2059/366; F16H 2061/0034; F16H 2061/308; F16H 2063/3076; F16H 61/0204; B60K 6/24; B60K 6/32; B62J 11/16; B62J 11/19; B62J 35/00; B62J 50/22; B62J 50/225
See application file for complete search history.

(56) References Cited

U.S. PATENT DOCUMENTS

| | | | |
|---|---|---|---|
| 6,145,398 A | 11/2000 | Bansbach et al. | |
| 10,906,546 B2 * | 2/2021 | Peterson | ................. F16H 61/08 |

FOREIGN PATENT DOCUMENTS

| | | | | |
|---|---|---|---|---|
| CN | 107131259 A | * | 9/2017 | ............. F16H 3/006 |
| CN | 108253118 A | * | 7/2018 | ............. B60K 17/08 |
| CN | 108253133 A | * | 7/2018 | ............. B60K 11/04 |

(Continued)

OTHER PUBLICATIONS

Canadian Office Action regarding Application No. 3,104,167, dated Jun. 13, 2022.

*Primary Examiner* — Drew J Brown
(74) *Attorney, Agent, or Firm* — Harness, Dickey & Pierce, P.L.C.

(57) ABSTRACT

A wheeled vehicle is disclosed. The wheel of the vehicle may be a powered wheeled vehicle with an engine and a transmission system. The transmission system may be used to select a gear ratio to a powered wheel of the wheeled vehicle, such as a single wheel.

12 Claims, 42 Drawing Sheets

(56) References Cited

FOREIGN PATENT DOCUMENTS

| CN | 108730501 | A | * | 11/2018 | ............... | F16H 3/14 |
| DE | 102020134677 | A1 | * | 7/2021 | | |
| WO | 2005111395 | A2 | | 11/2005 | | |

* cited by examiner

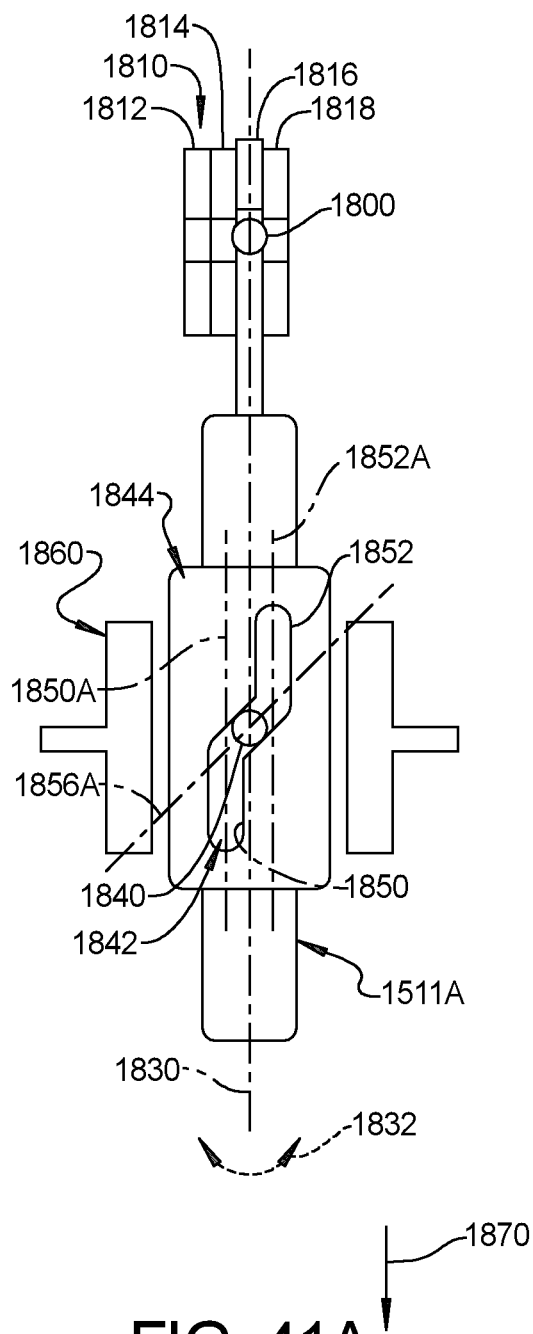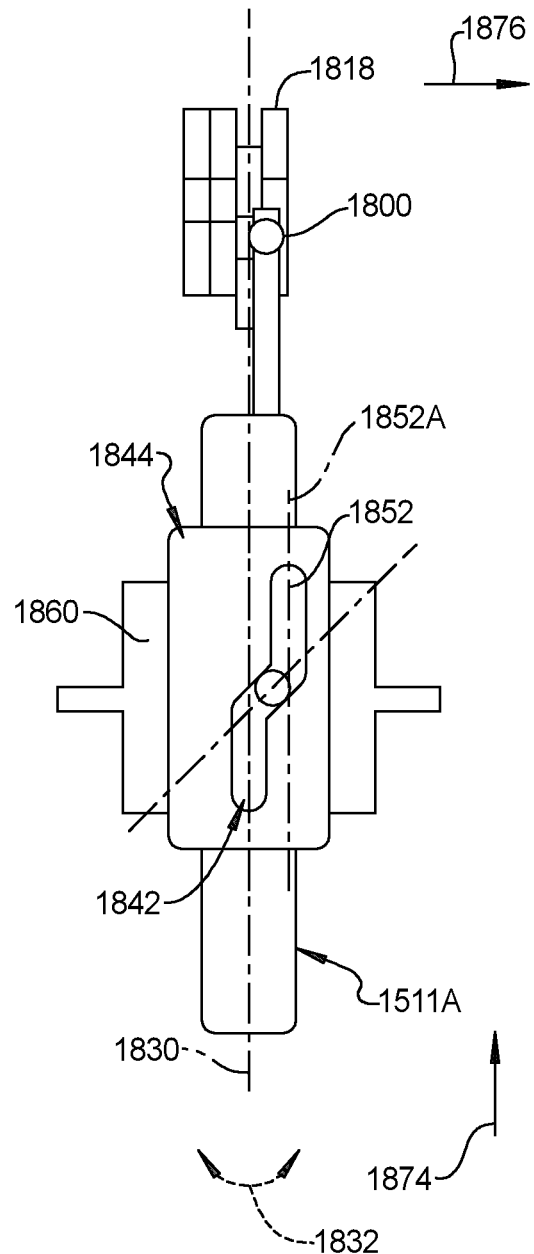

POWERED VEHICLE

CROSS-REFERENCE TO RELATED APPLICATIONS

This application claims the benefit of U.S. Provisional Application No. 62/954,189, filed on Dec. 27, 2019. This application includes subject matter related to U.S. patent application Ser. No. 17/129,020 filed on Dec. 21, 2020, now U.S. Pat. No. 11,648,997. The entire disclosure(s) of (each of) the above application(s) is (are) incorporated herein by reference.

FIELD

The subject disclosure relates to a vehicle, and particularly to a wheeled vehicle having three or fewer wheels.

BACKGROUND

This section provides background information related to the present disclosure which is not necessarily prior art.

A vehicle can include a wheeled vehicle that is powered by a selected power plant. The power plant may include a gas powered engine, in various embodiments. The vehicle may further include a selected seating arrangement that may be open or partially enclosed. Generally, a wheeled vehicle with selected interior seating may include four or more wheels. In the four or more wheels configuration, generally either forward or rearward wheel pairs are powered. The powered wheels provide the motive force for the vehicle to move as the wheels rotate relative to (e.g. touch) a ground or a travel surface.

SUMMARY

This section provides a general summary of the disclosure, and is not a comprehensive disclosure of its full scope or all of its features.

A wheeled vehicle may include a three-wheeled vehicle including a passenger compartment. A three-wheeled vehicle may include a three-wheeled vehicle or auto-cycle such as the Slingshot® vehicle sold by Polaris Industries Inc. having a place of business in Medina, Minn. The vehicle may include less than three wheels. The vehicle may further include a single rear drive wheel that is powered by an engine via a selected transmission. The drive wheel may be powered by the engine to move the vehicle based upon an input from a user, such as an operator or driver.

The vehicle, such as the three-wheel vehicle, may include a driver's position and a passenger position in a passenger or occupant compartment. The occupant compartment may be open above a seating position and an instrument panel of the vehicle with minimal enclosures upon the vehicle. Thus, the occupant compartment may be substantially open to exterior environments.

Further, the occupant compartment may include controls for operating the vehicle that may include a steering wheel to steer the vehicle, such as through a steering rack and steering shaft. The controls may further include various electronic controls for operation of various portions of the vehicle such as a navigation system, audio system, wireless communication systems (e.g. Bluetooth® radio transmission systems and/or WiFi® wireless radio transmission systems). The various electronic controls may be protected from selected external environment conditions such as rain, cold, and the like.

The passenger compartment may include a system to allow for selecting one or more gears in the transmission of the vehicle. In various embodiments, the vehicle may include an automated or automatic manual transmission (AMT). The AMT may include an AMT selector to allow for selection by the user of a gear or drive mode of the vehicle. The AMT selector may include a forward, reverse, and neutral selection for selection of gears to drive the vehicle. The AMT system may include a shifting mechanism to select a gear ratio based upon the drive or reverse selection by the user. In various embodiments, the transmission of the vehicle may include a plurality of gear ratios and that may be selected based upon various measured factors such as vehicle speed, engine speed, throttle position, combinations thereof, and/or additional measurable factors.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 41C:
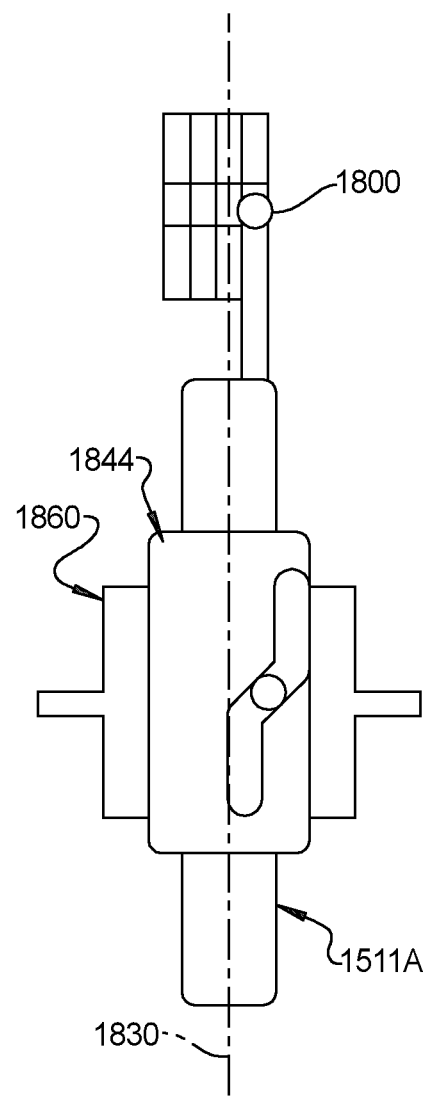
Figure 42:
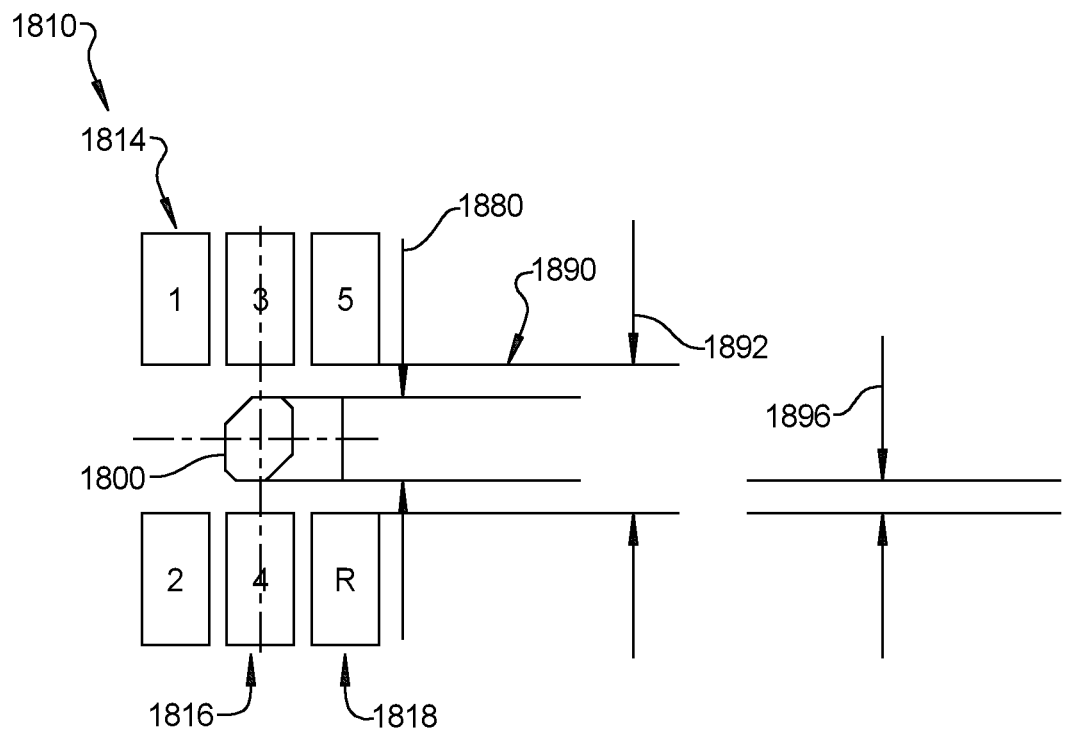
Figure 43:
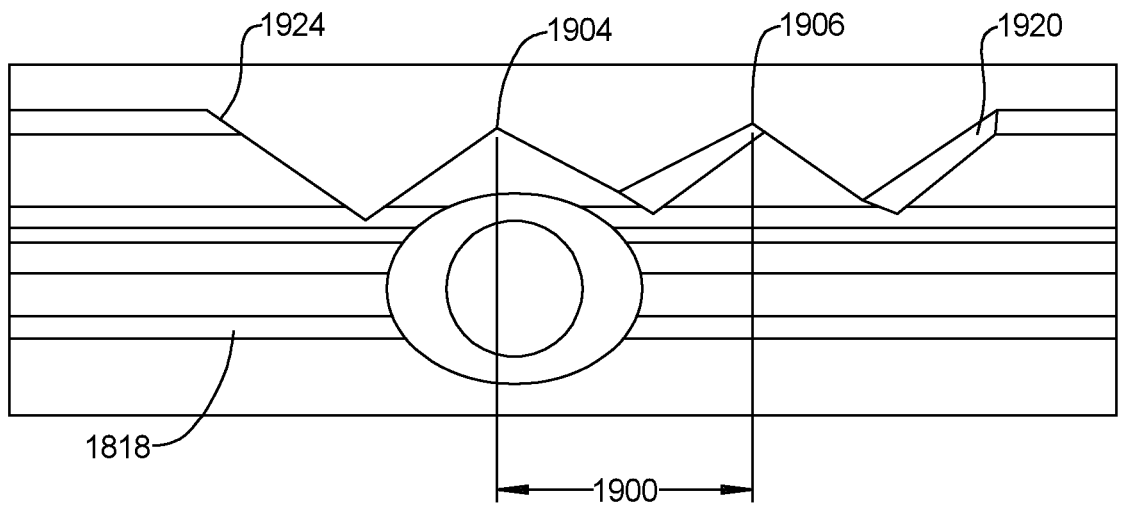
Figure 44:
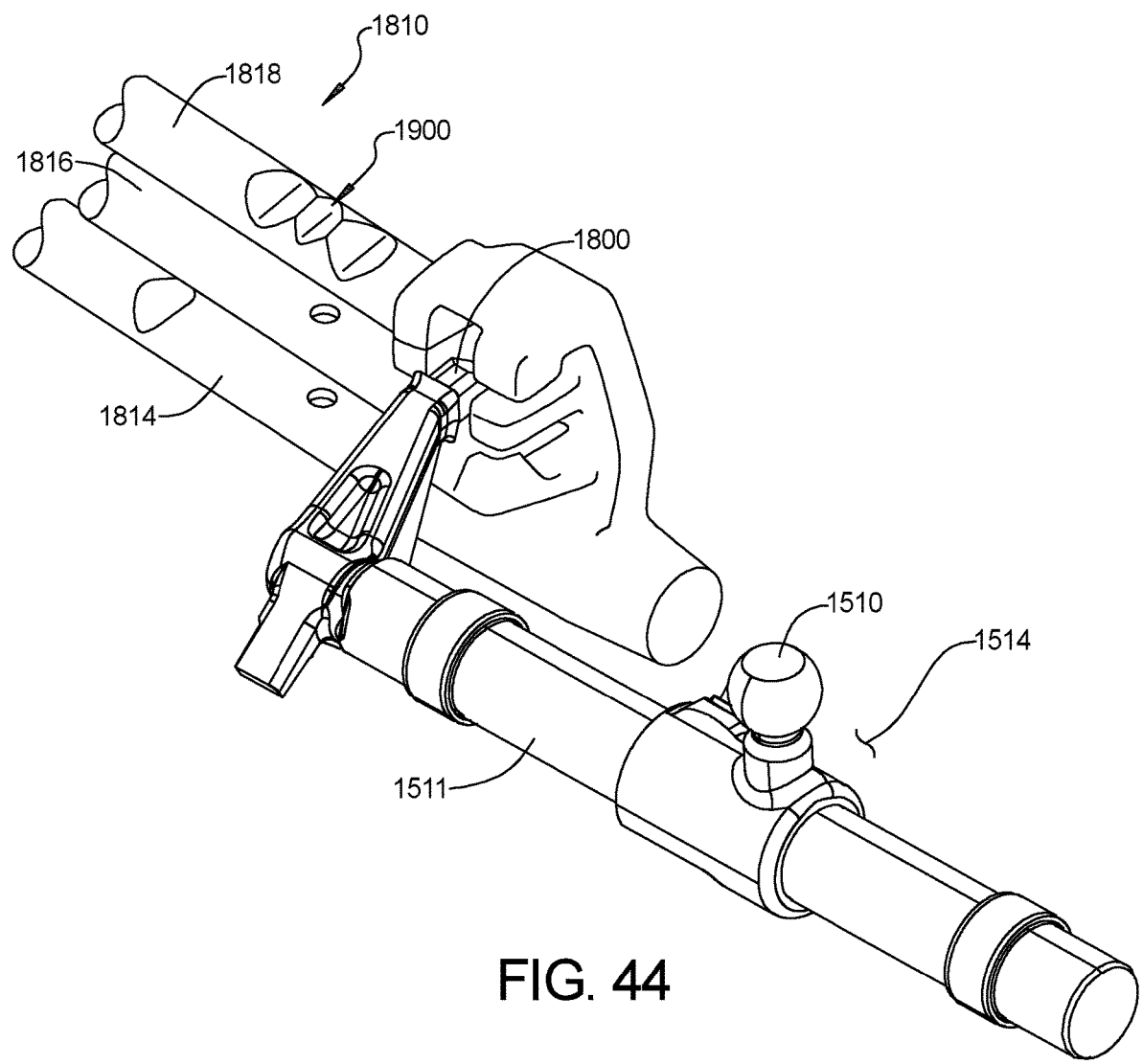
Figure 45:
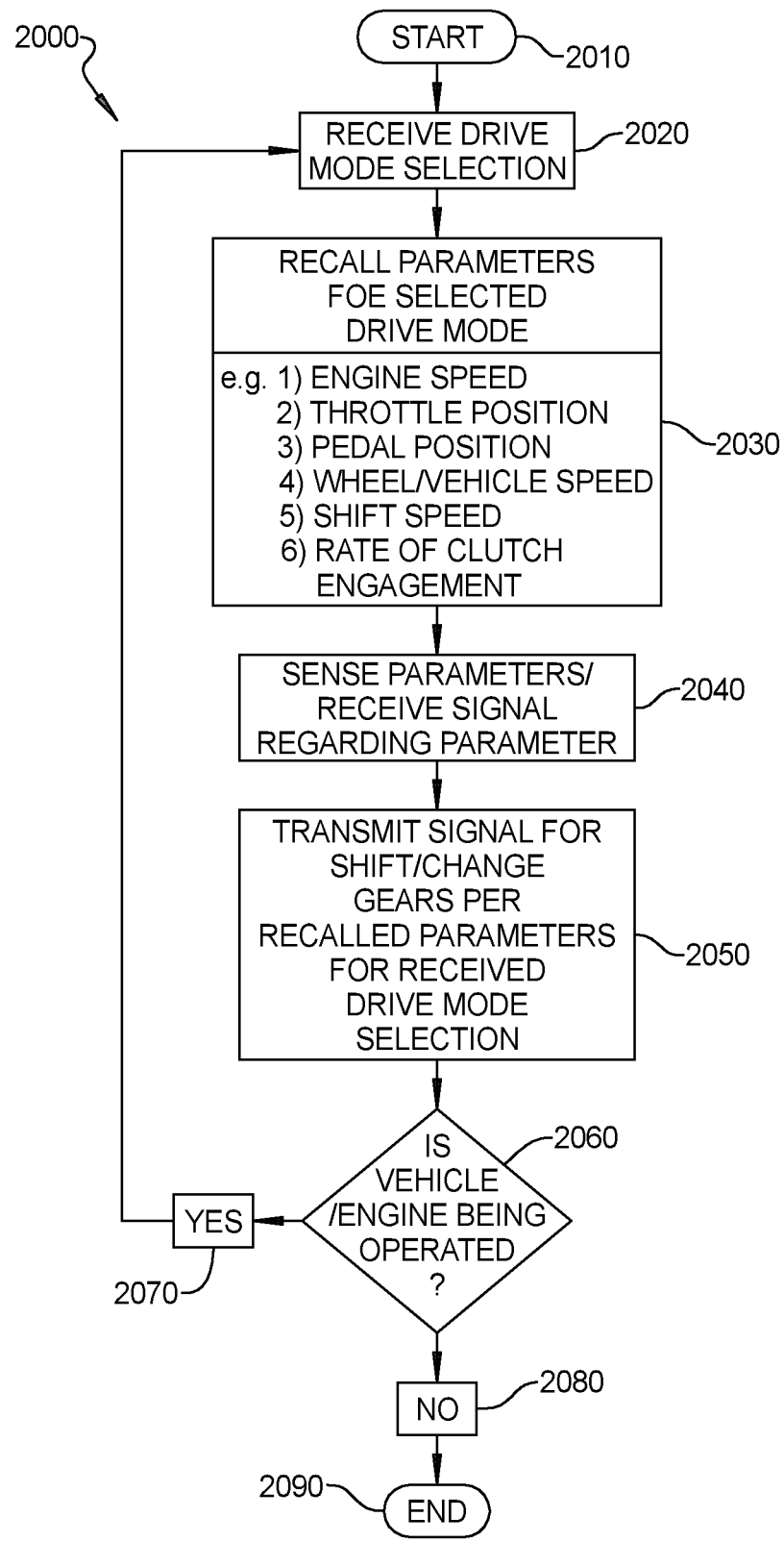

FIGS. 41A-41C illustrated movement of a shift shaft of the shifting assembly;

FIG. 42 is a schematic view of gear ranks and a shifting finger;

FIG. 43 is a schematic view of a shift shaft and neutral detents formed therein;

FIG. 44 is a schematic illustration of a portion of shift assembly in a transmission assembly; and FIG. 45 is a flow chart of a drive mode formation.

Corresponding reference numerals indicate corresponding parts throughout the several views of the drawings.

DETAILED DESCRIPTION

Example embodiments will now be described more fully with reference to the accompanying drawings.

With initial reference to FIGS. 1-5, a vehicle 30 is illustrated. The vehicle 30 may include a vehicle that includes an exterior body assembly 32 that may surround an interior or passenger compartment 34. The exterior body 32 may include portions that surround or connect with an interior frame (also referred to as a chassis), as discussed further herein. The body 32 may further include various features such as a front assembly 35 that may include a front wheel fender 36, a side panel or molding 38, and a rear assembly 40.

The interior or passenger compartment 34 may include various features such as one or more chairs or seat 42, 44 (e.g. a driver or operator seat 42 and a passage seat 44) for receiving or holding one or more occupants. Various features may be provided, such as one or more retention or comfort belts, a steering wheel 46, a steering pass-through or panel or area 50 that may include one or more instrument gages or clusters 52. Instrumentation or inputs may include a screen or changeable infotainment system or center 58. The screen 58 may include soft keys or a touch screen that may allow for input of various information by one or more occupant. Additional or selected hard buttons or toggle switches 62 may also be provided, such as in a center console or area 64. The center console 64 may also include various additional switches or selectors such as a gear shift or drive selector 70.

The drive selector 70 may be provided to allow for selection by the user of various drive selections of the vehicle 30 such as a drive or forward gear 72, a reverse gear 74, and/or a neutral gear or position 76. As discussed further herein, various gear ratios may be selected by a selector or gear shift mechanism in either the forward or drive selection or the reverse selection.

The interior 34 may also include various additional hand controls, such as one or more selector buttons assemblies 80 that may be integrated into the steering wheel 46. The button assembly 80 may include a plurality of selector buttons, such as four corner selector buttons 84 and a central selector button 88. It is understood that any appropriate number of selector buttons may be provided via the assembly 80 and that five is merely exemplary. The steering wheel 46 may include more than one selector button assembly, such as the selector button assembly 80 being a left or first selector button and a second selector button assembly 92 being a second assembly or a right hand assembly.

The vehicle 30 may include the body 32 mounted to a frame or chassis, as discussed further herein. The occupant compartment 34 may be surrounded by the body 32 and also affixed directly or indirectly to the chassis. The vehicle 30 may include an engine, as also discussed further herein, to drive a rear wheel 100. The rear wheel 100 may be driven by the engine through a selected drive train or drive line including a transmission and selected final drive such as a chain or belt drive 1012. In various embodiments, it is understood that the final drive may also be a shaft or ridged drive. The vehicle 30 may further include forward or front wheels, such as a first front wheel 104 and a second front wheel 108. The front wheels 104, 108 may be unpowered such that the rear wheel 100 is the only drive or power wheel for the vehicle 30. Thus, the vehicle 30 may be a single powered or drive wheel vehicle. The front wheels 104, 108 may be turned to drive or direct the vehicle 30, such as through the steering wheel 46. A selected steering assembly may interconnect to the steering wheel 46 with the front wheels 104, 108 to steer and direct the vehicle 30 during motion.

Various suspension and connection components may be provided between the respective wheels 100, 104, 108 and the chassis or frame of the vehicle 30. Thus, the vehicle 30 may be a wheeled vehicle including three wheels. The three wheels of the vehicle 30 may include the single rear drive wheel 100 and two forward steering wheels 104, 108. The vehicle 30 may include seating for one driver and one passenger within the body 32 in the passenger compartment or area 34.

Figure 1:
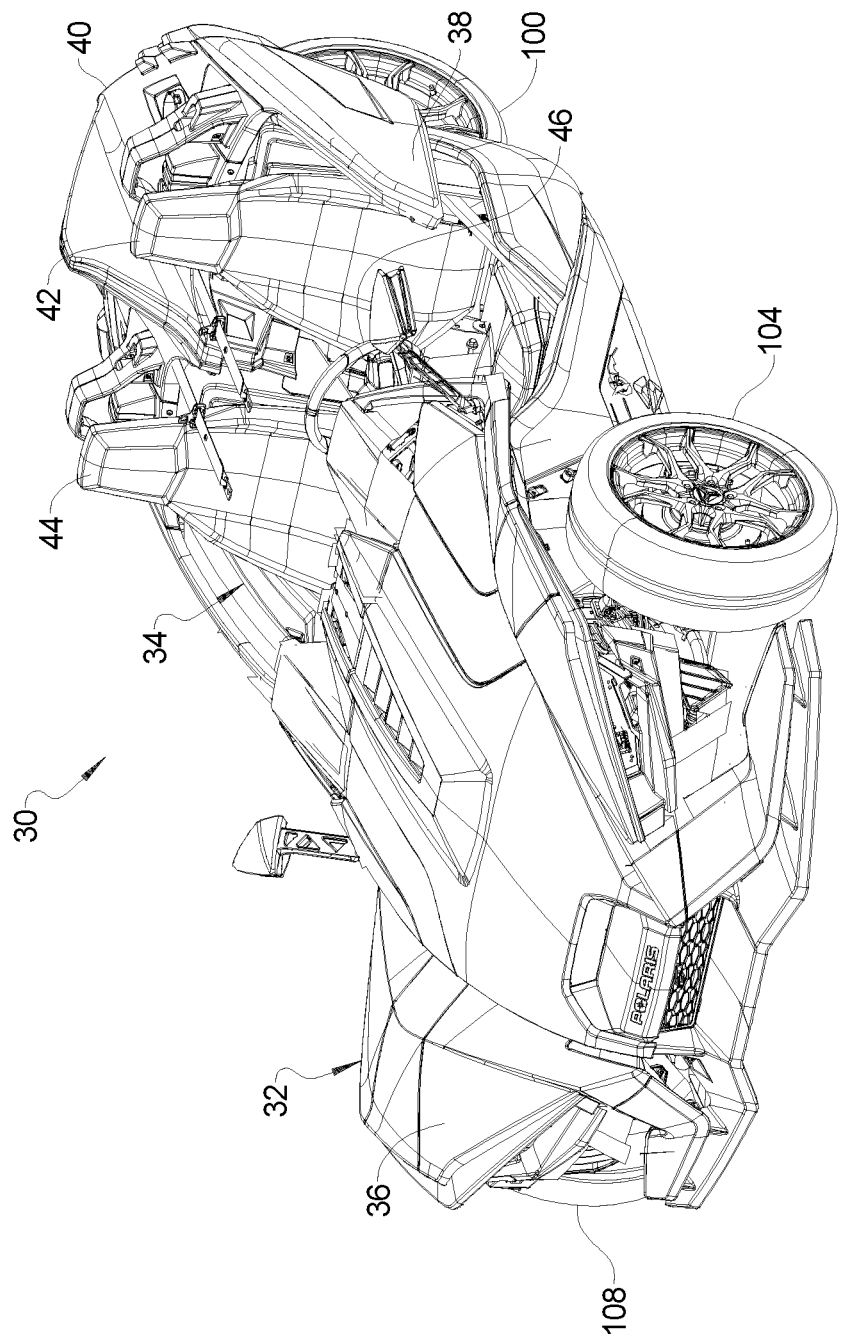
FIG. 1 is a front perspective view of a vehicle, accordingly to various embodiments.
Figure 2:
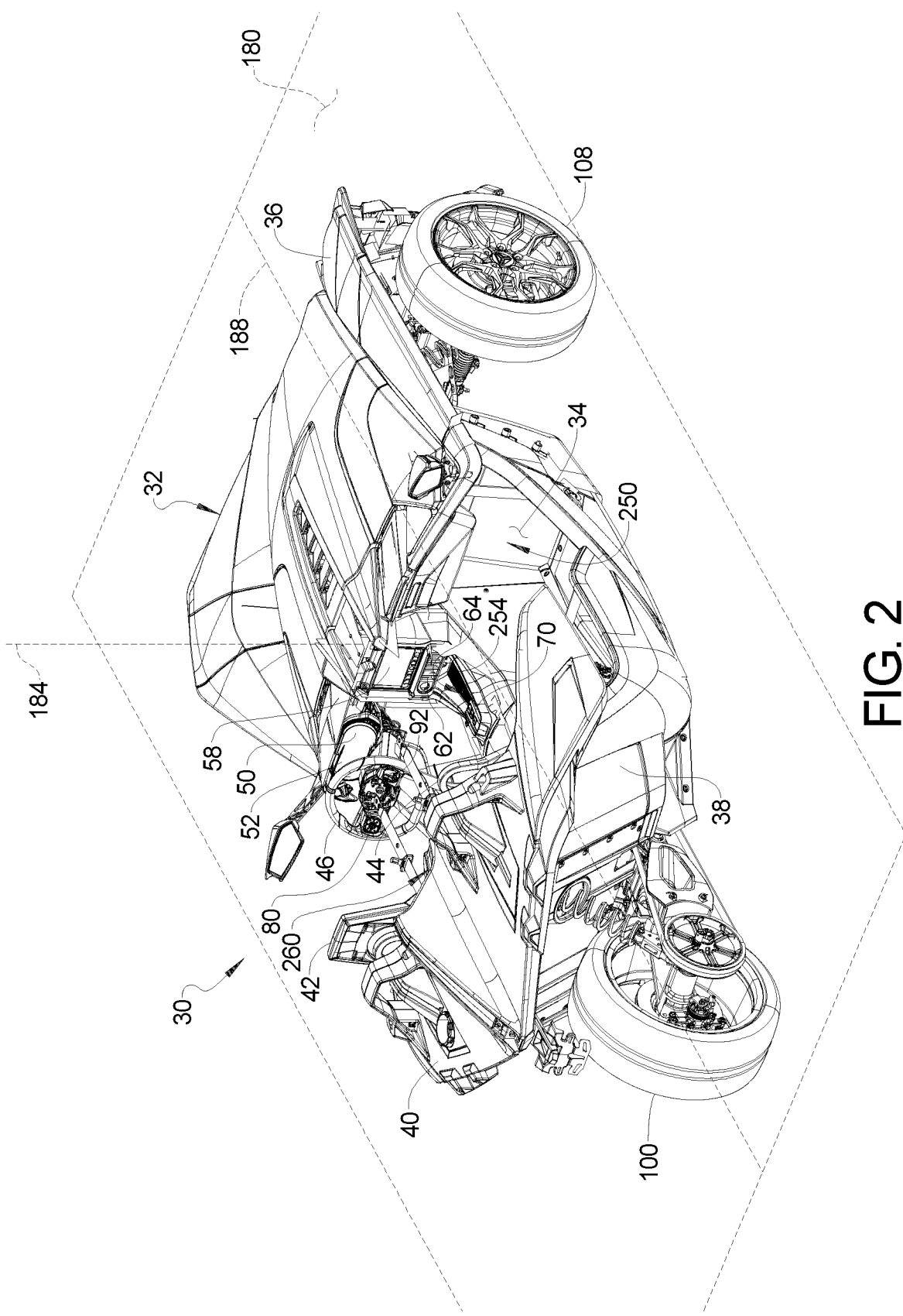
FIG. 2 is a rear top perspective view of the vehicle of FIG. 1.
Figure 3:
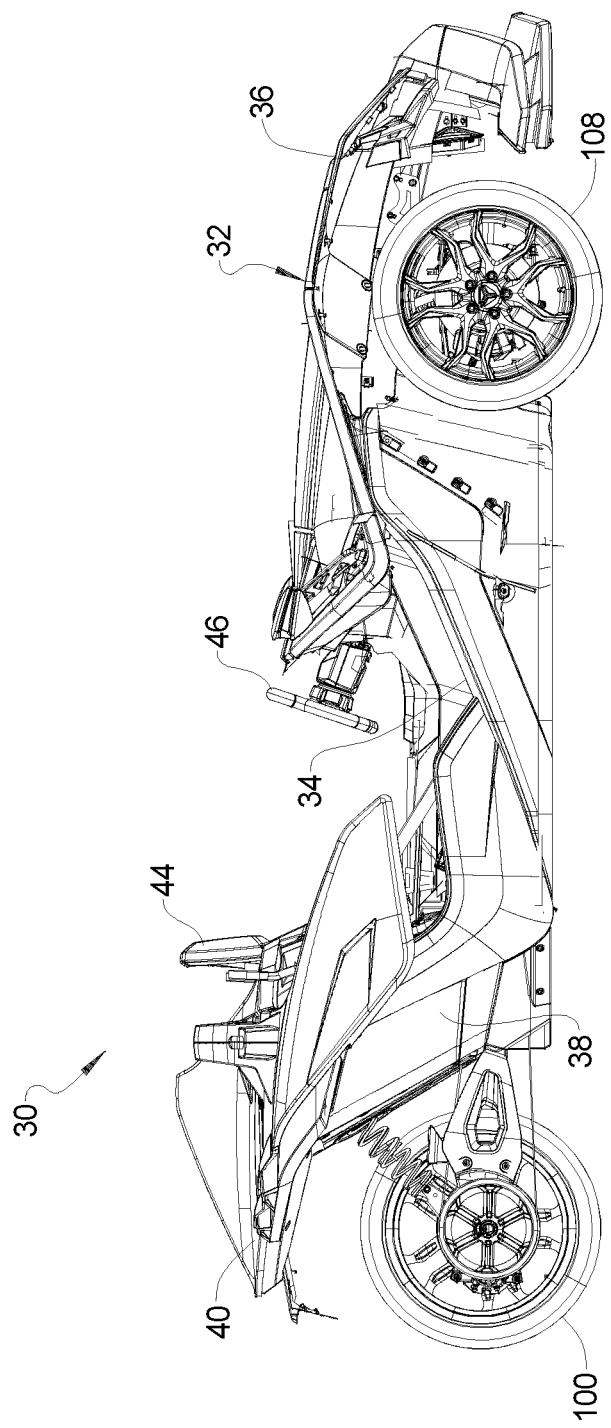
FIG. 3 is a side plan view of the vehicle of FIG. 1.
Figure 4:
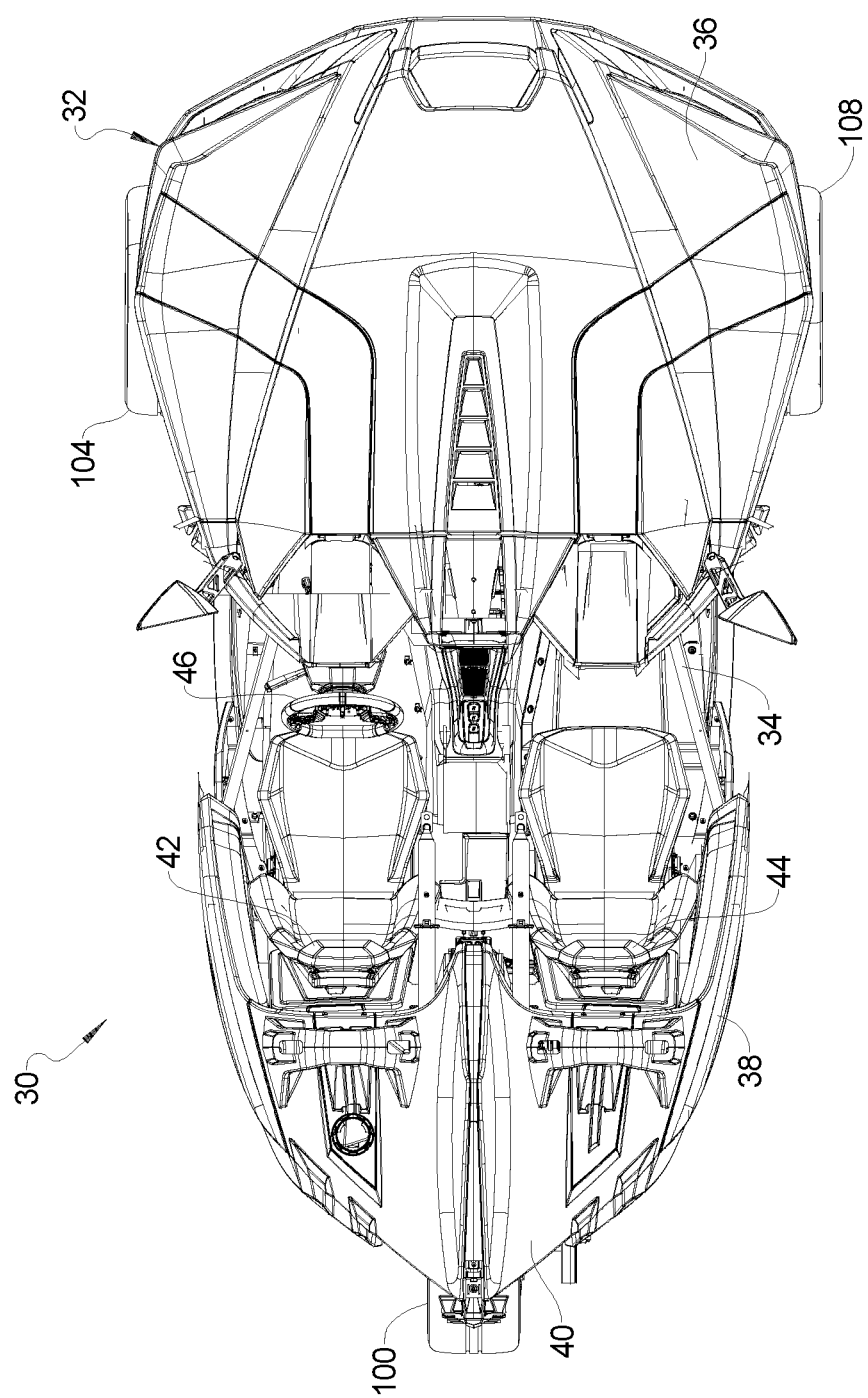
FIG. 4 is a top plan view of the vehicle of FIG. 1.
Figure 5:
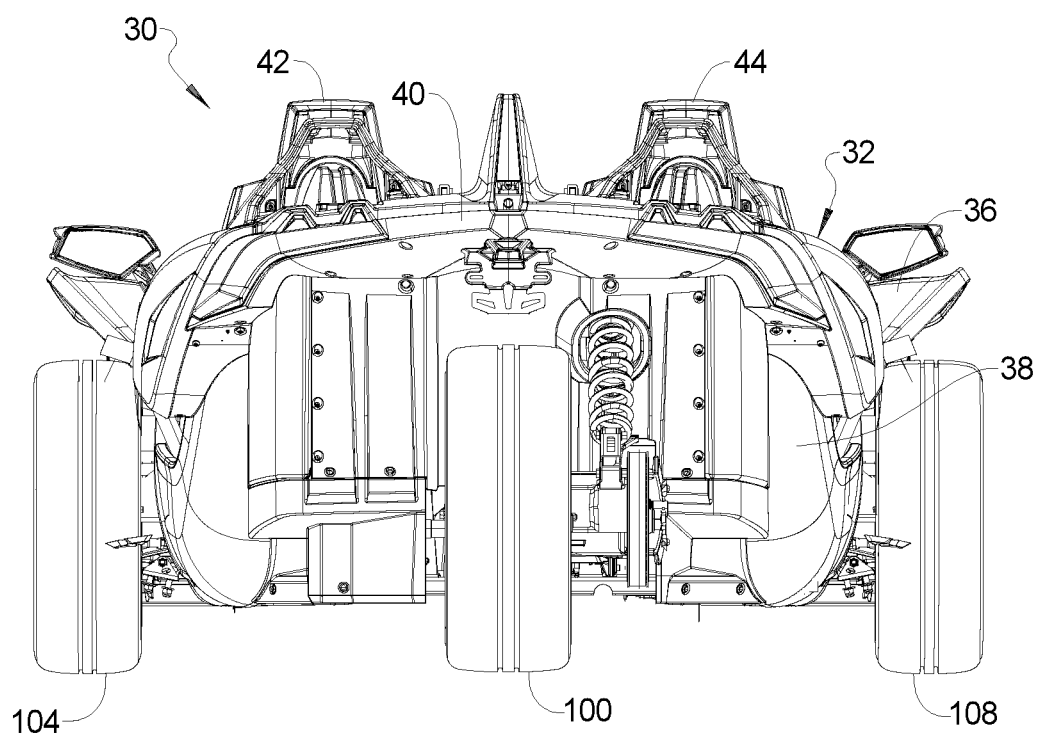
FIG. 5 is a rear elevation view of the vehicle of FIG. 1.
Figure 6:
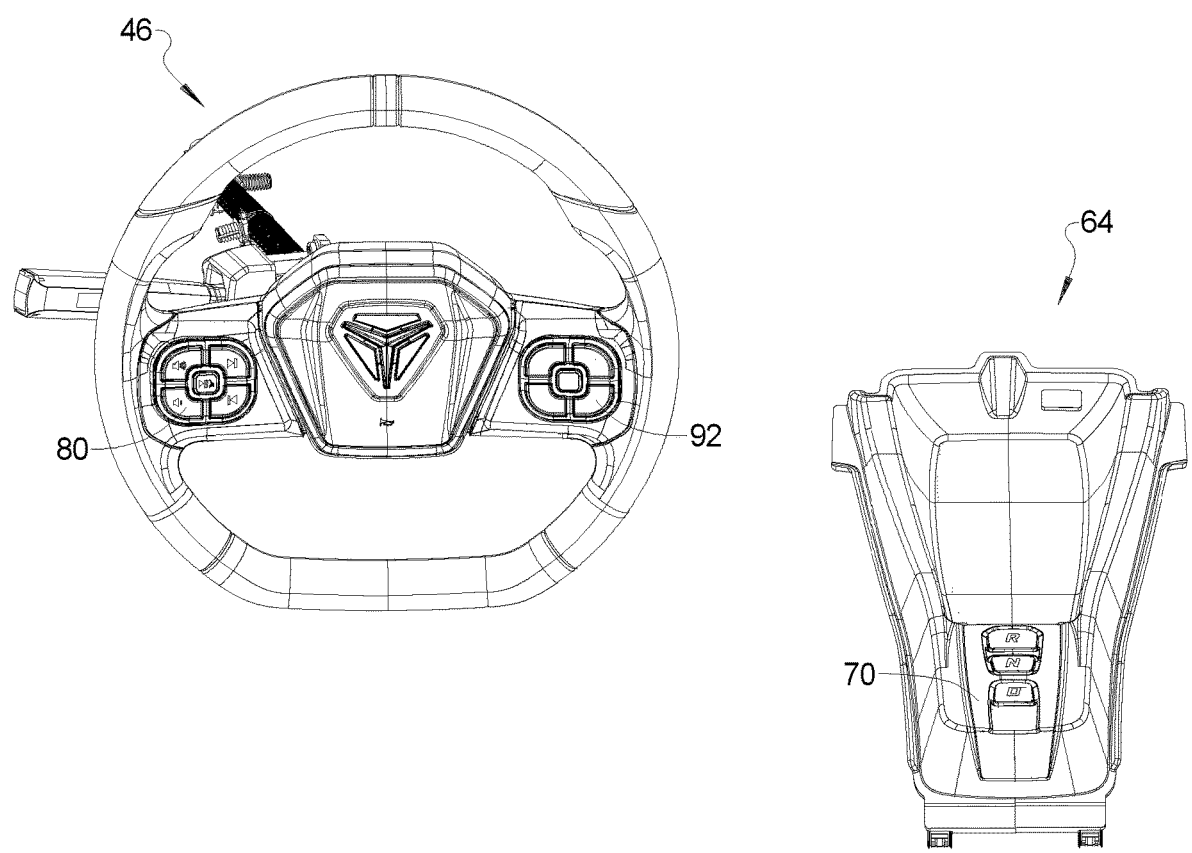
FIG. 6 is a detailed view of a steering wheel and a gear selector.
Figure 7:
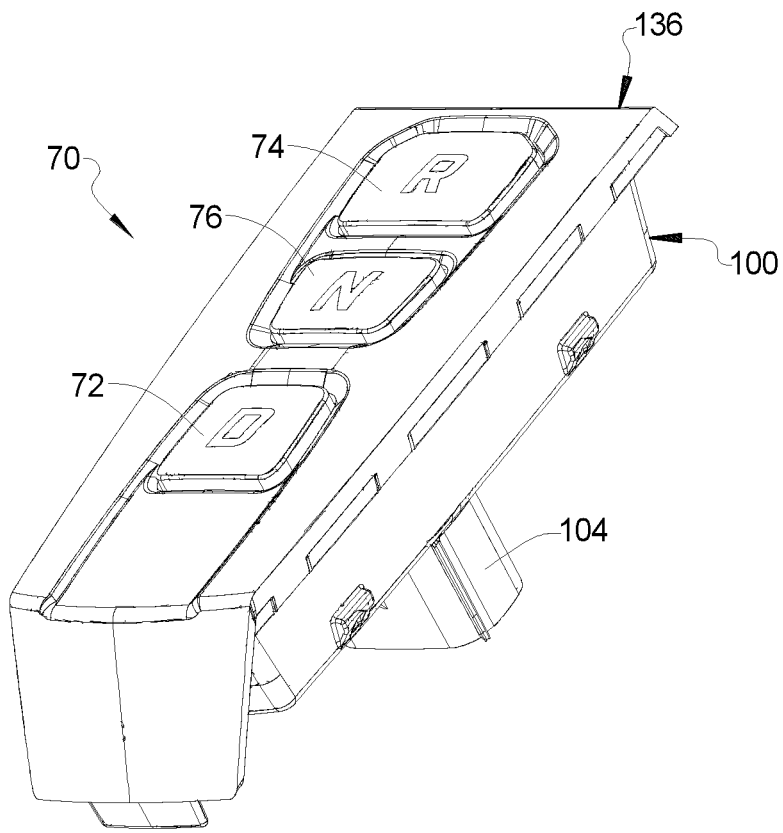
FIG. 7 is a detailed view of the gear selector.

The center console 64 including the selected selectors (e.g. buttons or switches) 70 allows for a substantially water resistant and/or water tight seal of the selector button 70 relative to an influx of moisture or rain. As illustrated in FIG. 1, for example, the passenger compartment 34 of the vehicle 30 may be substantially open. Accordingly fluid, such as water (e.g. rain water) may enter the passenger compartment 34. Accordingly, the selector switches 70 may be covered with a selected waterproof or water resistant material such as a silicone material or other watertight (e.g. rubberized polymer) material.

Figure 9:
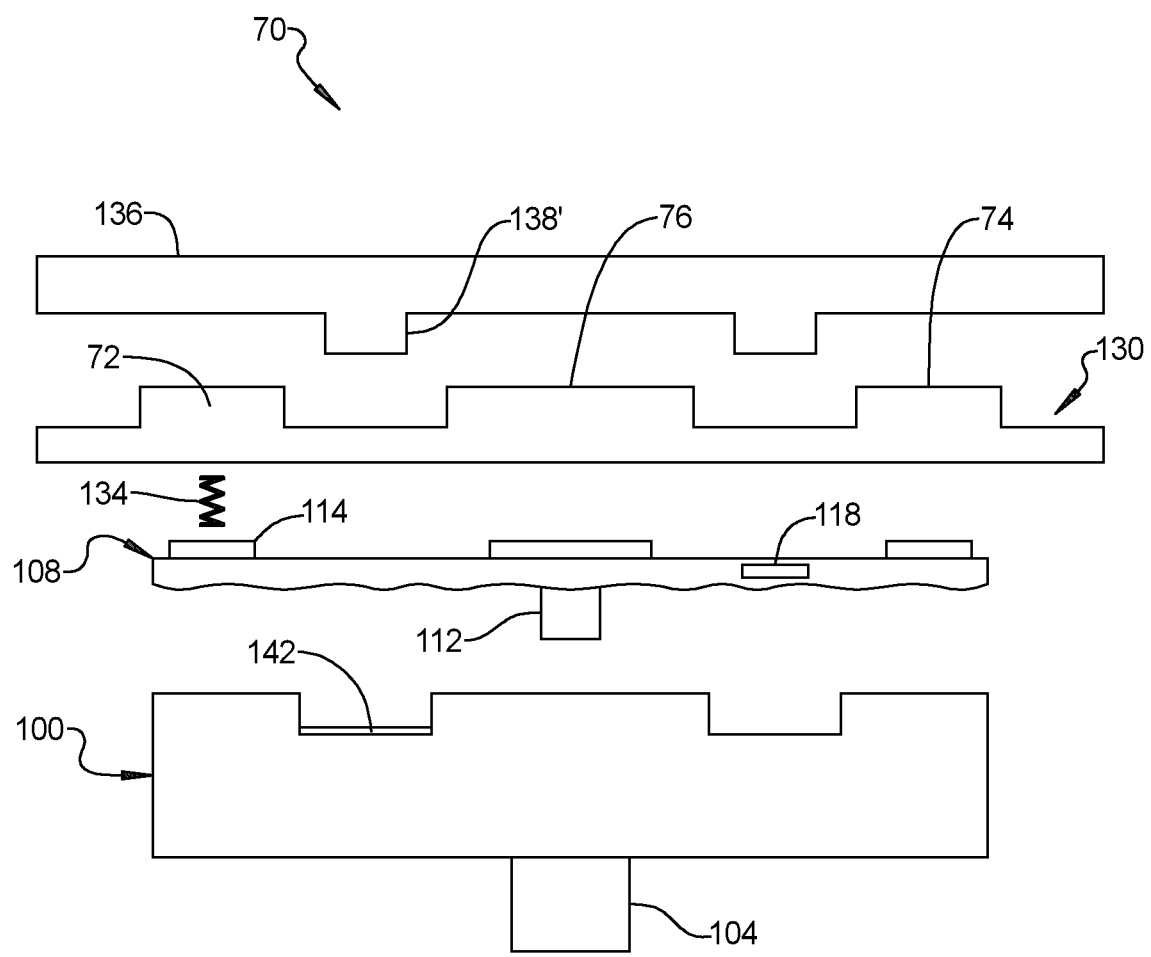
FIG. 9 is an exploded view of the gear selector assembly.

In various embodiments, such as illustrated in FIG. 9, the selector assembly 70 may include a base or tub portion 100 that may include a connector holder or opening 104. The tub or base portion 100 may receive an electronics component 108 that may have a connector 112 extending therefrom that may be received in or cooperate with the connector portion 104. The electronics component 108 may include a transmission and/or receiving portion to communicate selections (e.g. transmit or receive a signal) by the user via the selector buttons 72, 76, 74 for operation of the vehicle 30. In various embodiments, for example, the button 72 is a drive selector button, the button 74 is a reverse selector button, and the button 76 is a neutral selector button.

The user may press on the selected button 72, 74, 76 which may compress or operate portions of the electronics package 108. In various embodiments, for example, selected switches may be provided on the electronics package 108, for example, a switch 114 that may be contacted by a selected portion of the button 72 (e.g. a magnet, a metal portion to complete a circuit, etc.). Thus, the electronics component 108 may receive a selection via the input button 72 to transmit a signal based on the selection made by the user. The electronics component 108 may include a selected processor portion 118 that may transmit the signal based upon a selected instruction, such as receiving a speed from an engine control unit (ECU), or other appropriate configuration. It is understood, however, that the electronics component 108 may only transmit a signal from the respective buttons 72-76 and not include a processing portion therein.

The button portions 72-76, however, may be incorporated into and/or include a protective covering or seal portion 130. The protective portion 130 may include a selected material, such as a waterproof or water resistant material, such as a silicone cover. The protective cover 130 may be substantially flexible to allow for pressing of the selected buttons 72-76 and returning to a selected or unpressed configuration. Further, the buttons 72-76, covered by the cover 130, may be biased in a selected position by a biasing member or portion 134 which may include a spring or biasing portion. The biasing portion 134, therefore, may be depressed by the user when the user pushes the button (e.g. button 72) to activate the switch portion 114 on the electronic component 108. The protective cover 130, however, may protect the electronics component 108 from damaging materials, such as liquid including water.

The selector assembly 70 may be encapsulated or at least covered by a top component 136. The top component 136 may include one or more latch portions 138 that may engage or cooperate with a respective latch portion 142 and the base portion 100. Thus, the top portion 136 may latch to the base portion 100 with the respective latch portions 138, 142. The top portion 136, therefore, may compress or seal the sealing portion 130 relative to the electronics component 108 and/or the base 100. In this manner, the selector assembly 70 may be substantially formed in a configuration that allows for sealing of the components (e.g. the electronic components 108) from an external environment. The selector assembly 70, including the electronics components 108, may therefore be provided in a "user friendly" configuration for the user while limiting and/or eliminating influx of an environment into the electronic component 108.

Figure 8:
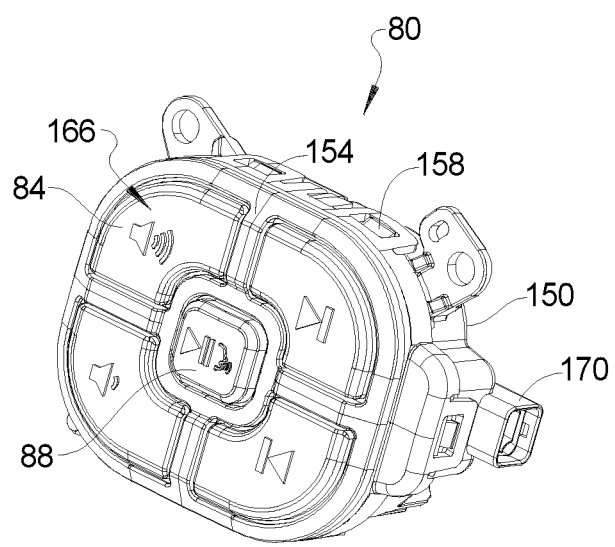
FIG. 8 is a detailed view of a steering wheel selector assembly.

Other control portions within the vehicle 30 may include a similar or equivalent configuration. For example, the switch components on the steering wheel 46, such as the switch components 80 and/or the switch components 92, may include a similar configuration. The switch component 80, as illustrated in FIG. 8, may include a base portion 150 and a top portion 154. The base portion 150 may include a first latch portion 158 (e.g. a projection) and a top portion 154 may include a second latch component 162 (e.g. a tab or hook) to engage the projection 158. Thus, the top portion 154 may be engaged to the base portion 150. Engagement of the top portion 154 to the base portion 150 may compress and/or seal a sealing portion 166 between the top portion 154 and the base portion 150. The sealing portion 166 may be similar to the sealing portion 130 of the selector assembly 70. The sealing portion 166 may cover or encapsulate various portions such as selector buttons 84, 88 to ensure an environmental seal (e.g. water tight or water resistant seal) relative to an electronics component between or within the base 150 and the top 154.

The steering wheel selector assembly 80 may have a connector 170 to connect with selected electrical components, as discussed further herein, but may be substantially water sealed or water tight based upon the top 154 and the base 150 and the selected sealing component 166. Thus, the electrical components within the passenger portion 34 may be substantially sealed relative to the external environment based upon the components and construction of the selector assemblies, as discussed above.

The display screen 58 in the center console 64 may be provided within the passenger assembly or compartment 34 for use by the operator or driver of the vehicle, such as the user seated in the driver or operator seat 42. In various embodiments, therefore, the display screen 58 may include an angle or orientation relative to a surface, such as a road surface 180 that may be substantially perpendicular or along a perpendicular axis 184. In various embodiments, the screen 58 may also be angled toward the driver seat 42 such as in an angle less than 90 degrees relative to the road surface or support surface 180 of the vehicle 30.

The vehicle 30 may include a longitudinal axis 188 that may be substantially parallel with the road surface 180. The screen 58 and/or portions of the center console 64, may also be angled toward the driver or operator seat 42 relative to the central or longitudinal axis 188 of the vehicle 30. Thus, the screen 58 may be angled relative to the driving user 42 in a manner to reduce or eliminate glare or reflection due to light entering the passenger compartment 34 generally along the perpendicular axis 184 relative to the surface 180. As discussed above the screen 58 may include various soft buttons that may be operated by the user 42. A reduction of glare or interference relative to the screen 58 may assist in operation of the vehicle 30 by the user seated in the driver or operator seat 42.

The interior or passenger compartment 34 may include various features or constructs, including the gear selection controls 70, hard button controls 62, and the display or screen 58. As discussed above, the screen or display 58 may be mounted to provide a clear view to the user or driver in the driver or operator seat or position 42 by including a selected angle or a declination, as discussed above. With reference to FIGS. 1-4, the passenger compartment may include various features or elements such as a foot well or under console portion 250, a front or under display storage area 254. Further, a between seat or inter seat console assembly 260 is included.

Figure 10:
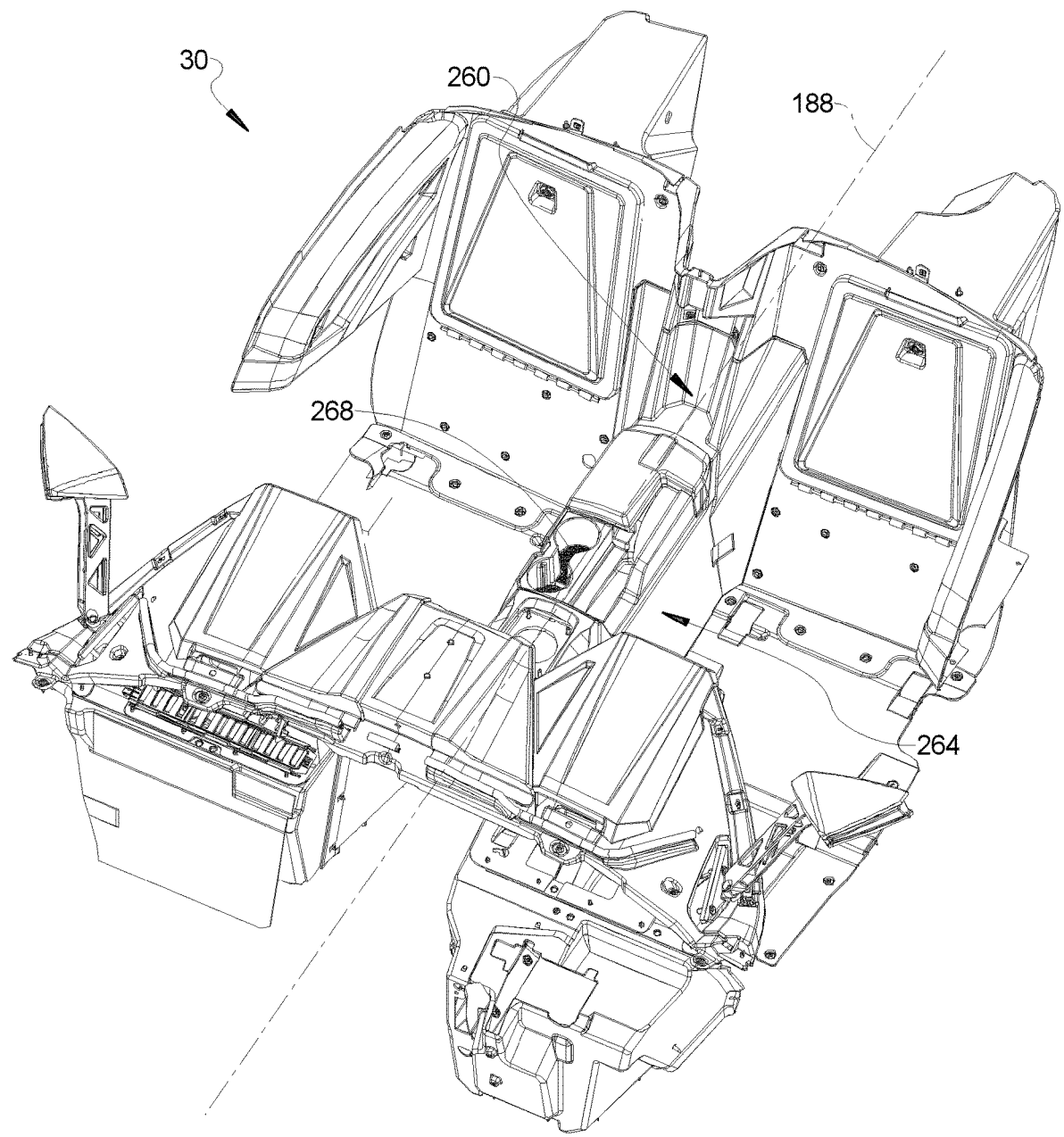
FIG. 10 is a front prospective view of an interior of the vehicle.
Figure 11:
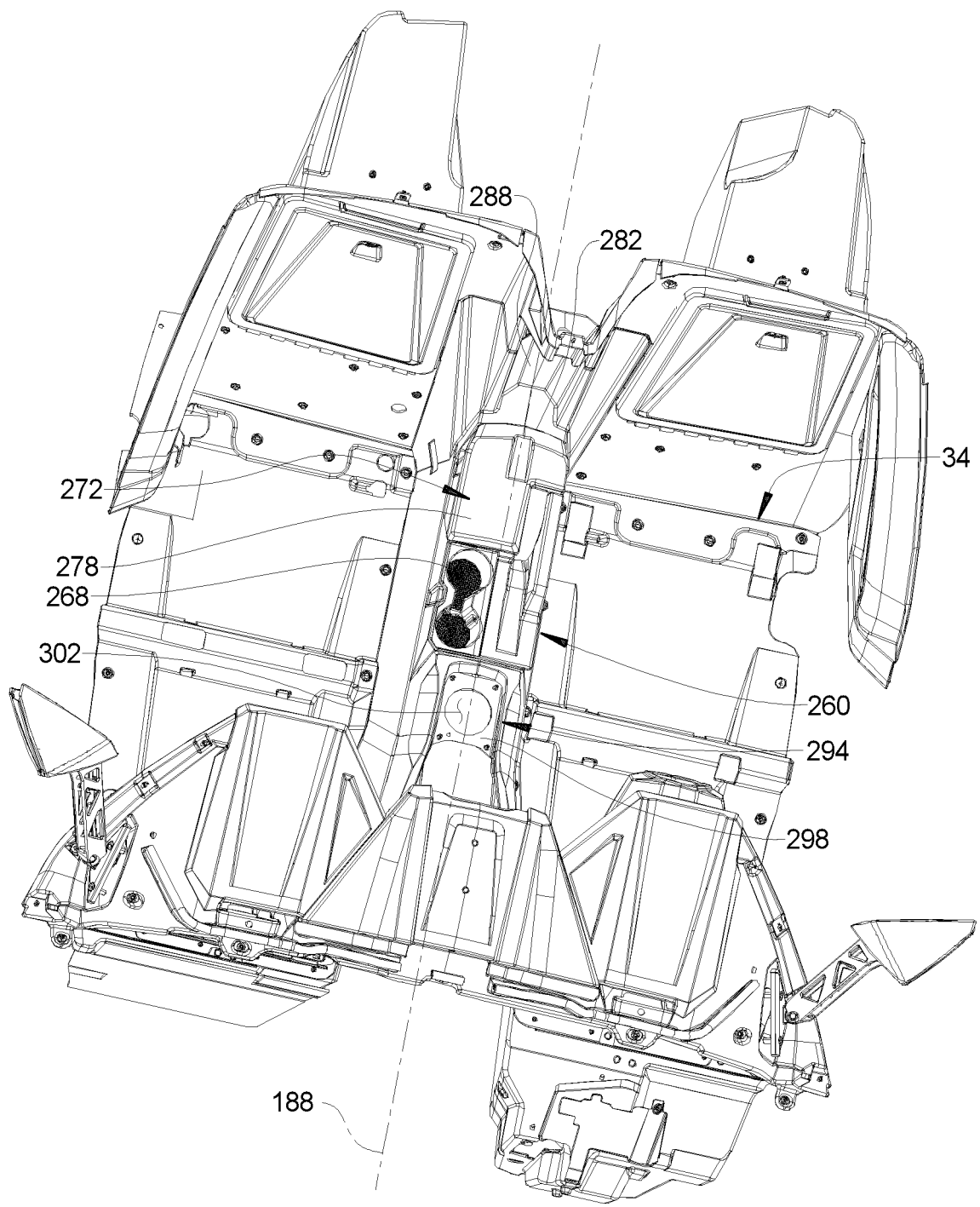
FIG. 11 is a top view of the interior of the vehicle.
Figure 12:
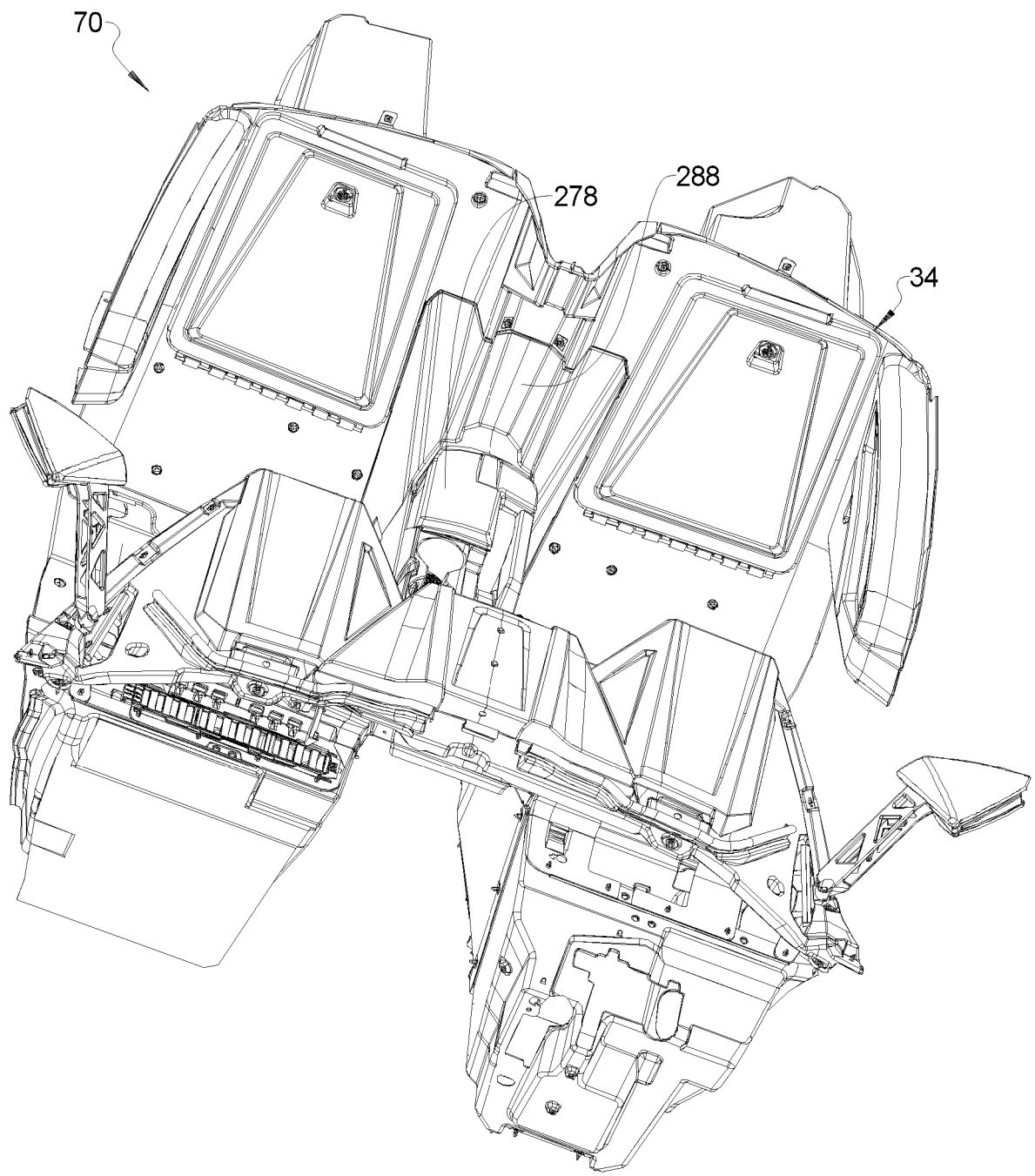
FIG. 12 is a front perspective view of the vehicle.

Turning reference to FIGS. 10-12, the center console assembly portion 260 may include various features. For example, a central or lower central console portion 264 may include one or more storage options such as a cup holder 268. The cup holder 268 may extend along or to the side of the central axis 188 of the vehicle 30. As illustrated in FIG. 10 and FIG. 11, the cup holder 268 may be generally or substantially toward or on a passenger side relative to the mid or central line 188 of the vehicle 30. The cup holder 268 may allow for positioning of communication or transmission lines, as discussed further herein, relative to the rear 40 of the vehicle and the forward portion 32. Various transmission lines may include electronic transmission lines, fuel lines, and the like.

Additionally the center console portion 260 may include a covered storage volume or area 272. The covered storage volume area 272 may include a latchable and lockable lid 278. The lid 278 may be hinged at a selected portion, such as at a rearward portion, to include a rear hinge assembly 282. Thus, the lid 278 may lid or rotate toward the rear 40 of the vehicle 30 when unlatched from a forward portion. Additionally, between the seats 42, 44 may be a rear storage compartment 288. The rear store compartment 288 may allow for storage of selected elements such as a helmet, hat, or other items. The rear storage compartment 288 may have a volume that is adapted or designed to retain a selected or identified element, such as a helmet.

The central console portion 260 may further include a gear selector area 294. The gear selector area 294 may be adapted to include an insert 298. The insert 298 may have an opening or bore 302 to allow for passage of a shift lever. The shift lever may be used with a manual transmission to operate a manual transmission of the vehicle 30 during operation of the vehicle 30. The manual transmission gear shift lever may be used with a manual transmission and may pass through an area is occupied by the gear selectors 70 when the gear selector 70 is not present for an AMT. Accordingly, the selector area 294 may also be sized to receive the gear selector portion 70 for AMT of the vehicle 30. The gear selector area 294 may be sized and provided to allow for passage of the manual gear selector and/or positioning of automatic gear selectors and select indication lines (e.g. electronic components).

Accordingly the passenger compartment 34 may include various features and elements, as discussed above, including storage compartments and passages for selected controls such as the display 58, the hard switch selectors 64, and a gear selector whether a manual gear selector or automatic gear selector.

Figure 13:
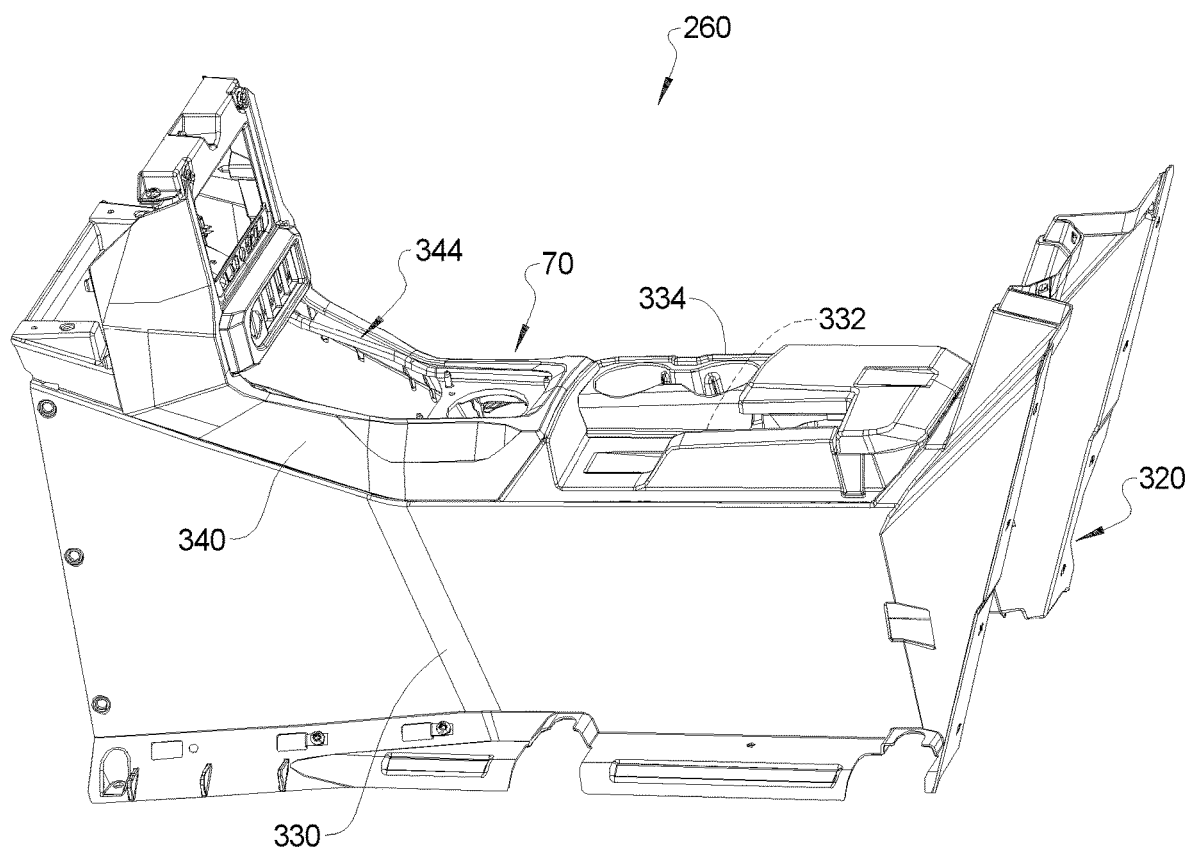
FIG. 13 is a detailed view of a central console of the vehicle.
Figure 14:
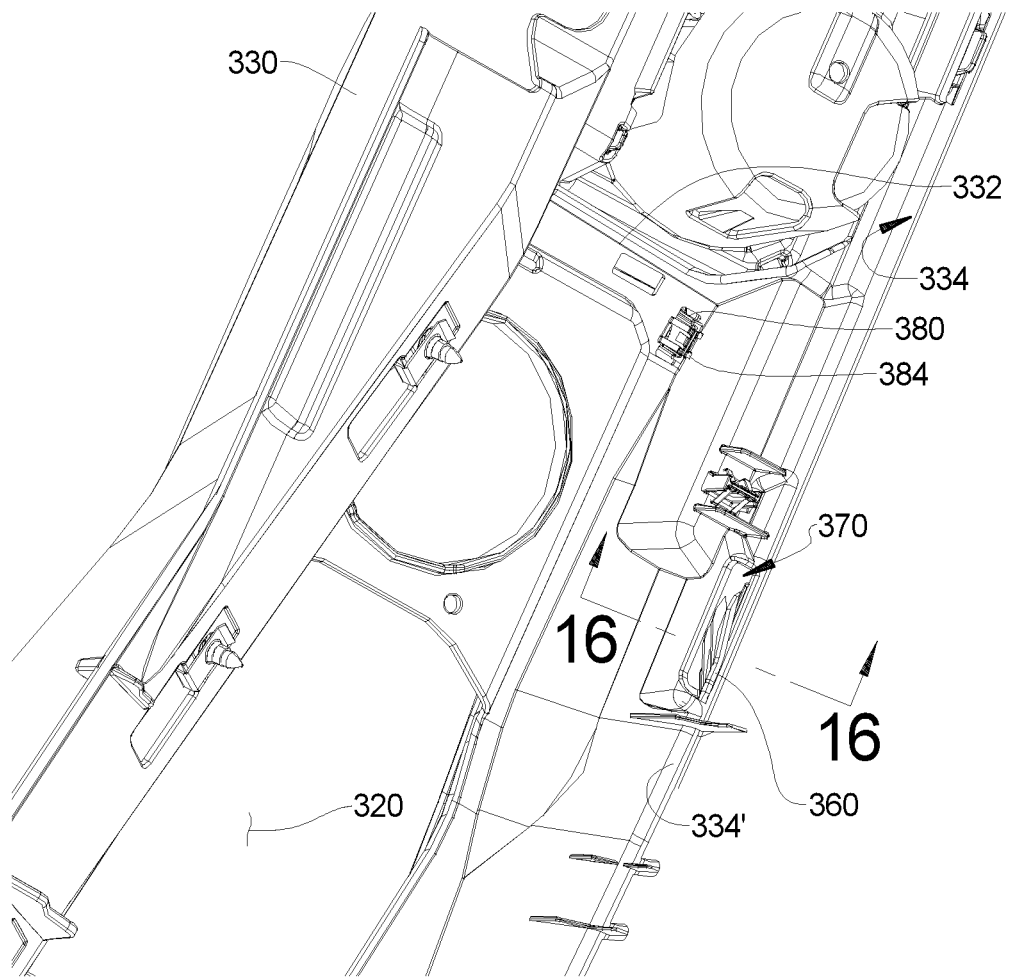
FIG. 14 is a bottom view of the center console of the vehicle.
Figure 15:
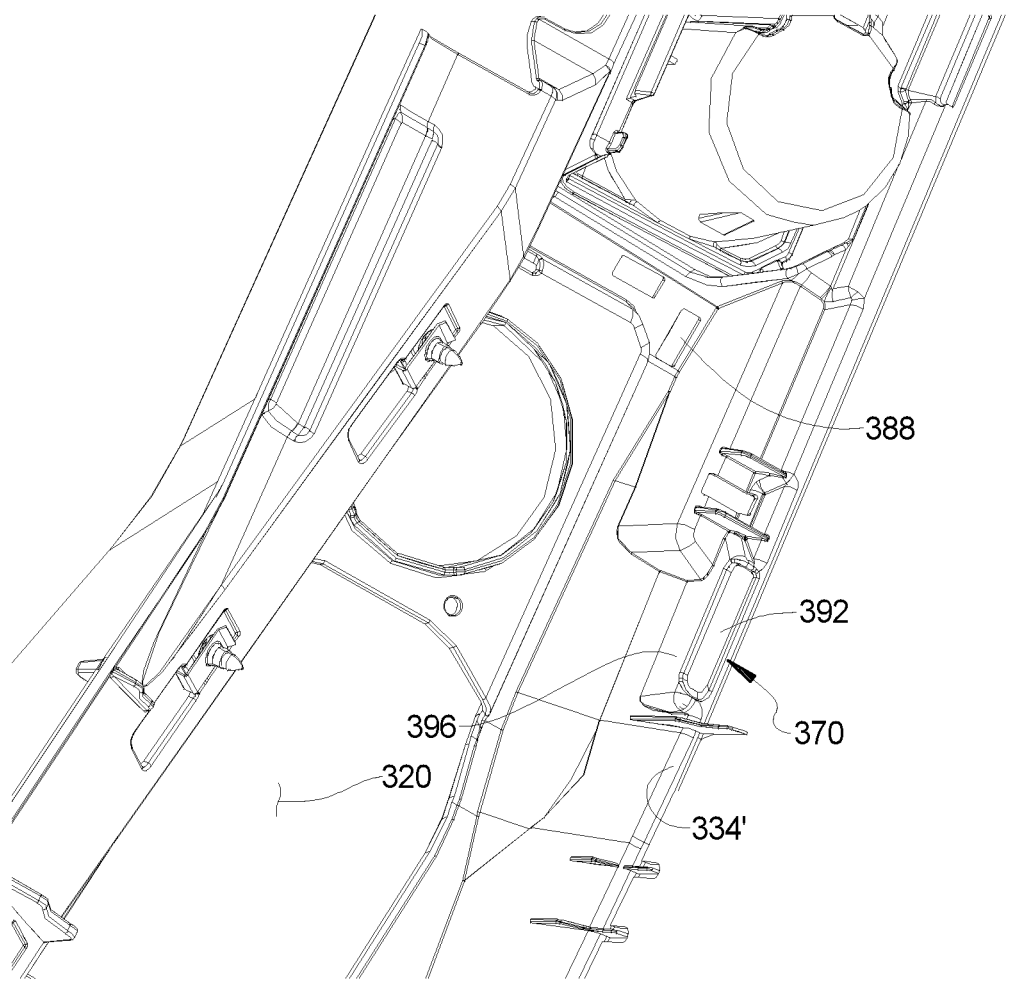
FIG. 15 is a bottom view of the center console in a disassembled configuration.

The center console portion 260, as discussed above, includes various portions including storage features, covers or containment features, and the like. The central console 260, however, also forms a tunnel 320, as illustrated in FIGS. 10-12. The tunnel 320, is also illustrated in FIGS. 13-15. The tunnel 320 may be formed by one or more members that may be interconnected. In various embodiments, for example, the tunnel 320 may be formed by an outer or passenger compartment member 330. The outer member or panel 330 may be on a right or left side of the vehicle and a similar or mirrored panel 334 may be provided on the other side of the vehicle. In various embodiments, however, it is understood that the outside panels 330, 334 may also be formed as a single member and integrated into the vehicle 30.

With continuing reference to FIGS. 13-15, the outer panel 330, 334 may be connected to or have mounted thereto a top or center console panel 340. The center console panel 340 may engage the side panels 330, 334 in a selected connection mechanism, as discussed further herein. In various embodiments, therefore, the center console panel 340 may be removed from the vehicle. Additionally various additional panels 344 may be interconnected with the central panel 340. As discussed above, the gear selector switches 70 may be provided to be accessed by the user when operating the vehicle 30. The gear selector switches 70 may be integrated into one or more of the panels, such as the center console panel 340, the additional panel 344. Thus, accessing components within the tunnel 320 may be done by removing the panels from the side panels 330, 334.

With continuing reference to FIG. 13 and specific reference to FIG. 14 and FIG. 15, the side panels 334, 330 may have interior portions or walls, such as an interior wall 334' that may define an edge or portion of the tunnel 320. The tunnel 320, as discussed above, may allow for placement of transmission lines (e.g. fuel lines and electronic lines) in the vehicle 30. The components within the tunnel 320, therefore, may be accessed by removing panels covering a top portion or top area 332 between the two side panels 330, 334. By removing a cover panel, such as the center console panel 340, access may be had to the components within the tunnel 320.

An efficient mechanism to remove the panels 340 may be provided. In various embodiments, for example, the top panel may include a tab portion or member 360. The tab 360 may be formed integrally with the panel, such as the top center panel 340, to interact with other portions. As illustrated in FIG. 14, the tab 360 may be received within a slot or passage 370 of the side panel 334. It is understood that a similar or mirrored tab may also be provided on the opposite side of the center panel 340 to engage a slot on the side panel 330.

The top panel 340, therefore, may be fastened or connected to the side panels 330, 334 with the tabs. Additional tabs or clips may also be provided to assist in further securement of the center panel 340 to the side panels 330, 334. In various embodiments, a tab 380 may be received through a passage or opening in the center portion of the side panels 330, 334. The passage may include or have positioned therein a clip or locking portion 384 biases the tab 380 within the passage. Nevertheless, the tab 380 may be removed from the passage by disengagement of the clip in an efficient manner for accessing the tunnel 320. Similarly the tab 360 may be removed from the passage or slot 370 for efficient access to the tunnel 320.

With continuing reference to FIG. 14, and specific reference to FIG. 15, when the tab and upper panels are removed the slots and passages may be open, as illustrated in FIG. 15. Thus, the slot 370 may be open and a passage 388 may be open or define a void through the center portion. With additional reference to FIG. 16 and FIG. 17, the slot 370 may include a passage 392 that may be formed by a wall or projection member 396 extending away from an inner wall or inner wall portion 334' of the side member 334. Accordingly the slot 370 may allow for passage of a portion of the tab 360 and allow for the tab 360 to be biased to engage a portion of the slot 370.

Figure 16:
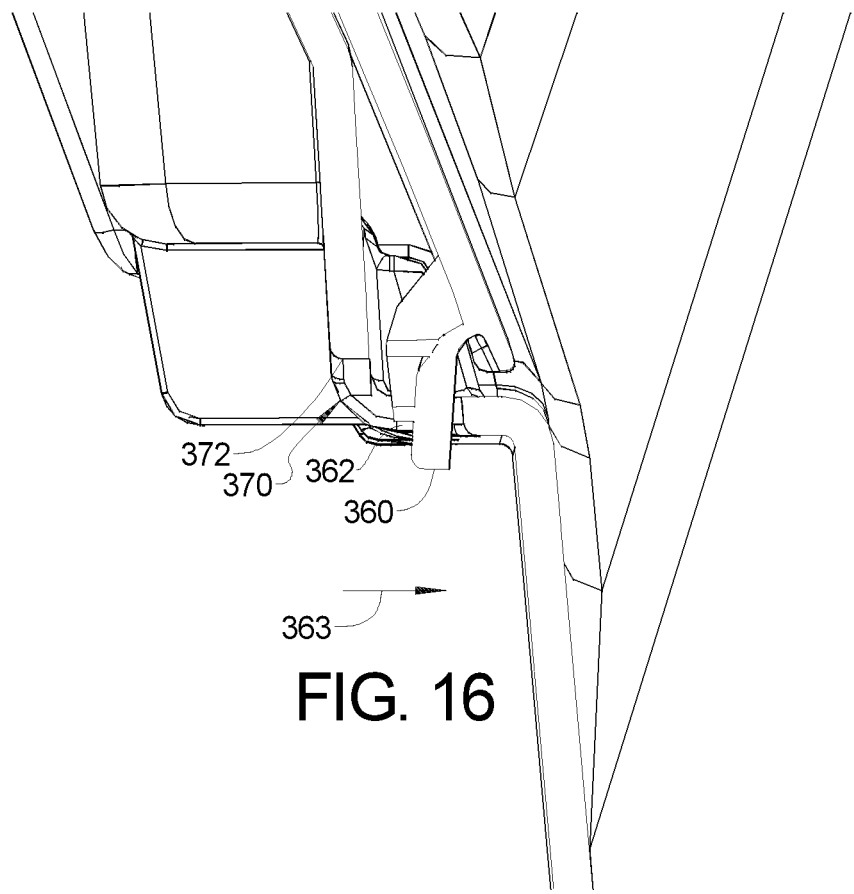
FIG. 16 is a cross sectional view along lines 16-16 of FIG. 14.
Figure 17:
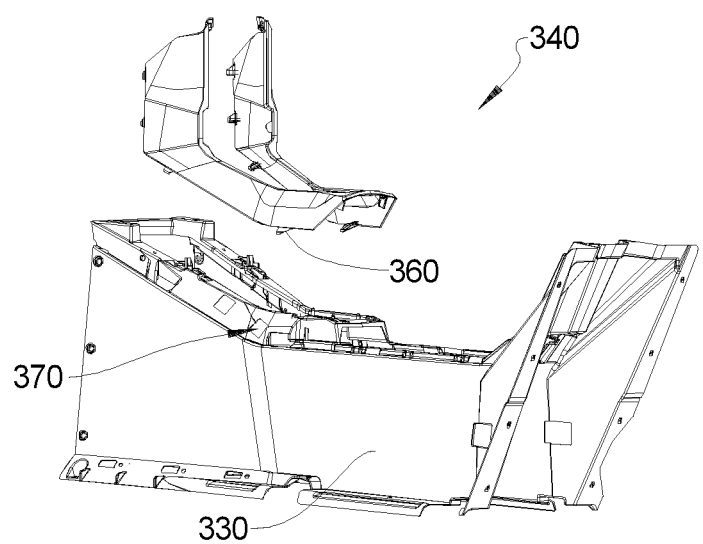
FIG. 17 is an exploded view of the center console.

With continuing reference to FIGS. 13-15 and additional reference to FIGS. 16 and 17, the interconnection of the tab 360 and the slot 370 will be described in detail. The tab 360 may include a ledge or finger 362. The tab may flex, such as in the direction of arrow 363 during insertion and removal of the member 340. As the tab 360 flexes, the ledge 362 may move away from a surface or edge 372 of the slot 370. When removed from (e.g. disengaged from) the slot edge 372, the tab 360 may be free to move within the slot 370. When free to move within the slot 370, the panel 340 may be moved relative to the panel 330, such as for disassembly and/or assembly. Thus, the panels 330, 340 may be efficiently assembled and disassembled for various purposes.

Figure 18:
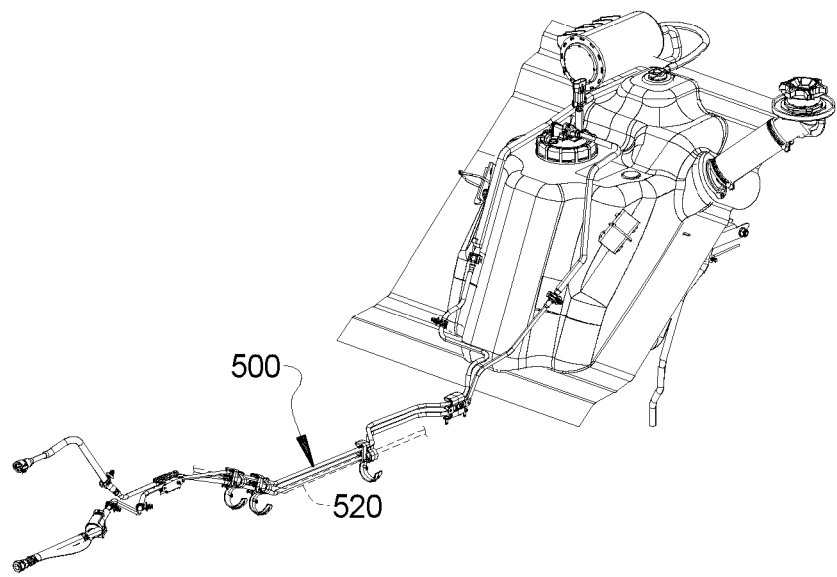
FIG. 18 is a detailed view of a fuel cell and fuel assembly.
Figure 19:
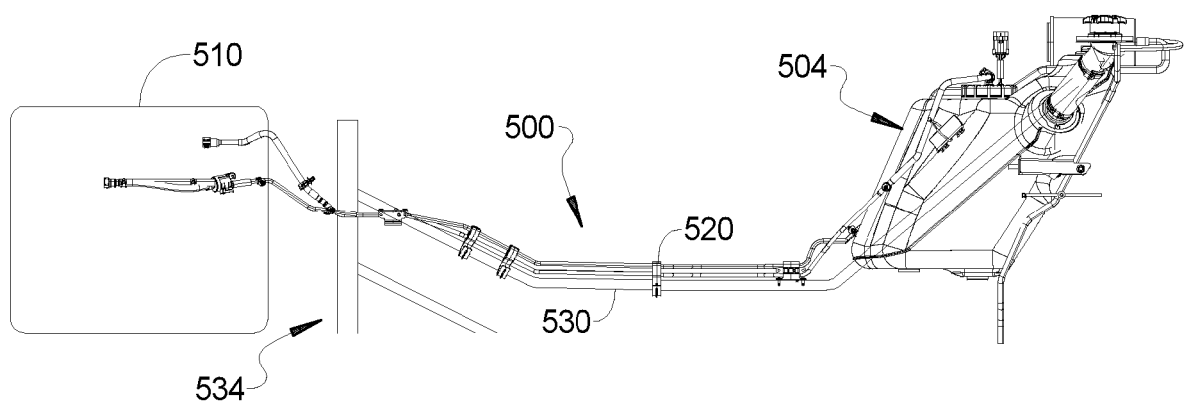
FIG. 19 is a bi-plan schematic view of a fuel assembly.

With continuing reference to FIGS. 1-17, and additional reference to FIGS. 18-20C, the tunnel 320 may allow for positioning and routing of various transmission lines or tubing. As discussed above, various transmission lines, such as one or more fuel lines 500, as illustrated in FIG. 18 and FIG. 19, may be used to transmit or carry fuel from a fuel tank or fuel cell 504 to an engine component 510. The engine 510 may be near the forward end or front of the vehicle 30, as illustrated in FIG. 1, while the fuel tank 504 may be near the rear 40 of the vehicle 30. Thus, the fuel lines 500 may transfer fuel from the fuel cell 504 to the engine 510. As is generally understood by one skilled in the art, the engine 510 may be an internal combustion engine and the fuel transmitted through the fuel lines 500 may be combusted within the engine 510.

In addition to the fuel lines 500, various other and/or additional lines may also be transmitted through the tunnel 320, such as an electronic line. The electronic lines may be positioned within a selected conduit or tubing 520. The electrical conduit 520 may be positioned through the tunnel 320 similar to and/or near the fuel lines 500. The electric line or conduit 520 may include a single electrical wire or line (even including an insulation layer) or may include a plurality of wires or connections that are positioned or placed in an exterior conduit or protective portion. Accordingly, the electrical line 520 may be understood to be one or a plurality of connectors and/or a housing or tubing to house a connector.

Continuing reference to FIG. 18 and additional reference to FIG. 19 and FIGS. 20A, 20B, and 20C, the fuel lines 500 and the electrical line 520 may be connected to a portion, such as a tube 530, of a chassis 534. The chassis tube 530 may be used as a guide or holding portion to hold the fuel line 500 and the electrical lines 520 at a selected orientation. The chassis tubing 530 may be interconnected with various other portions of a chassis 534 to form a frame or carriage of the vehicle 30. Further the chassis 534 may interconnect or hold the fuel cell 504 at a selected orientation, such as relative to the engine 510. The chassis 534, therefore, may be substantially ridged between the fuel cell 504 and the engine 510. This allows the chassis tube 530 to be used as a support structure to support the fuel lines 500 and/or the electrical lines 520.

In various embodiments, as illustrated in FIG. 18 and FIG. 19, the electrical line 520 may be run near or along a similar path, for at least a portion of the path of the electrical line 520 relative to the fuel line 500. The coextensive path or routing of the electrical line 520 and the fuel lines 500 may be held or supported with a selected mounting member or portion 550. The mounting portion 550 may also be referred to as a clip or holding member or a support assembly, as discussed further herein. The mounting member 550, however, may include various portions for engaging selected features of the vehicle 30, including the fuel lines 500, the electrical lines 520, and/or the chassis tube 530.

Figure 20A:
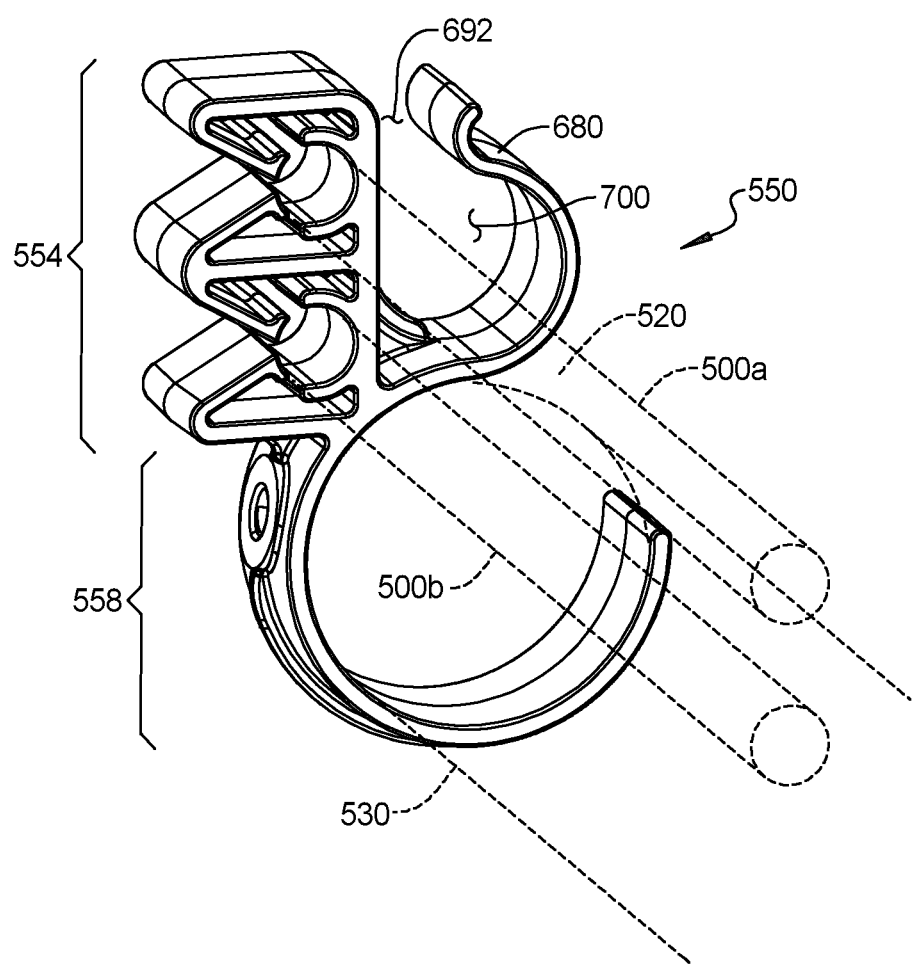
FIG. 20A-20C are views of an engagement assembly.
Figure 20B:
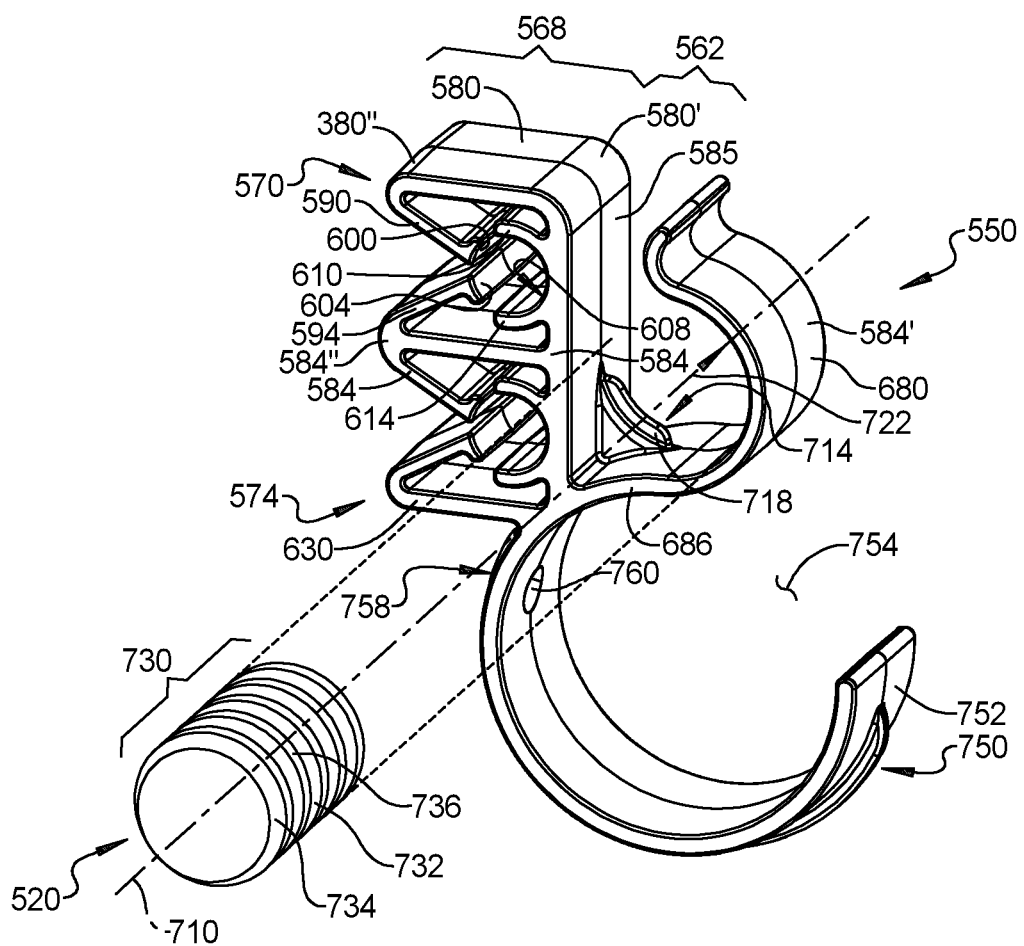
Figure 20C:
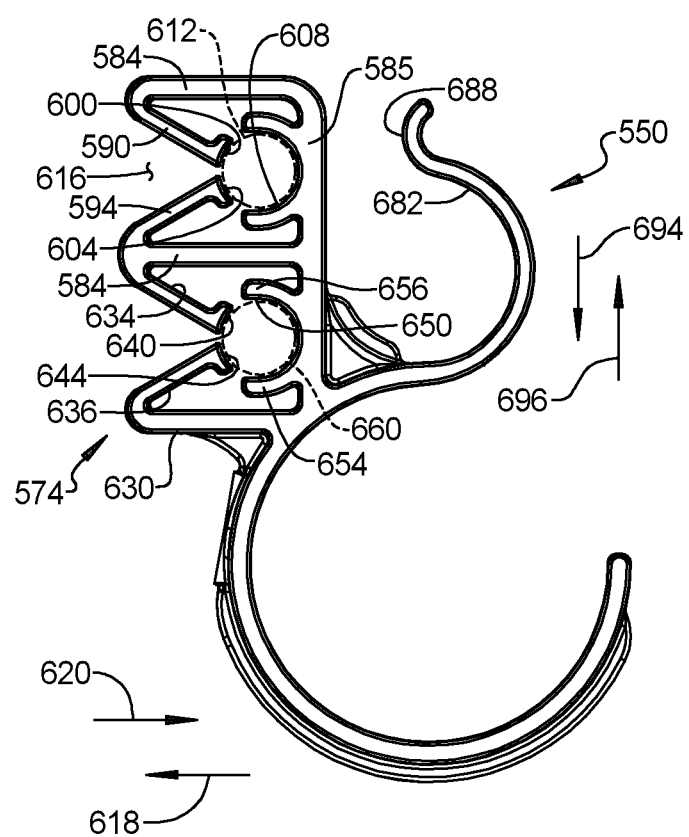

As illustrated in FIGS. 20A, 20B, and 20C, the mounting member 550 may include a line mounting portion 554 and a tubing or support mounting portion 558. The line mounting portion 554 may include an electrical mounting portion 562 and a fuel line mounting portion 568. The support member 550, however, may also include additional mounting portions.

The fuel mounting portion 568 may include one or more than one line mounting portion, such as including a first line mounting portion 570 and a second fuel line mounting portion 574. The mounting portion 550, therefore, may include two fuel line mounting portions, as illustrated in FIG. 20B. The fuel line mounting portions may include similar portions to engage the two fuel line portions 500*a* and 500*b*. Generally, the first fuel line mounting portion may include a top member or finger or projection 580 and a bottom or second finger or projection 584. The two projections 580, 584 may extend in a first direction from a wall or support member portion or surface 585. Generally the first and second line projections 580, 584 may extend substantially parallel to one another and substantially perpendicular to the wall or surface 585. It is understood that the line engaging projections 580, 584 may also extend at a non-perpendicular angle relative to the member 584 and a perpendicular angle is illustrated for the current discussion as an example. Generally, however, the perpendicular angle or position may allow for efficient manufacturing of the holding member 550 (e.g. injection molding, machining, or the like).

Each of the projections 580, 584 may extend from a first respective end 580', 584' near the surface or member 585 to a second end 580" and 584" away from the member 585. At or near the respective second ends 580", 584" may be revers projecting walls or engagement members 590 that extends from the first projection 580 and a second reverse projection 594 that extends from the second projection 584. The reverse projection members 590, 594 may extend from near the second ends 580", 584" toward the wall member 585. Each of the return projections 590, 594 may be formed as a single piece with the first projections 580, 584 extend toward the wall or member 584 and terminate in arcuate or engaging end portion 600, 604, respectively.

Extending from the wall member 585 toward the terminal projections 600, 604 is an arcuate engagement member or surface 608. The arcuate engagement surface 608 may be formed or defined by an upper arcuate projection 610 and a lower arcuate projection 614. As illustrated in FIGS. 20B and 20C the terminal projections 600, 604 in combination with the arcuate projection 608 form at least a portion of a circle or annular surface 612. The circle 612 may have an internal diameter similar or equivalent to an external diameter of the fuel line 500*a*. Accordingly, the terminal projection 600, 604 and the arcuate surface 608 may engage the fuel line 500*a* to hold it relative to the engagement member 550. Further, the return projections 590 and 594 may form or define an opening or passage 616 away from the support member 585. Accordingly, the engagement member 550 may be moved in a direction, such as generally in the direction of arrow 618 to engage the fuel line 500*a* and/or the fuel line 500*a* may be moved in the direction of arrow 620 to engage the engagement member 550. This allows the fuel line 500*a* to be engaged into the first fuel line engaging portion 570 to be held relative to the engagement member 550.

The fuel line engagement portion 568 further includes the second engagement portion 574. The second engagement portion may include or be formed in part by the second extension or finger 584. Thus, the engagement portion 584 may be a common wall or projection for the first fuel line engagement portion 570 and the second fuel line engagement portion 574. The second engagement portion 574 may further include a third projection wall or portion 630 that may extend from the support wall 585 similar to the first projection 580 and the second projection 584. The second fuel line engagement portion 574 may be similar to the first fuel engagement line portion 570. Therefore, the two projections 584 and 630 may include return projections 634 and 637, respectively. Each of the return projections 634, 636 may extend toward the support wall 584, similar to the projection 590, 594, as discussed above. Further each of the turn projection 634, 636 may end or terminate in arcuate portions or sections 640, 644, respectively. The support wall 585 may further have an arcuate support portion 650 extending therefrom. The arcuate support portion 654 may include a first projection 654 and a second projection 656. Similar to the arcuate or circular engagement or holding portion 612, discussed above, the arcuate engagement portion 640, 644, and 650 may define a circular or annular engagement or holding region 660.

Accordingly, the fuel line holding or engagement portion 578 may engage two fuel lines in the first annular engagement region 612 and the second annular engagement region 660. It is understood, however, that the engagement regions may be altered in size and/or the support wall 585 may be extended to provide for a plurality greater than two support regions to support more than two fuel lines. Further, it is understood that only a single fuel support line portion may be provided and/or that only a single fuel line is placed in one of the support portions.

The support member or engagement member 550 may further include a second support or engaging or electric engaging region 562. The electric engaging region 562 may include an engaging or holding member or finger 680 that may extend from the support member 585 in a direction opposite the fuel line engaging holding region 568 and the respective projections 680, 584, and 630. Thus, the support member 585 may provide a physical barrier between the fuel lines and the electrical line.

The electrical engaging region 562 may include the holding or engaging finger 680 to extend along a selected shape or configuration, such as including an arcuate surface or portion 682. The engaging finger 680 may connect or extend from the support wall 585 at a connection or engaging portion or region 686. The support finger or member 680 may extend toward the first projection 580, along the arcuate path or surface 682, and have a return projection or surface 688. Thus, an opening or passage 692 may be formed between the projection 680 and the support wall 585.

This construct allows a conduit or the electrical line 520 may be moved generally in the direction of arrow 694 and/or the engagement member 550 may be moved in the direction of arrow 696 to engage or pass the electrical line 520 into a receiving or holding area 700 that is at least partially surrounded by the engagement member or finger 680 and the support wall 585. Thus, the engagement member 550 may hold or support the electrical line 520 relative to the fuel lines 500 and/or the frame member 530 generally in the direction of arrows 620, 618, 694, and 696. The engagement member 550, however, may also support the electrical line 520 along a long axis of the chassis tube 530, such as generally along an axis 710, extending through the engagement or support area 700. Support along the axis 710 may be formed by an axial support member 714.

The holding portion or axial holding portion 714 may hold a member, such as the electrical line or conduit 520, fixed axially relative to the axis 710 within the clip retaining portion 680 relative to the support wall of the member 584. The axial retention member 714 includes an external surface or projection edge 718 that is positioned or fixed a selected distance from the central axis 710 through the retention portion 680. The retention edge 718 may be fixed relative to the retaining or support wall 585 in a selected manner, such as being molded therewith, affixed thereto (e.g. adhesives), welding, or the like. The projection wall 718 may extend as a member or surface substantially perpendicular to the support wall 585. Nevertheless, the projection surface 718 may be a selected distance 722 from the central axis 710. The retention member 714 is fixed relative to the support wall 585 and, therefore, relative to the retaining member 550.

The electrical conduit 510 may be formed to include one or more retaining or receiving sections 730. The retaining section 730 may include a groove or notch 732 that is positioned between two projections or peaks 734, 736 or may be formed as a depression or notch within an outer wall of the conduit 520. Accordingly the retention portion may be formed or defined by the conduit 520. The notch or receiving portion 732 may be engaged by the projection 718. When the notch 732 receives the projection 718 the axial holding portion 714 may substantially fix the conduit 520 relative to the retaining member 550 along the axis 710. Accordingly, the conduit 520 may be held relative to the fuel lines 500 in a selected manner. Further the conduit 520 may be protected from, such as via the support member 585, to maintain integrity of both the fuel lines 500 and the electrical conduit 520. Thus the retaining portion 680 may hold or bias the conduit 520 relative to the projection surface 718 to maintain the projection 718 within the notch 732 to assist in retaining the conduit 520 relative to the retention member 550.

Accordingly, the retention member 550 may hold one or a plurality of transmission lines, including fuel lines and electrical lines, relative to the retention member 550. The retention member 550 may also be held relative to a portion of the vehicle 30, such as the chassis tubing 530, as illustrated in FIG. 19. The chassis tubing 530 may pass through a chassis tubing engagement or retention portion 750 of the retention member 550. The chassis tube retention or engaging portion 750 may include an arcuate member 752 that extends along an arc relative to the support member 584. The extent of the arc may be substantially annular and/or include an opening 754 to allow for receipt or engagement with the chassis tube 530.

Further the chassis tube engaging section member 750 may include an axial retention or holding portion 758. The axial retention portion 758 may include a bore 760 that is formed through the retention member 752. The bore 760 may receive a projection, such as a stud or pin, formed on or with the chassis tube 530. Additionally, and/or alternatively thereto, a fastener may be passed through the bore 760 to engage the chassis tube 530 at a selected point or position. Fasteners may include clips, rivets, bolts, or any other appropriate fastening member that would pass through the bore 760 to engage the chassis tube 530. Thus the retention member 550 may also be axially fixed, such as generally parallel to the axis 710, on the chassis tube 530.

Accordingly the retention member 550 may be used to engage the chassis tube 530 and one or more transmission lines, such as the fuel lines 500 and/or the electrical lines 520. The retention member 550 may engage the respective lines and the chassis tube 530 to substantially fix all or a part of (e.g. such as the electrical line 520) axially relative to the chassis tube 530 and/or others of the retained lines.

The retention member 550 may be formed of a selected material, such as injection molded or molded, in any appropriate manner, as a single piece or member. The molded member may be formed of an appropriate polymer, or co-polymer, or reinforced polymer/co-polymer (e.g. fiber reinforced nylon). The retention member 550, may be formed as a single member or piece including the respective retaining portions. It is understood, however, that the retention member 550 may be formed of individual members that are integrated with selected fasteners or connection points. Nevertheless, forming the retention member 550 as only a single member may allow for increased tolerances, ease of assembly, confirmation of positioning of selected transmission lines at appropriate locations and/or relative to one another, and other appropriate advantages.

Accordingly, the retention member 550 formed as a single piece, such as of a flexible material, such as a polymer, may allow the retention member 550 to be fixed in the vehicle 30 to retain a selected transmission lines in an appropriate manner. The retention member 550, including each of the retention or holding portions, may also have selected elastic properties such that the flexible portions may return or be biased to a selected (e.g. holding or retaining) position. The retention member 550 may also be formed of other appropriate materials. For example, a selectively flexible metal or metal alloy may be used to form the retention member 550. In various embodiments, the retention member 550 may be formed of a metal or metal alloy and still include appropriate flexible features or configurations to allow for bias holding of the respective transmission lines, flexible movements and automatic return to a selected shape to engage the selected transmission lines and/or the chassis tube 530, and other appropriate engagement features.

Figure 21:
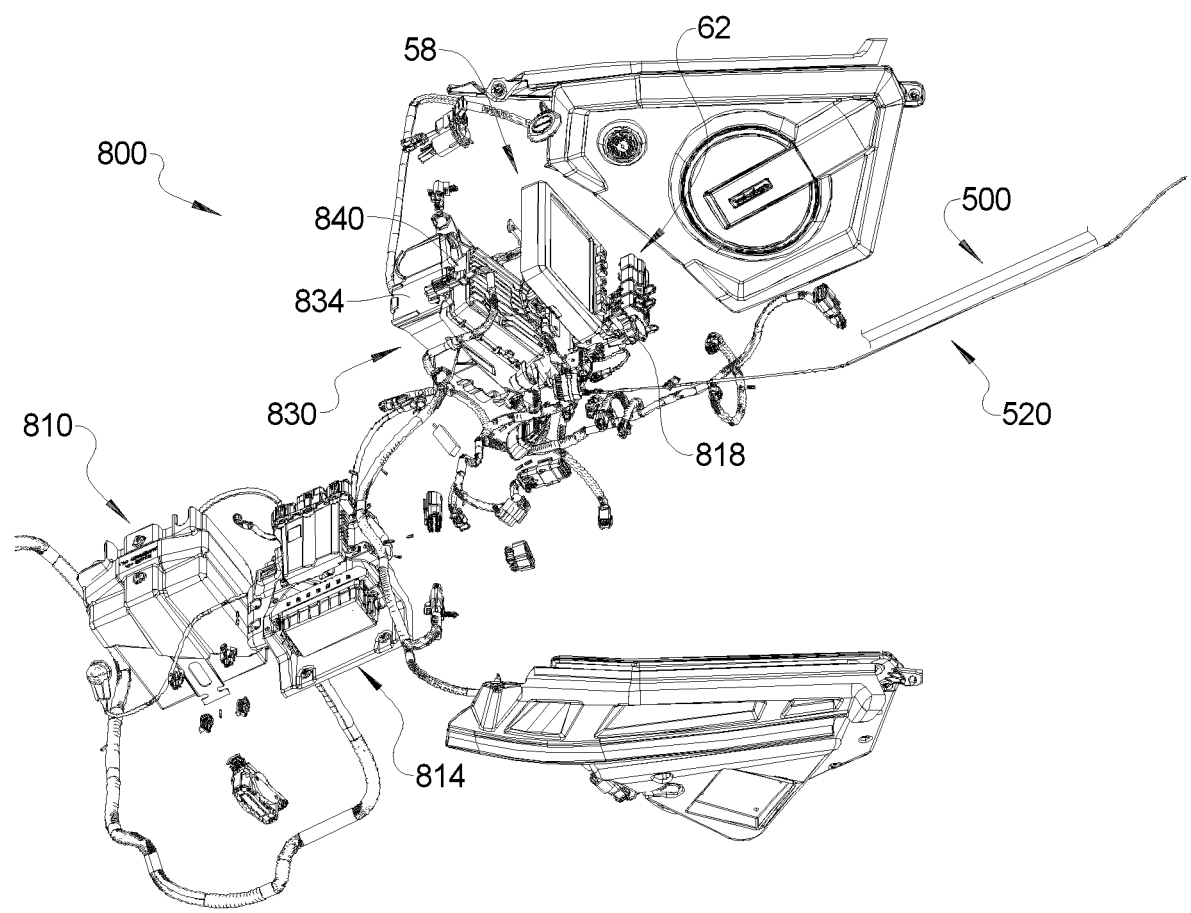
FIG. 21 is a schematic view of an electrical assembly.

With continuing reference to FIG. 1-FIG. 5 and FIG. 19, and additional reference to FIGS. 21-26, the vehicle 30 includes an electrical transmission and wiring system 800, as exemplary illustrated in FIG. 21, that can include a plurality of components, including electrical transmission lines that may be provided to interconnect various components and/or passed through conduit members, such as the electrical conduit 520. Additional features of the electrical system may include a power storage system, such as a battery 810, a fuse assembly 814, the screen or input module 58, and/or the buttons 62. The vehicle 30 may further include a push button or electric push button start switch 818. The display 58 and the hard switches and controls 62 and the start button 818 may be positioned for access by the user in the passenger compartment 32, as discussed above.

The electrical system 800 may further include various unifying or hub type features, such as a single origin or hub system or portion 830. The central or main hub system 830 may include various components, such as a central or unifying mounting portion or member 834 which may allow for interconnection or assembly of various components thereto, including portions of the wiring harness, and other electric components. In various embodiments, a processing assembly that may include a global positioning system (GPS) 840 may be mounted to the mounting member 834. Additionally, the mounting member 834 may have fixed thereto one or more control units (e.g. an engine control unit (ECU)) 844, as illustrated in FIG. 22.

Figure 22:
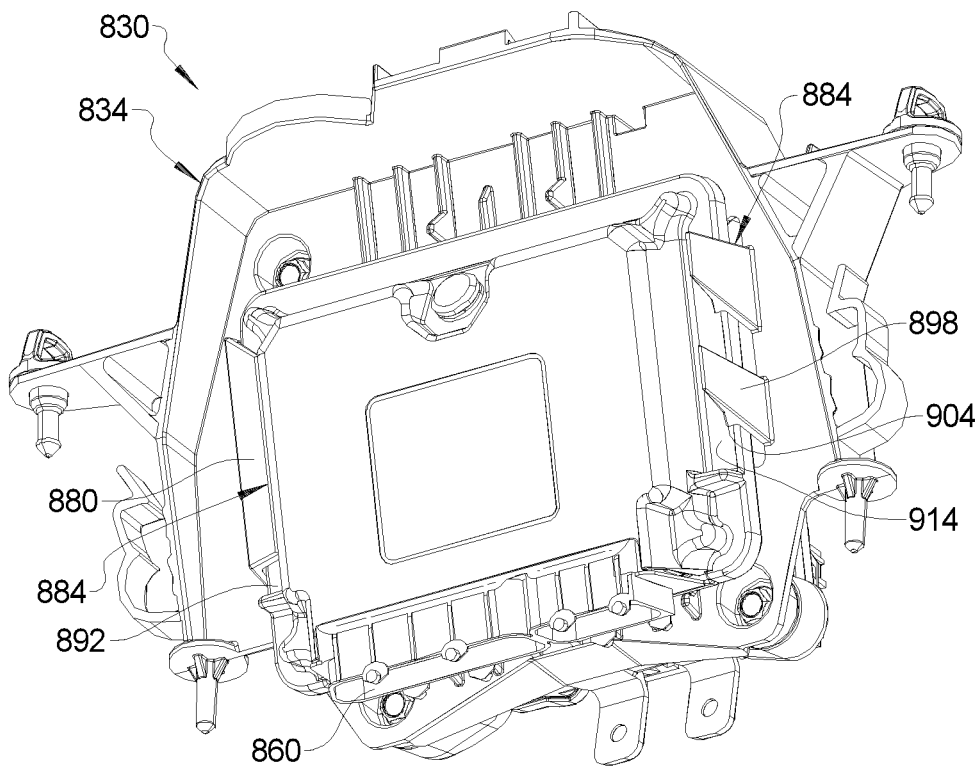
FIG. 22 is a detailed view of a component connector hub, according to various embodiments.
Figure 23:
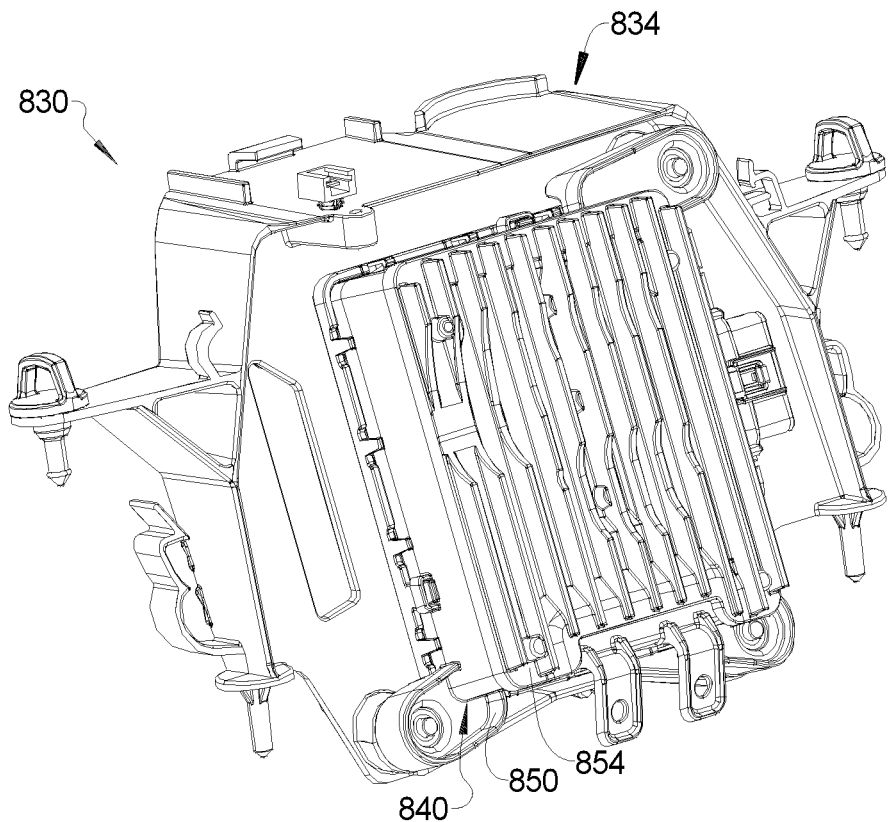
FIG. 23 is a second perspective view of the component connector hub.

With continuing reference to FIG. 21 and additional reference to FIGS. 22 and 23, the hub assembly 834 may include various components affixed to the support member 834. The hub assembly 830 may include the various components mounted to the support member 834 and/or wire routing features and/or vehicle mounting features associated therewith. As illustrated in FIG. 21, wiring assemblies or communication lines may pass by or through the support member 834 to be supported thereby and to assist in fixation and/or routing of the electronic components and/or communication lines. Accordingly, the electronics hub 830 may allow for ease and efficient manufacturing of the vehicle 20 including an electrical components thereof and/or communication lines thereof.

The GPS unit assembly 840 may include a GPS processor, memory system, and/or antenna as is generally understood by one skilled in the art. A cover or mounting portion 850 may mount or cover the GPS assembly relative to the support or mounting member 834. The GPS and/or processing assembly 840 may further include a heat sync 854 that may be mounted relative to and/or adjacent to (e.g. in contact with) the cover 850. It is understood that the heat sync 854 may be an active heat sync and/or a passive heat sync (e.g. including ventilation ribs).

Opposite from or on an opposite side of a surface opposed to the mounting portion of the GPS assembly 840 may be the ECU assembly 844. The ECU or processing assembly 844 may include an engine control unit that may be used to assist or control the engine 510. The ECU may further include various memory or programming systems to assist in controlling the engine 510 and/or additional components of the vehicle 30. Various connection portions 860 may be provided to allow for connection of the ECU assembly 844 to various components of the vehicle 30. The ECU assembly 844 may, therefore, include a module that may include a processor (e.g. a processor operable to execute instructions for controlling the engine 510, and/or other components), memory module to store the instructions to be executed by the processor, memory to store sensor inputs for recall (e.g. service) and other components. The ECU assembly 844, however, may be mounted on the single mounting or hub portion 834 in the vehicle 30. It is understood that more than one processor and/or memory portion may be provided that are able to communicate via selected communication protocols.

Figure 24:
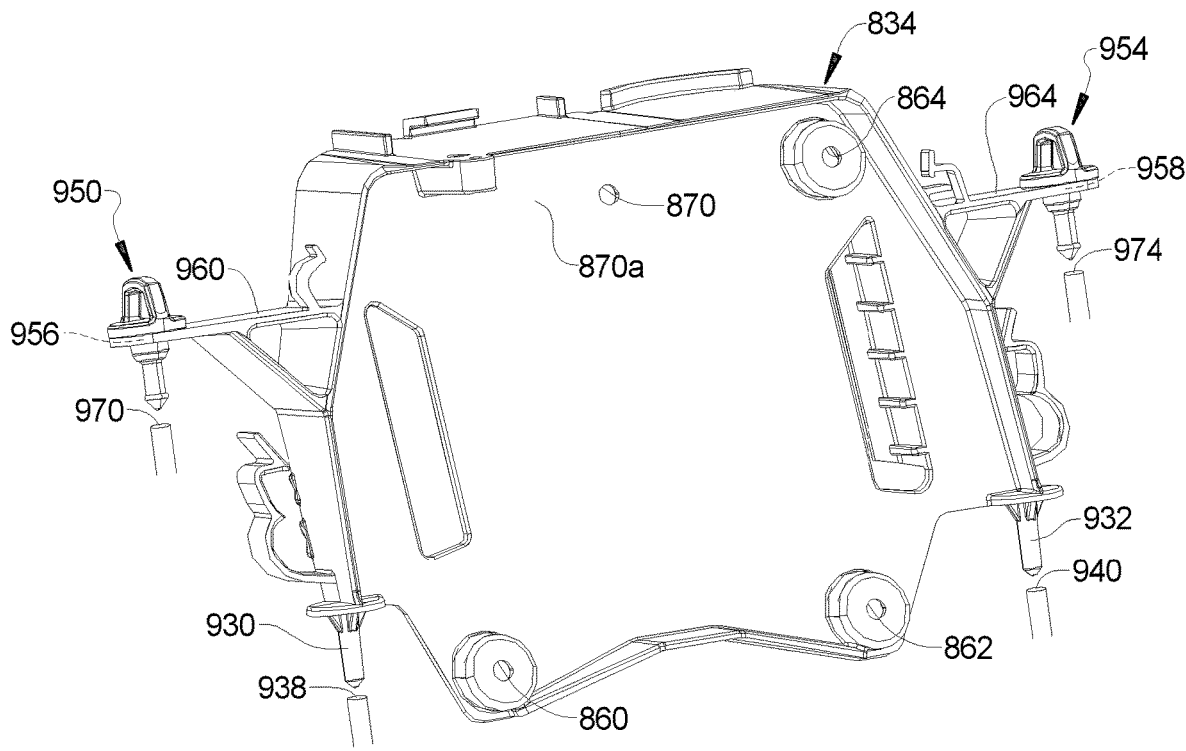
FIG. 24 is a detailed view of the electrical components connector hub.
Figure 25:
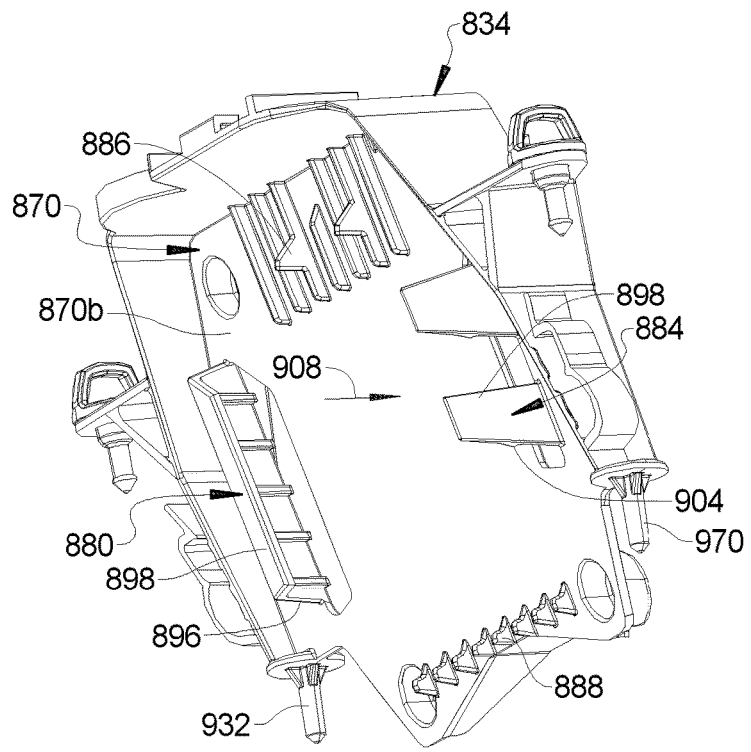
FIG. 25 is a second view of the electrical components connector hub.
Figure 26:
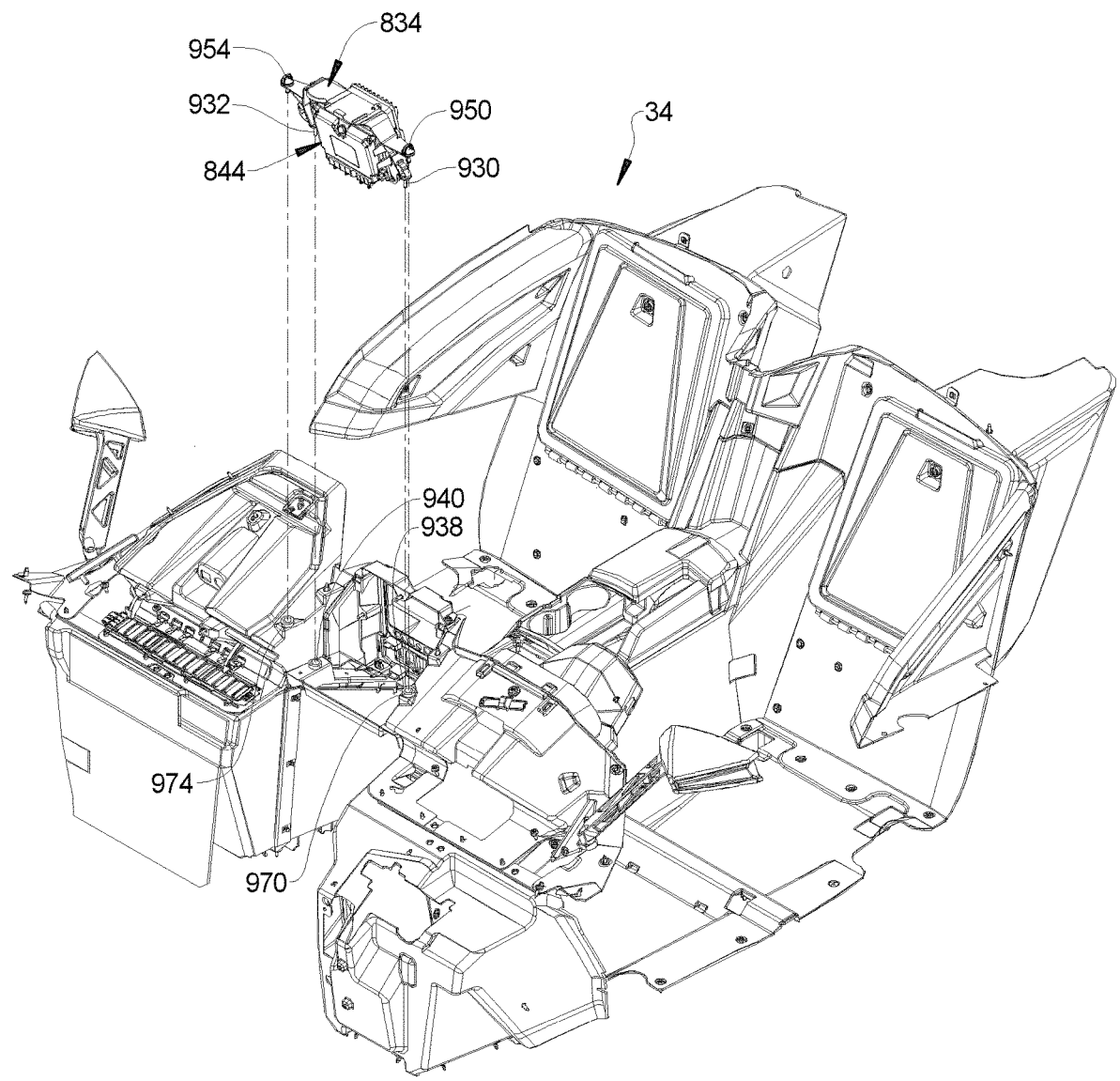
FIG. 26 is an exploded view of an assembly of the electronic components hub.

The mounting or support portion 834 may be mounted within the vehicle 30 as illustrated in FIG. 26 and include various mounting portions, as illustrated in FIG. 24 and FIG. 25. Accordingly, with reference to FIGS. 24-25, the mounting assembly 834 may be fixed to the vehicle 30, as discussed further herein. The mounting portion 834, therefore, may be mounted as a unit in the vehicle 30. Further, the connection of the mounting unit 834 may allow for build tolerant included in selected connection portions to the vehicle 30.

The mounting hub or central portion 834 may include, such as on a first side, one or more reinforced mounting bores, such as a first mounting bore 860 a second mounting bore 862, and a third mounting bore 864. The mounting bores 860-864 may be throughbores formed through a main plate or mounting surface 870 of the mounting or central portion 834. The mounting bores 860-864 may receive fasteners to assist in holding or fixing the cover 840 relative to the support plate 834. The mounting bores 860-864 which may include raised studs or projections (e.g. to allow for airflow and/or a backing plate).

The ECU 844 may also be mounted to the central member or plate 870. The ECU mounting side may include one or more guide projections or tabs, such as a first guide or retaining projection 880, one or more second guide projections 884, one or more third guide projections 886, and one or more fourth guide projections 888. The guide projections 880-888 may be used to assist in holding the ECU assembly 844 in a selected position relative to the support member or plate 870 in a selected location or position. Accordingly, the ECU may be held relative to the support plate 870 in a selected position and fixed position with minimal fasteners passed there through. Thus the ECU assembly 844 may be mounted to the ECU side 870b in a substantially fixed manner or position with minimal or no removable fasteners. The projections 880-888 may provide the fixation to the support member 834.

In various embodiments, the ECU assembly 834 may include one or more side or tab projections. For example, as illustrated in 822 a first side projection 892 may be positioned under the first tab 880. The first tab 880, therefore, may include an extending wall 896 that extends from the surface 870b and an angle, such as perpendicular, wall member 898. The tab 892 may be sized to be used by the side wall 896 and top wall 898 to hold the ECU assembly 844 relative to the plate 870. The second projections 884 may include a relatively or generally flexible wall or member portion 898 and a tab or finger projection 904. The ECU assembly 844 may be initially positioned relative to the tab assembly 880 and then generally pressed or moved in the direction of arrow 908 against the wall portion 898 of the tab or projections 884 to deflect or move the projections 884. The ECU assembly 844 may then pass the finger 904 after which the tab portion 884 may deflect or elastically return to the original position such that the finger portion 904 engages a second ECU tab or wall portion 914. The ECU assembly 844, in this manner, may be held relative to the support member 834 in a substantially fixed or selected position without extraneous or additional fixation members. It is understood, however, that one or more fixation members may be positioned through the ECU assembly 844 to engage the support member 834 to assist in fixing or holding the ECU assembly 844 relative to the support member 834.

The support member 834 is also fixed relative to the vehicle 30, such as relative to the seats 42, 44 within the passenger compartment 34, or other portions of the vehicle 30. It is understood that the selected electrical components may be fixed relative to select the components within the vehicle 30, according to various specifications. For example, the engine 510 may be positioned on engine mounts that allow for a selected vibration movement of the engine 510 relative to the seats 42, 44 to substantially isolate to the engine 510 relative to the seats 42, 44. Nevertheless, the support member 834 may be provided to fix selected components of the electrical assembly or unit 800 relative to one another for a selected operation thereof. Accordingly, the support member 834 may be fixed relative to the vehicle 30 with selected fixation portions or members.

In various embodiments, the support member 834 may be formed as a single member of a selected material. For example, the support plate or member 870, the projections or tabs 880-888, and the material forming the bores 860-864 may be substantially formed as a single member. Further the support member 834 may include engagement members or projections 930, 932 to assist in engaging or holding the support member or assembly 834 relative to the vehicle 30. The projections 830, 832 may be formed of the same material as the portions of the support assembly 834 and may be engaged or positioned within the tabs or bores 938-940 within the vehicle 30. The support assembly 843, therefore, may be formed as a single member and positioned to engage the vehicle 30 in the bores or receiving bores 938, 940. The projections 930-932 may include selected fixation or engagement portions and/or the bores 938, 940 may include retention portions therein to selectively engage or retain the support assembly 834.

The support member or assembly 834 may further include one or more removable projections or pins 950, 954. The pins or tabs 950, 954 may pass through one or more bores 956, 958 formed through projections or extension members 960, 964 extending from the support assembly 834. The pins 950, 954 may further connect with bores or receiving portions 970, 974 of the vehicle 30. The tabs or pins 950, 954 may be removably connected to the support member 834 and/or the vehicle 30 through the bores 970, 974.

Accordingly, the support member or assembly 834 may be affixed or connected to the vehicle 30, as illustrated in FIG. 26, in a substantially rigid manner with the projections 930, 932 and/or the pins 950, 954 to connect the support assembly 834 to the vehicle 30. The support assembly 834, therefore, may be assembled into the vehicle 30 and allow for connection of the various components such as the ECU assembly 844 and the GPS assembly 940 into the vehicle 30. Further, the assembly of the various electrical components and/or the routing hub 834 may be performed or done efficiently and/or with speed by positioning the projections 930, 932 into respective bores or receiving portions 938, 940 on the vehicle and inserting the projections or pins 950, 954 through the bores 956, 958 of the assembly 834 and the respective bores or receiving portions 970, 974 of the vehicle 30. Thus, the various electrical components and portions of the vehicle 30 may be assembled efficiently during the assembly phase and production of the vehicle 30.

With continuing reference to FIGS. 1-6 and additional reference to FIGS. 27-43, the vehicle 30 may be powered with a selected power and transmission system. With initial reference to FIG. 27, the vehicle 30 includes the chassis assembly 534 that includes various structural components, including chassis tubing 530, as discussed above. Positioned with an internal chassis frame or engine and transmission frame assembly, may be the engine 510, a transmission assembly 1000, a drive shaft 1004, a right-angle drive assembly 1008, a belt drive 1012, and a final gear or drive gear 1016. It is understood that various components may be altered and/or provided in alternative mechanisms, such as the drive belt 1012 may be provided as a drive chain, shaft drive, or the like. Further the right-angle drive 1008 may be replaced with an elongated drive shaft 1004 that may drive directly the drive gear 1016. As illustrated in the above figures, the power drive gear 1016 may be fixed to the rear wheel 1000 to drive the vehicle 30 in a selected manner. Further, the user may operate the vehicle to cause the engine 510 to operate in a selected manner to drive or move the vehicle 30. As discussed above, the vehicle 30 includes the forward or front wheels 104, 108 that may be used to steer the vehicle via the steering wheel 46. Further, the engine 510 may be fueled by a selected fuel components (e.g. petroleum) stored and transmitted to the engine 510 from the fuel cell 504. The user may operate a throttle to cause the engine to achieve a selected engine speed and/or operate the gear or drive controls 70 to select a gear for operating the engine 510.

Figure 27:
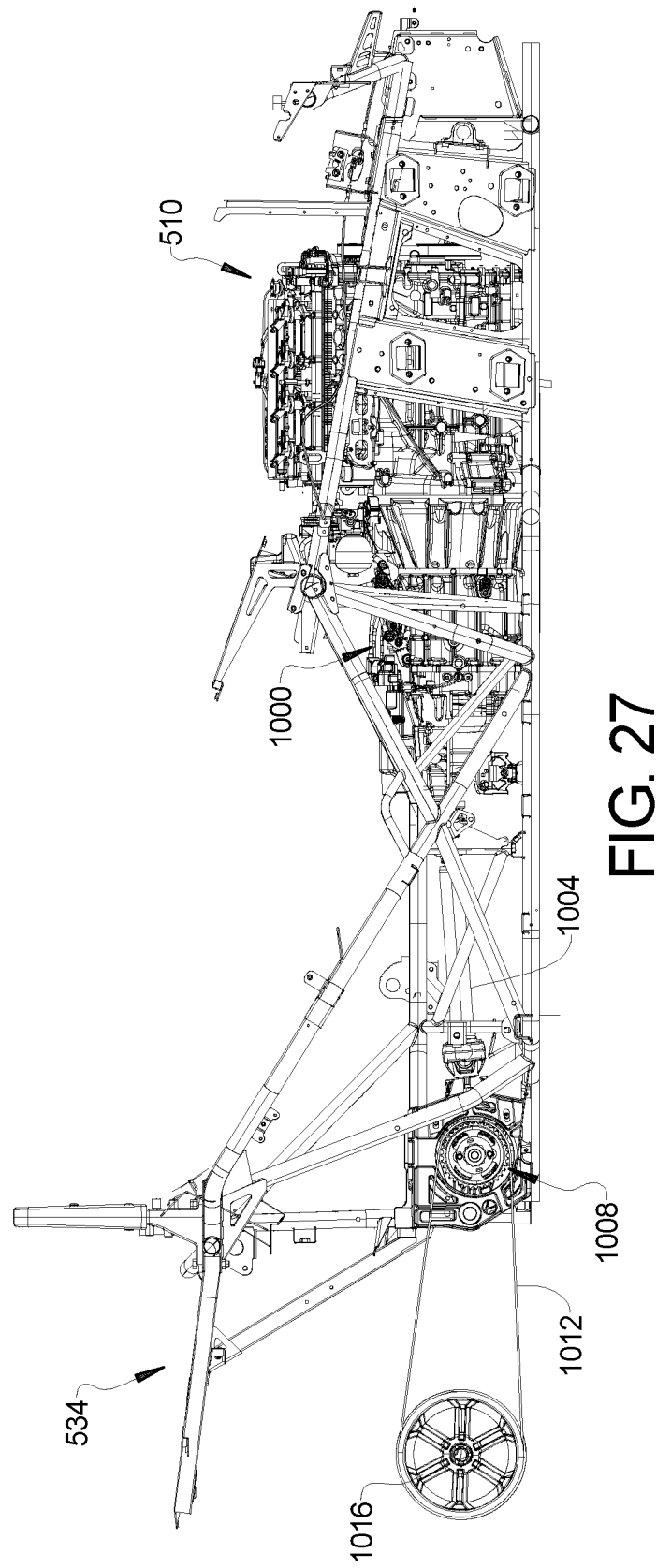
FIG. 27 is a side view of a chassis and drive chain assembly.
Figure 28:
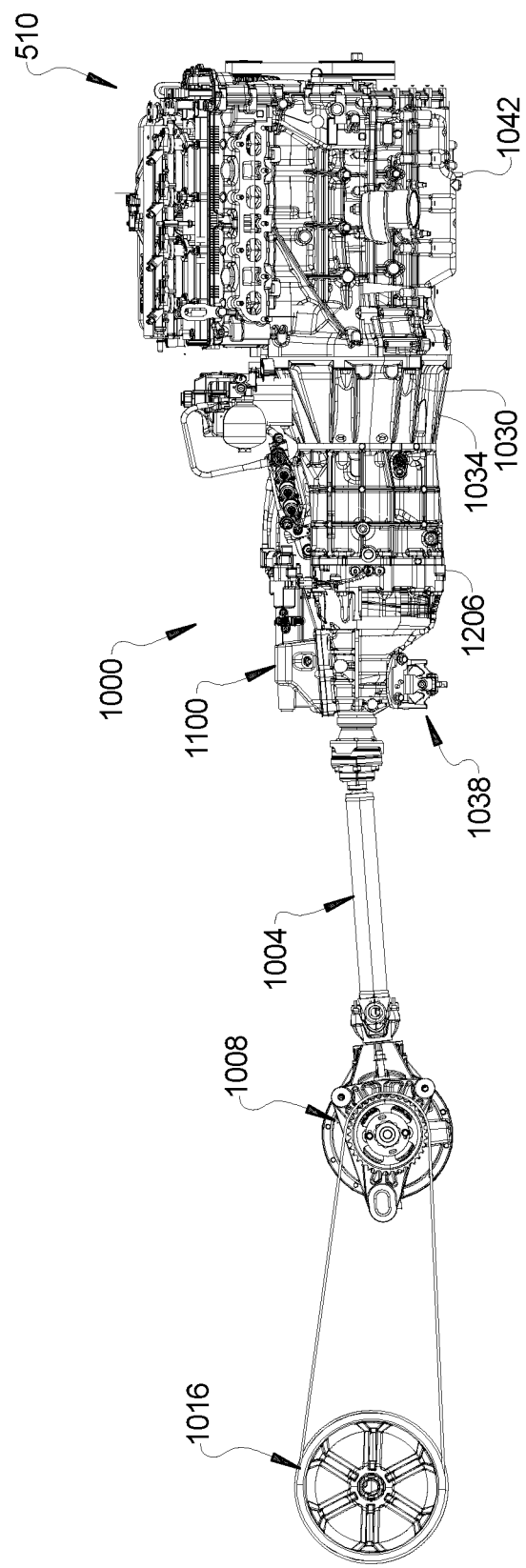
FIG. 28 is a side view of a drive train assembly.
Figure 29:
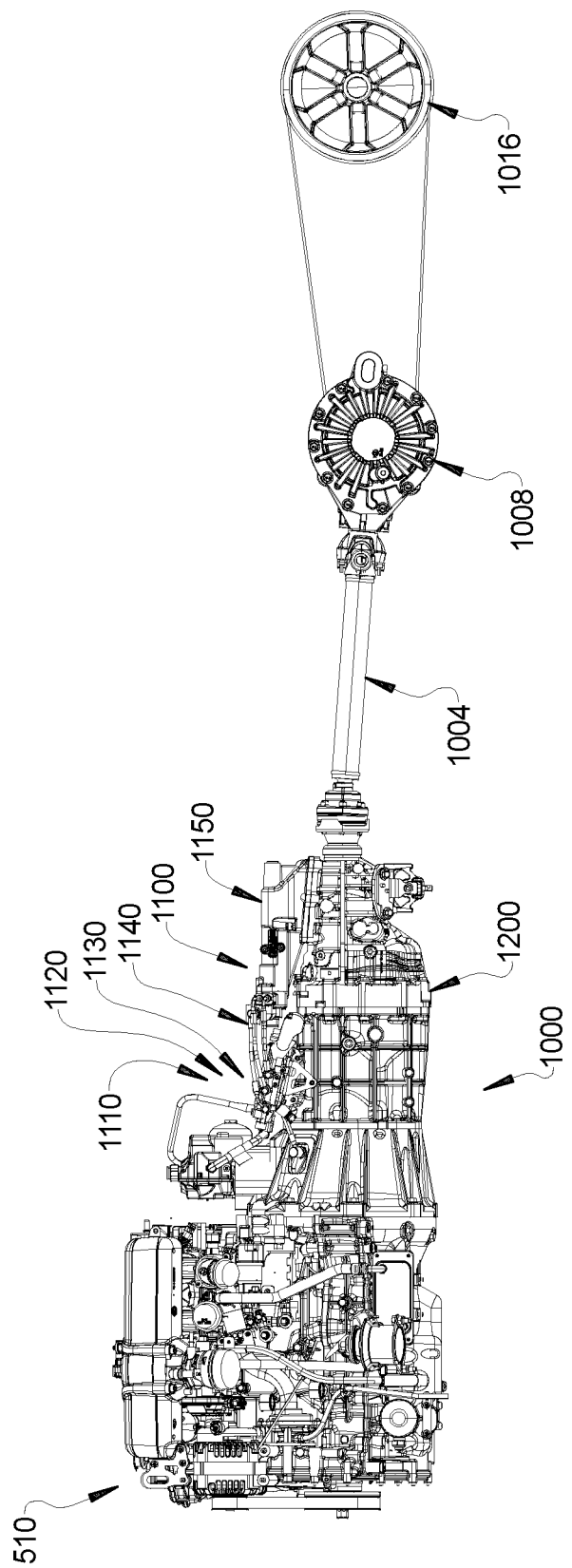
FIG. 29 is a second side view of the drive train assembly.

With continuing reference to FIG. 27 and additional reference to FIGS. 28 and 29, the engine 510 is mounted and connected to the transmission assembly 1000 in a selected manner. For example, a plurality of connection members, such as a connection member 1030 may be provided to connect a portion of a belt housing 1034 to a portion of the engine 510. The engine 510, therefore, may include a selected mechanism, such as a plurality of pistons, to drive a drive shaft. The drive shaft may interconnect with portions within the transmission 1000, such as gears, through various gear meshing's and selections, as discussed further herein. The engine 510, however, may be an engine such as the engine disclosed in U.S. patent application Ser. No. 15/595,209, filed on May 15, 2017 and published as U.S. Pat. App. Pub. No. 2018/0328258, incorporated herein by reference.

The combination of the engine 510 and the transmission assembly 1000 may be mounted to the vehicle chassis 534 as a unit, in various embodiments. The engine 510 and the transmission 1000 may be connected to the chassis 534 through various engine mounts and isolators such as a transmission engine isolator 1038 and an engine mount isolator 1042. It is understood that the isolators 1038, 1042 may be provided as both a left and right engine assembly isolators such that the engine and transmission assembly may include four isolators relative to the chassis frame 534. It is further understood that additional isolators may be provided to isolate the engine and transmission from the chassis 534, according to various embodiments. It is further understood that the isolator assemblies 1038, 1042 may be provided as a plurality of components to isolate the engine 510 and/or the transmission assembly 1000 from the chassis assembly 534. The isolation may allow for isolating the chassis 534 from vibration caused by operation of the engine 500 and/or vibrations from operation of the vehicle 30 (e.g. rotary surface imperfections) from effecting or minimizing effect on the engine 510 and/or the transmission 1000. The isolators, therefore, may isolate the power plant of the vehicle 30 from the chassis 534, for various purposes.

The transmission assembly 1000 may include a plurality of selected gears that may be selectively connected with the output of the engine 510 to provide a final drive gear ratio to the drive gear 1016. In various embodiments a shifting assembly 1100 is selectively connected to the transmission assembly 1000 to shift gears within the transmission assembly 1000. The gears (not specifically shown) of the transmission and possible gear ratios may be known to those skilled in the art. Various gears may include those included in the transmission system of the Slingshot® sold by Polaris Industries Inc.

The shifting assembly 1100 may also be referred to as an automatic or automated manual transmission (AMT) to shift the gears within the transmission 1000. The AMT 1100 may include various components and assemblies, which may generally include a reservoir 1110, a hydraulic pump 1120, a valve assembly or valve body 1130, hydraulic transmission lines 1140, and a shifting power or shifting assembly 1150.

Figure 30:
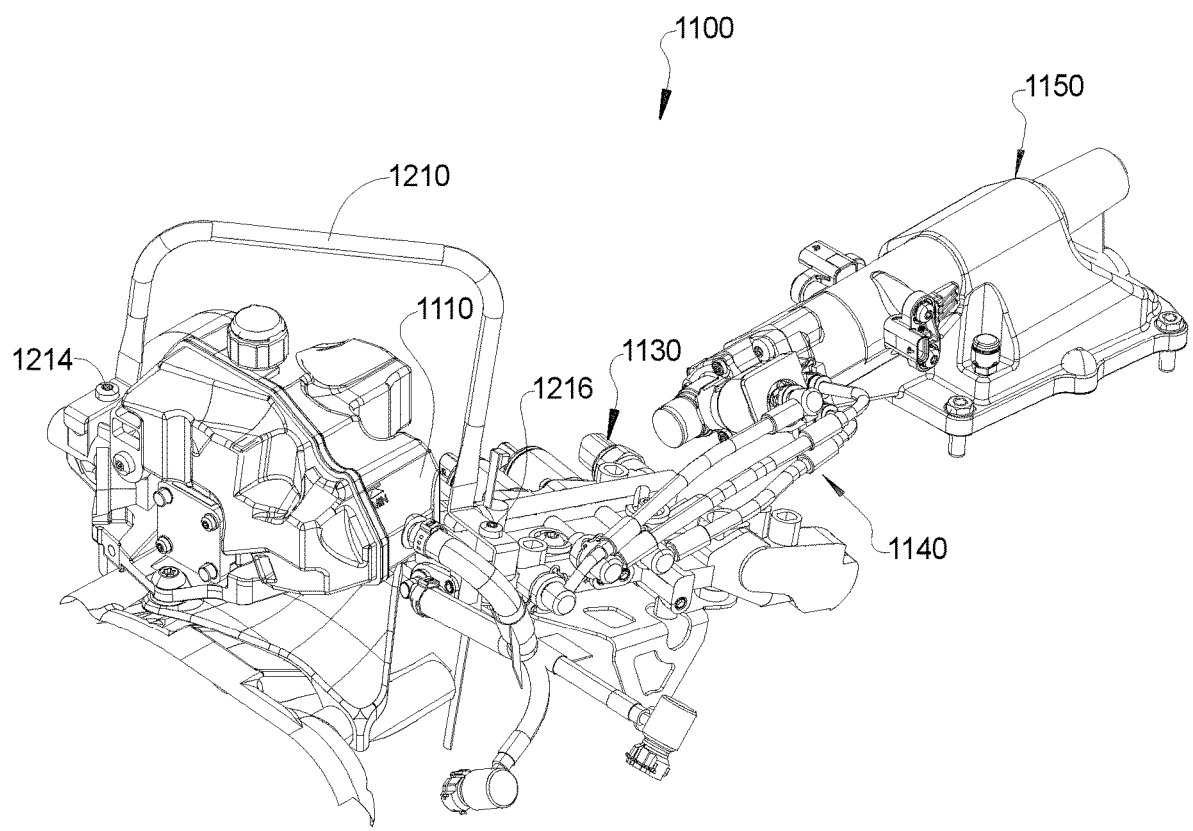
FIG. 30 is a first perspective view of a shifting assembly.
Figure 31:
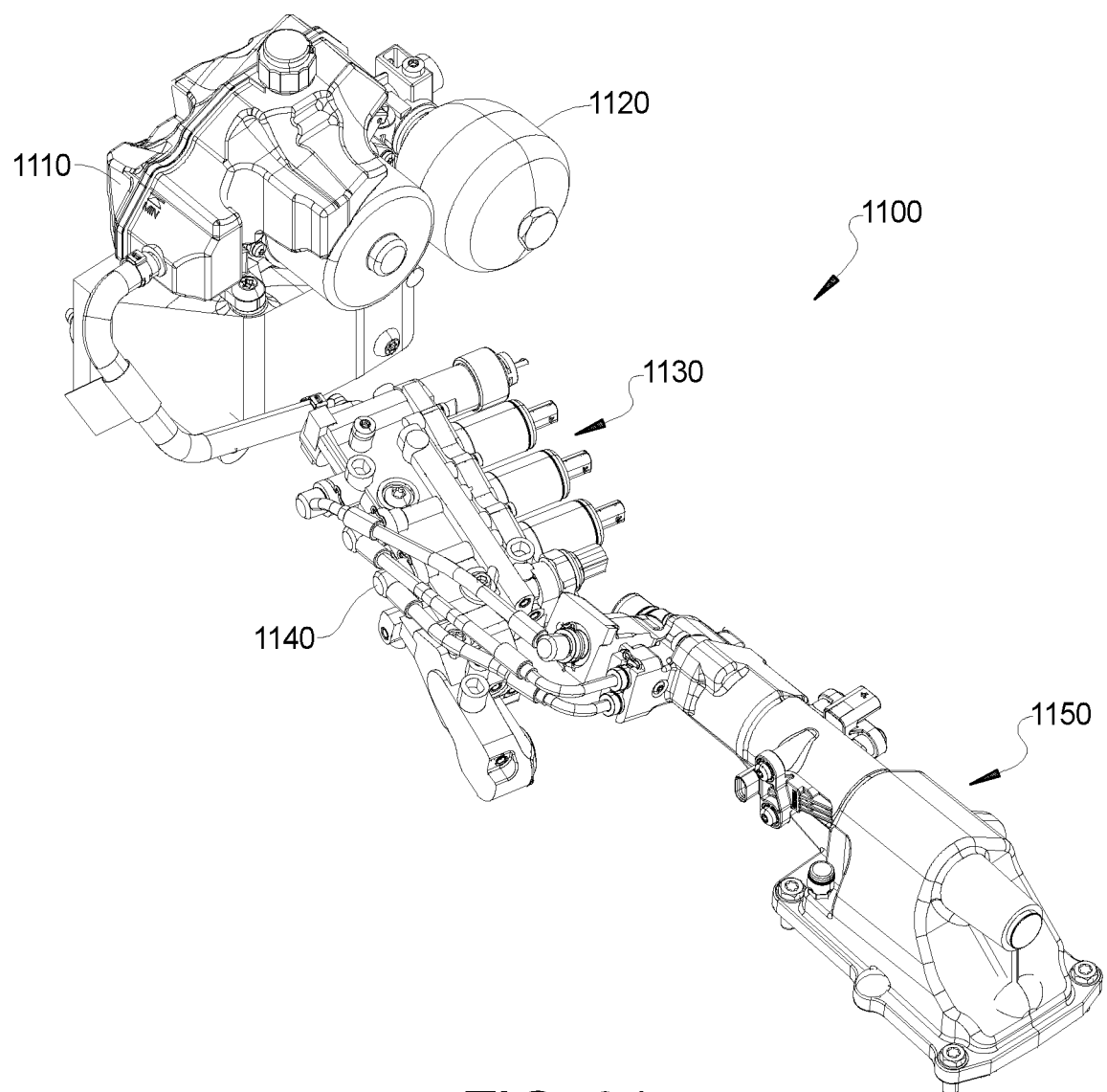
FIG. 31 is a second perspective view of the shifting assembly.

With continuing reference to FIGS. 28 and 29, and additional reference to FIG. 30 and FIG. 31, the shifting assembly 1100 is illustrated and discussed in greater detail. The shifting assembly 1100 may be provided as a unit or assembly for connection to a transmission housing 1200 of the transmission assembly 1000. In various embodiments, for example, a shipping handle of lifting mechanism 1210 may be removably connected to a portion of the shifting assembly 1100, such as with removable fasteners 1214 and 1216. Thus, the handle 1210 may be removed from the shifting assembly 1100 after assembly of the shifting assembly 1100 to the transmission housing 1200. The shifting assembly 1100, therefore, may be provided as a single unit for connection to the transmission housing 1200 to form the transmission assembly 1000 and/or connection to the engine 510. Thus, for ease of assembly and efficiency of the assembly the shifting assembly 1100 may be formed as a unit and shipped for efficient connection to the transmission housing 1200. As illustrated in FIG. 31, the handle 1210 may be removed from the shifting assembly 1100 as a selected time, such as after mounting the shifting assembly 1100 to the transmission housing 1200.

The shifting assembly 1100 is mounted to the transmission assembly housing 1200 generally along a top surface of the transmission housing assembly 1200. Different portions of the shifting assembly 1100, however, may be connected to fixed to different regions of the transmission housing, as discussed herein. As assembled and connected, the transmission assembly 1000 may generally extend along an axis, such as the central axis 188 of the vehicle 30. It is understood that the transmission assembly 1000 may be offset from the central axis 188 of the vehicle 30 but, however, may also be generally parallel thereto. Accordingly, the transmission assembly 1000 may be substantially along the line, such as that an input shaft is generally on the central axis 188.

The connection and mounting allows the shifting assembly 1100 to be positioned above the central axis 188 of the vehicle 30. The shifting assembly 1100, however, may also extend along an axis 1300 that is generally aligned and/or parallel with the vehicle axis 188. The axis 1300 may be spaced a distance above, such as generally in the direction of arrow 1304 of the vehicle axis 188. The shifting assembly 1100, however, is generally fixed to the transmission housing 1200, as illustrated in FIGS. 29, 28, and 32.

Figure 32:
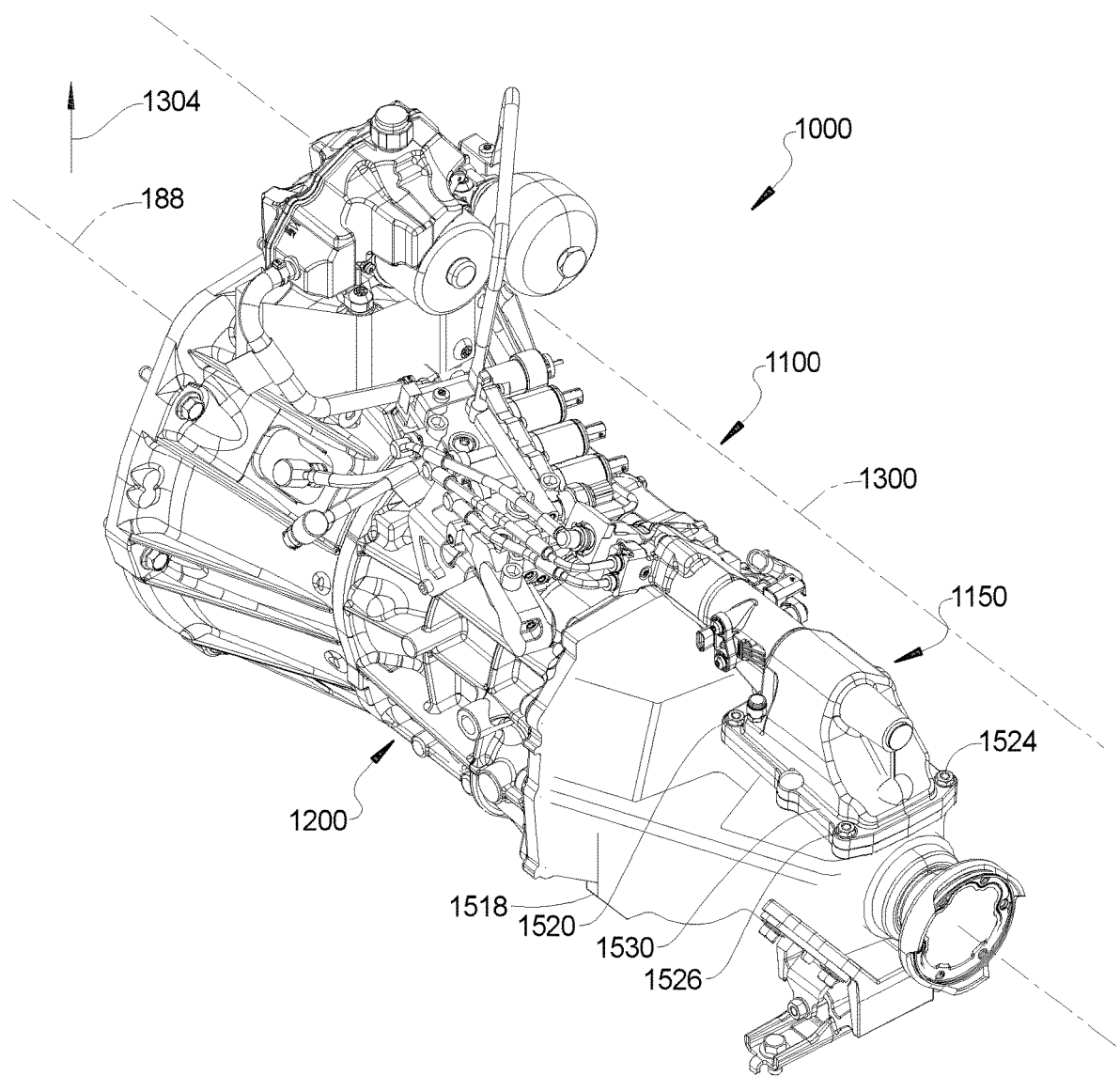
FIG. 32 is an assembled view of the shifting assembly and transmission.
Figure 33:
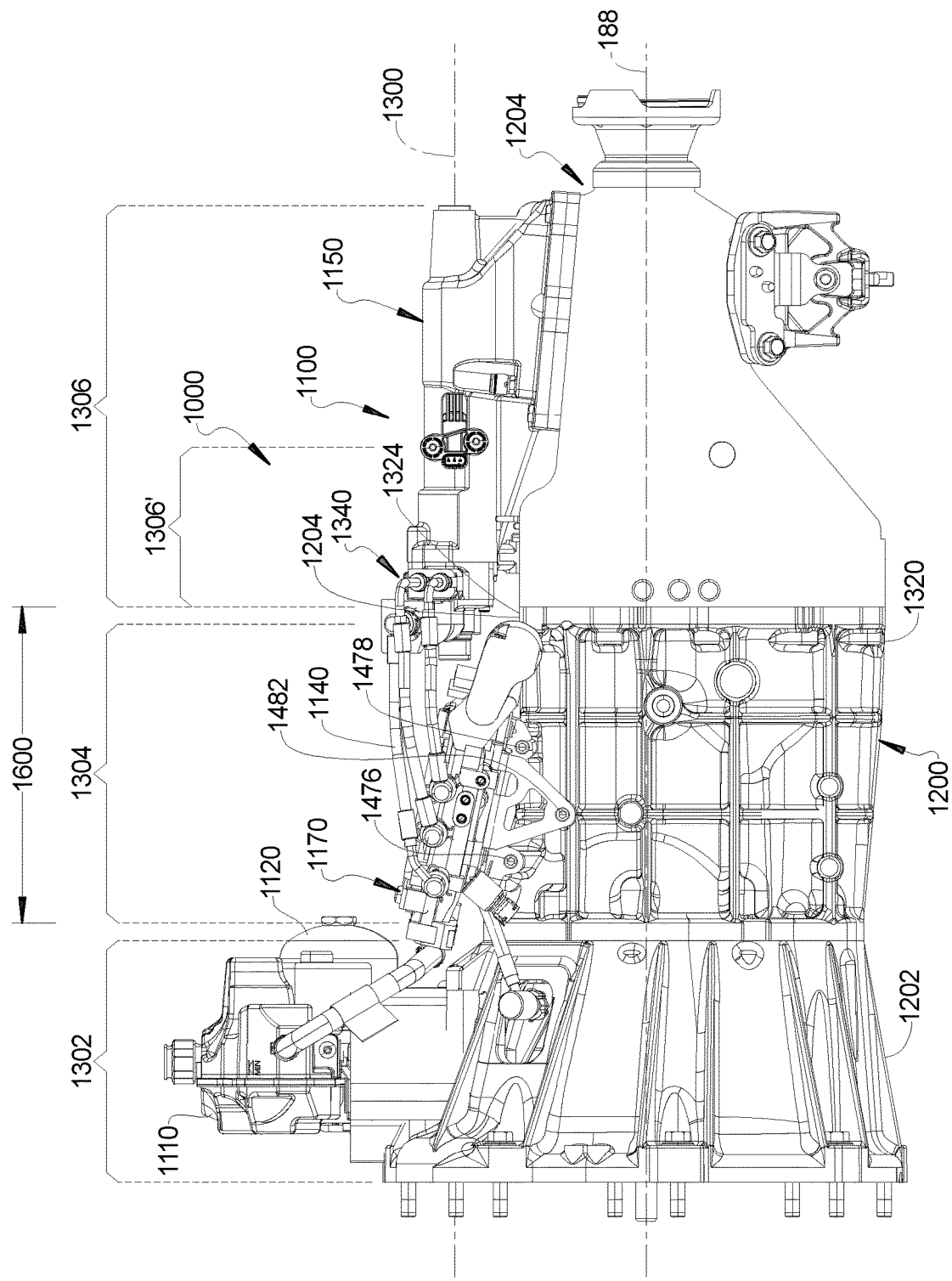
FIG. 33 is a side view of the assembled shifting assembly and the transmission.

With continuing reference to FIGS. 28 and 29 and additional reference to FIG. 32 and FIG. 33, the shifting assembly 1100 is mounted to the transmission housing 1200 along the axis 1300 from a forward or first portion 1302 near a bell housing portion 1202 toward the output or driveshaft connection portion 1204. In various embodiments, therefore, the bell housing 1202 is near the forward or front portion 32 of the vehicle while the drive shaft or drive output 1204 is near the rear 40 of the vehicle 30.

Further the transmission 1200 may generally have a bottom portion 1320 that is near the surface or drive or road surface 1080 and a top portion 1324 that is further away from the road or transportation surface 1080. Accordingly, the shifting assembly 1100 may include the reservoir 1110 at a position that is higher or further away from the bottom 1320 of the transmission assembly (and also closest to the road surface 180) than the shifting tower 1150. The road surface 180 is also generally understood to be the portion or surface nearest to the gravitational center (e.g. center of the earth). Thus, the reservoir 1110 may be the furthest from the surface 180 relative to the shifting tower 1150 of the shifting assembly 1100.

As illustrated in FIG. 33, the pump assembly 1120 may be below the reservoir 1110, but above the valve assembly 1130. The valve assembly may be mounted in a second or middle region 1304 of the transmission housing 1200. The valve assembly 1130 may be above and/or at least in line with the transmission or fluid lines 1140 and line connection 1340 with the shifting tower 1150. The connection of the lines 1140 to the shifting tower 1150 and/or the shifting tower 1150 may be connected to the transmission housing 1200 in a third or rear end region 1306', 1306, respectively. Accordingly the reservoir 1110 may be the highest point of the shifting assembly 1110, particularly after installation onto the transmission housing 1200.

The shifting assembly 1100 may include a hydraulic system that is powered by the pump 1120 to drive fluid to cause the shifting tower 1150 to shift gears within the transmission housing 1200. The valve assembly 1130 may open and close valves to operate the shifting tower 1150 and the shifting fluid or fluid within the shifting assembly 1100 may cause the shifting through the shifting tower 1150.

Accordingly, after installation of the shifting assembly 1100 onto the transmission housing 1200, or at any appropriate time, a selected filling and/or bleeding of the shifting assembly 1100 may occur. During a bleeding the removal of air from the shifting assembly 1100 may occur such that the shifting assembly 1100 is substantially only filled with a selected fluid (e.g. transmission fluid and/or breaking fluid). The fluid allows hydraulic forces to be applied to selected portions of the shifting tower 1150 due to the pump 1120 applying or forming pressure in the hydraulic system. Thus, the inclusion or incursion of gas into the shifting assembly 1100 may cause for a mis-operation or undesired operation of the shifting assembly 1100. The shifting assembly 1100, therefore, may be installed onto the transmission housing 1200, as illustrated in FIG. 33, so that the reservoir 1110 is the highest point of the system to allow for bleeding or gas removal from the shifting assembly 1100 to be performed efficiently. One skilled in the art will understand the removal of gas from the shifting assembly 1100 may be provided in an appropriate manner given the layouts of the shifting assembly 1100.

The shifting assembly 1100 may be mounted to the transmission housing 1200 in an appropriate manner. With continuing reference to FIGS. 28-33 and additional reference to FIG. 34, the shifting assembly 1100 may be connected to the transmission housing 1200 by various fixation positions and/or bracket assemblies. As discussed above, the shifting assembly 1100 is generally fixed to the transmission assembly 1200. Fixation of the shifting assembly 1100 to the transmission housing 1200 allows for maintaining close proximity of a shift tower 1150 and the gear mechanism within the transmission housing 1200. Further, positioning of the shifting assembly 1100 in contact and mounting it to the top 1204 of the transmission housing 1200, assists in maintaining a center of gravity of the vehicle 30 at a selected position, such as generally near the output 1204 of the transmission. The shifting assembly 1100, therefore, may generally be fixed to the transmission housing in a selected manner.

For example, the reservoir 1110 and the pump 1120 may be mounted to a forward or first bracket 1400 that may be mounted to the bell housing portion 1202 of the transmission housing 1200. The first bracket 1400 may be fastened to the bell housing 1202 with one or more fasteners, such as a first or forward fastener 1404, a second or left fastener 1408, a third or right fastener 1412, and a fourth or rearward fastener 1414. The fasteners 1404-1414 may be fastened into tapped bores that are molded into the bell housing 1202. It is understood that additional fasteners may also be provided to fix the bracket 1400 to the bell housing 1202 and the four fasteners 1404-1414 are merely exemplary.

Further the bracket 1400 may include a selected external parameter 1422 that may be shaped to receive substantially be congruent with a parameter of the reservoir 1110 and the pump assembly 1120. Thus, the bracket 1400 may include lobed or irregular portions, such as a forward lobe 1424 and a right lobe 1426 (through which the fasteners 1404, 1412 may pass). The bracket 1400 may include an upper surface 1432 that may include a selected contour to receive or nest with a portion of the reservoir 1110 and/or the pump assembly 1120. For example, the lobed portions 1424, 1426 may be raised relative to a central region or portion 1436 of the bracket 1400. Accordingly, the bracket 1400 may be fixed to the bell housing portion 1202 to allow for mounting and fixation of the reservoir 1110 and the pump assembly 1120 to the bell housing 1202.

The valve assembly 1130 may be mounted to the central region 1304 that may also be a gear housing 1460 of the transmission housing 1200. The central portion 1304 of the transmission housing may include one or more molded bores or projections, such as a first projection 1464, a second projection 1468 and a third projection 1472 that may receive selected fasteners. The bores 1464-1472 may receive respective fasteners 1476, 1478, and 1482 through selected bores in a bracket 1490. The bracket 1490 may be fixed to the central housing portion 1460.

The bracket 1490 may include an upper receiving or contacting section 1494 that may engage and/or be connected to the valve assembly 1130. Thus, the valve assembly 1130 may be fixed to the bracket 1490 which, in turn, is fixed to the central housing 1460 of the transmission housing 1200. In this way the valve assembly 1130 may also be fixed in close proximity to the transmission housing 1200 again to assist in maintaining the center of gravity of the vehicle 30 near the central line 188 and a selected center of gravity point or region, such as near the output 1204. The central housing 1460 may include the selected molded or cast projections or bore portions 1464-1472 to allow for fixation of the bracket 1490 thereto.

Figure 34:
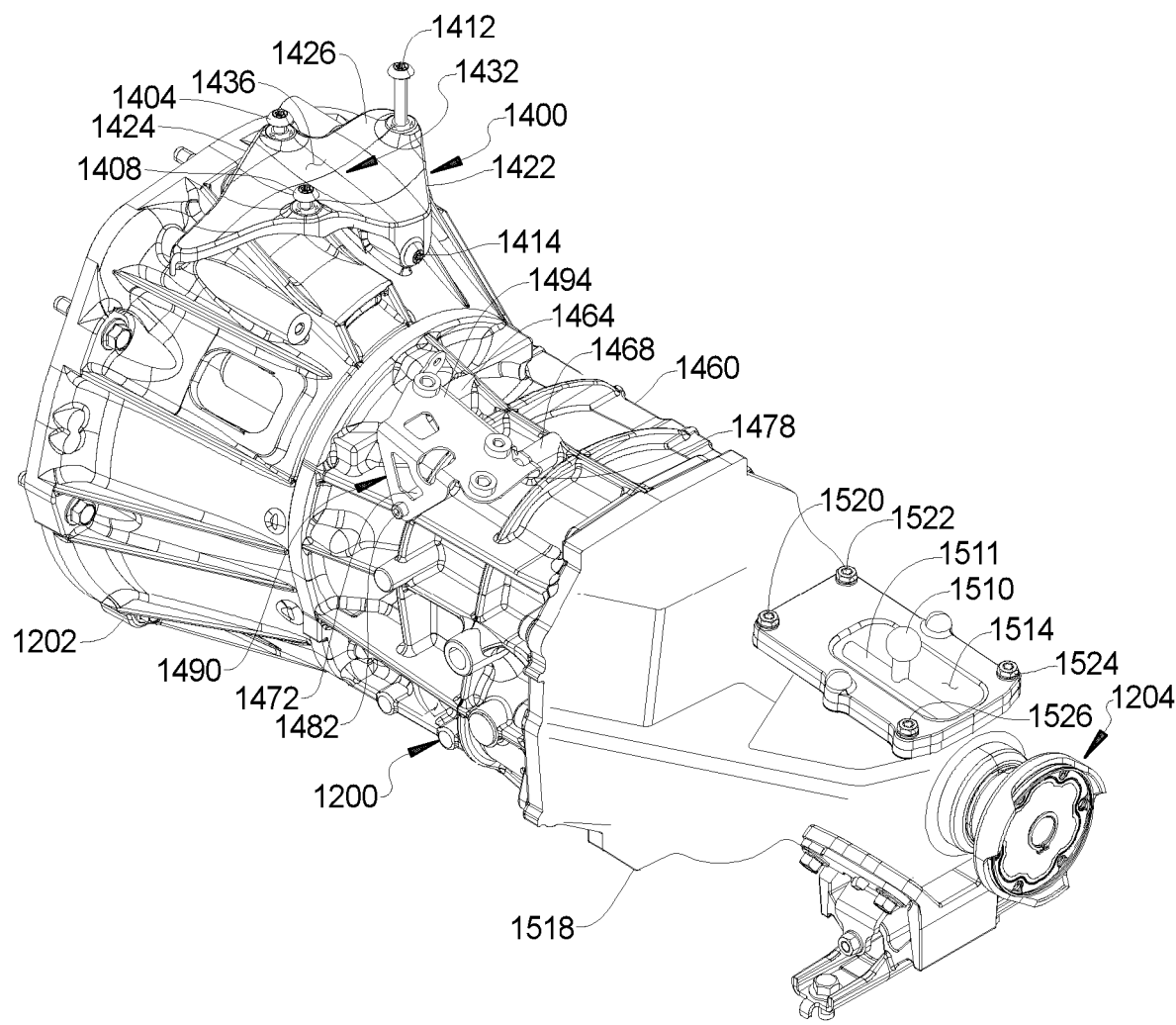
FIG. 34 is a perspective view of the transmission assembly.
Figure 35:
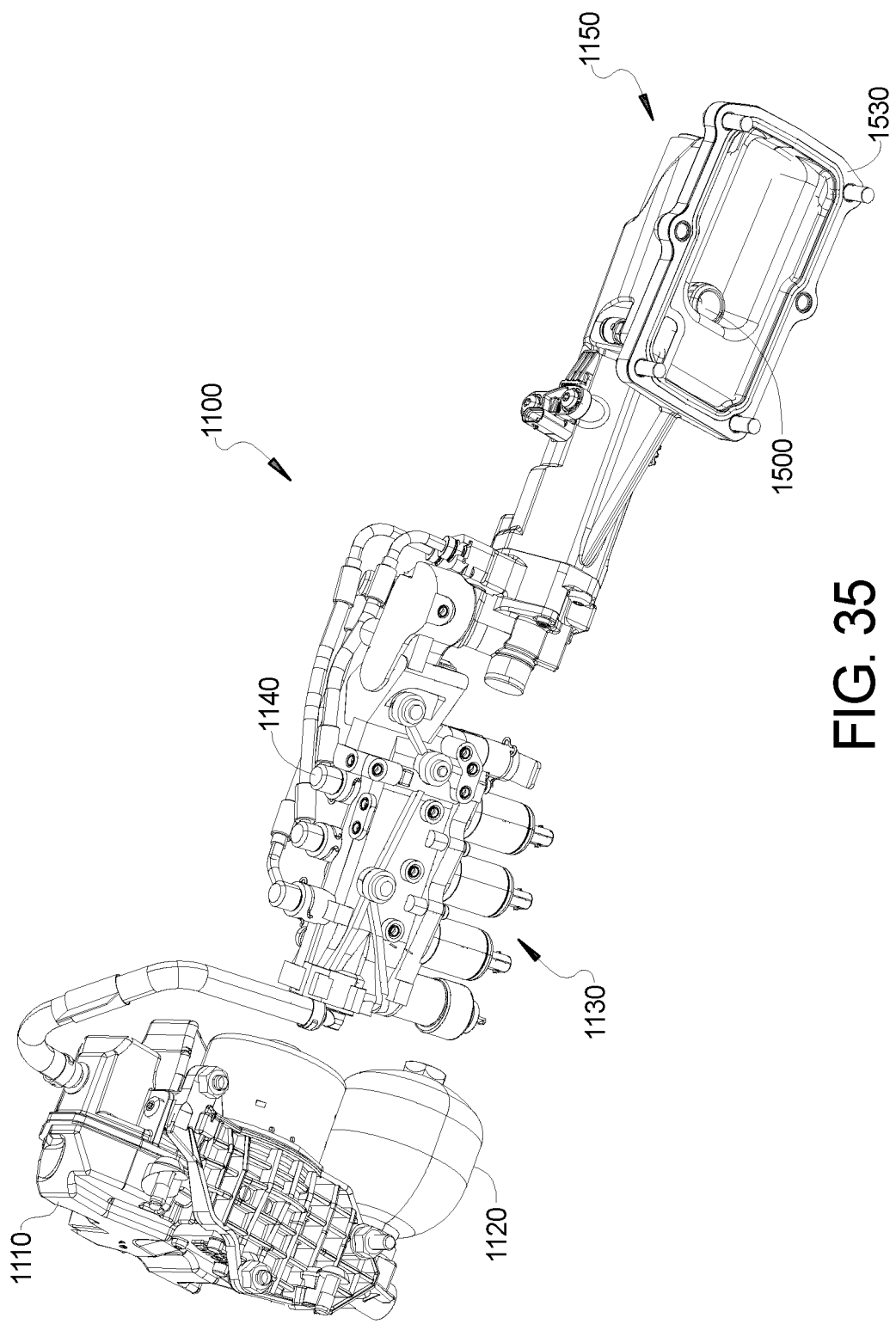
FIG. 35 is a bottom perspective view of the shifting assembly in a first state.

The shift tower 1150 may be mounted near the output 1204 in the third region 1306. The shift tower 1150 may include a selected connection, such as a ball connection member 1500, as illustrated in FIG. 35. The ball connection portion 1500 may engage a ball member 1510 within the transmission assembly 1000, as illustrated in FIG. 34, that extends from a shift shaft 1511. The shift tower, therefore, may be mounted relative to a passage 1514 through the transmission housing 1200, such as in an output housing 1518. The shift tower 1150 may be fixed to the output housing 1518 such as with one or more fasteners, including four fasteners 1520, 1522, 1524, and 1526 to mount a flange or external projection 1530 to the output housing 1518. The output housing 1518 may be cast or molded to include bores to receive fasteners, such as studs and/or bolts to fix the shifting tower 1150 to the output housing 1518 of the transmission housing 1200.

Accordingly, the shifting assembly 1100 may be fixed substantially adjacent to and/or directly to the transmission housing 1200. By fixing the shifting assembly 1100 directly to the transmission housing 1200 the transmission assembly 1000 may be provided as a selected unit for various purposes. The transmission unit 1000 may be fixed to the engine 510 at a selected time, such as immediately prior to instillation into the vehicle chassis frame 534. Further, the direct connection of the shifting assembly 1100 to the transmission housing 1200 may maintain a close proximity of the shifting components of the transmission gears within the transmission housing 1200. By fixing or mounting the shifting assembly 1100 to a top of the transmission housing 1200 the mass of the shifting assembly 1100 is aligned with the axis 188 of the vehicle 30 to maintain a center or central motion of the center of gravity of the vehicle 30. Also, the shifting assembly 1100 is also further near positioned near the ground or surface 180. Mounting the shifting assembly 1100 directly to the transmission housing 1200 may also maintain a low center of gravity of the vehicle 30, such as generally near the output 1204. Moreover, mounting the shifting assembly 1100 including the reservoir 1110 and the pump assembly 1120 substantially at the highest point relative to the lowest point of the shifting tower 1150 allows for an efficient bleeding (e.g. gas removal) from the shifting assembly 1100.

In addition to the various features of the shifting assembly 1100, as discussed above, the mounting of the shifting assembly 1100 to the transmission assembly housing 1200 allow for various features to be achieved. For example, the transmission housing assembly 1200 may be generally formed as one or a plurality of substantially ridged members (e.g. metal castings) that are then fixed together with selected fasteners or fastening features. Accordingly, the transmission casing 1200 is substantially rigid along its length. Accordingly the shifting assembly 1100, when rigidly mounted to the transmission housing 1200, is also generally fixed and spaced relative to all of the components of the shifting assembly 1100. Accordingly the hydraulic lines 1140 may be generally fixed relative to one another and will not flex between the valve assembly 1130 and the shifting assembly 1150 at the connection point 1340. The hydraulic lines 1140 may span the distance between the shifting assembly 1150 and the valve assembly 1130 but generally need not account for flexing between the components of the shifting assembly 1100. Further, mounting the shifting assembly 1100 directly to the transmission housing 1200 allows for close proximity of the components of the shifting assembly 1100 to be achieved. For example, the length of the hydraulic lines 1140 between the valve assembly 1130 and the connection of 1340 to the shifting assembly 1150 may be a selected distance 1600 such as generally about 1 cm to about 20 cm, and further including about 5 cm to about 10 cm. Accordingly the transmission lines may be substantially shortened to reduce weight, fluid volume, fluid movement, and the like. Additionally the reservoir 1110 relative to the valve body 1130 may also be reduced to allow for shortened transmission lines therein. Thus the shifting assembly 1100 may be substantially compact relative to the transmission housing 1200, such as extending a length or extent longer than a distance between the bell housing 1202 and the output 1204, as illustrated in FIG. 33.

Further fixing the shifting assembly 1100 directly to the transmission housing 1200 may allow for a minimization in length or size of various components of the shifting assembly 1100. For example, shifting forks or other shifting components from the shifting assembly of shifting tower 1150, such as a shifting finger within the transmission, as discussed herein, may be shortened relative to the transmission housing 1200 and the gears within the transmission assembly 1000. Further, the power necessary to power the shifting assembly 1100 may be minimized due to the compactness of the shifting assembly 1100. Thus the pump 1120 may be provided as a small pump to power the shift tower 1150 to shift the gears in the transmission assembly 1000.

Figure 36:
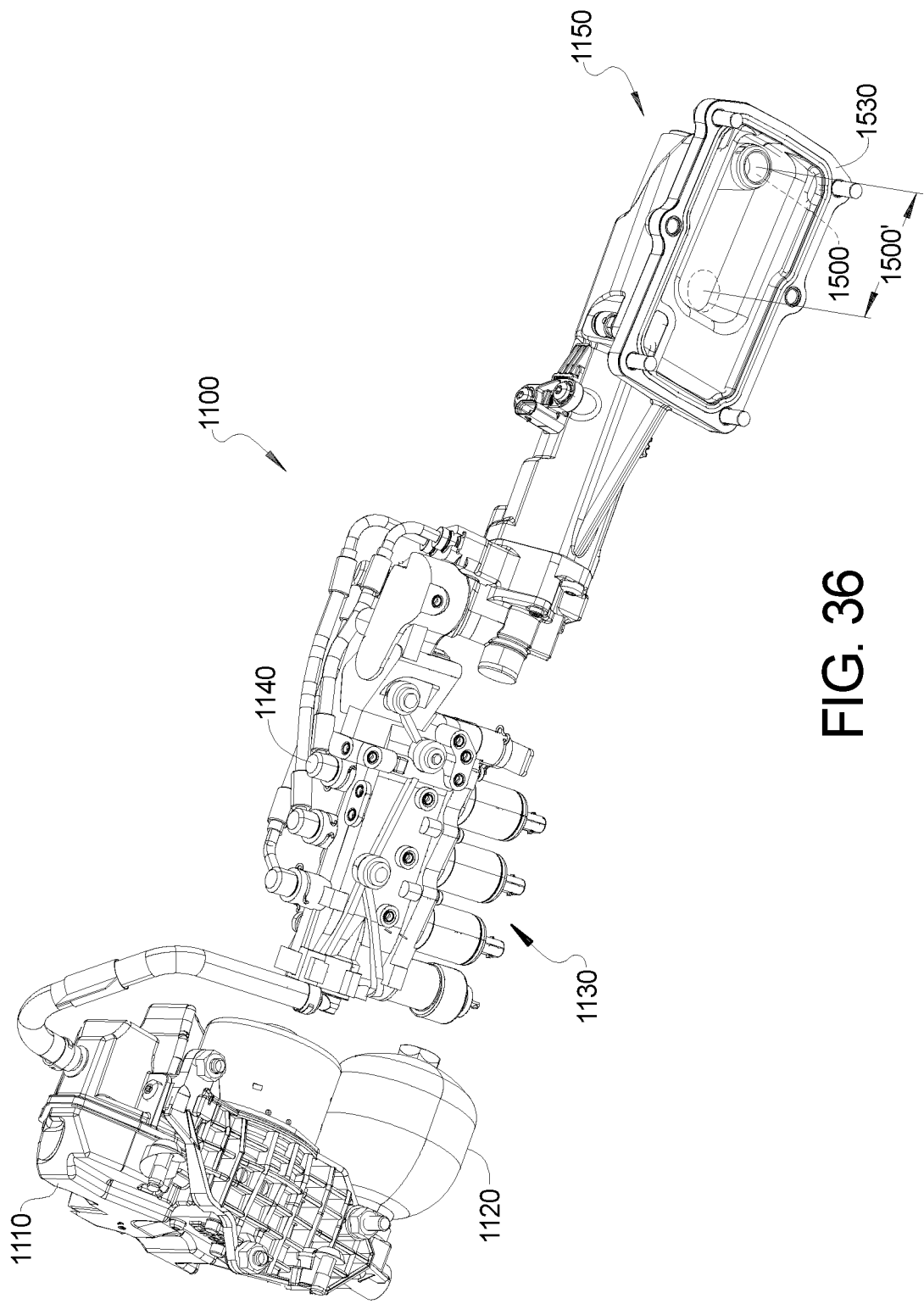
FIG. 36 is a bottom perspective view of the shifting assembly in a second state.
Figure 37:
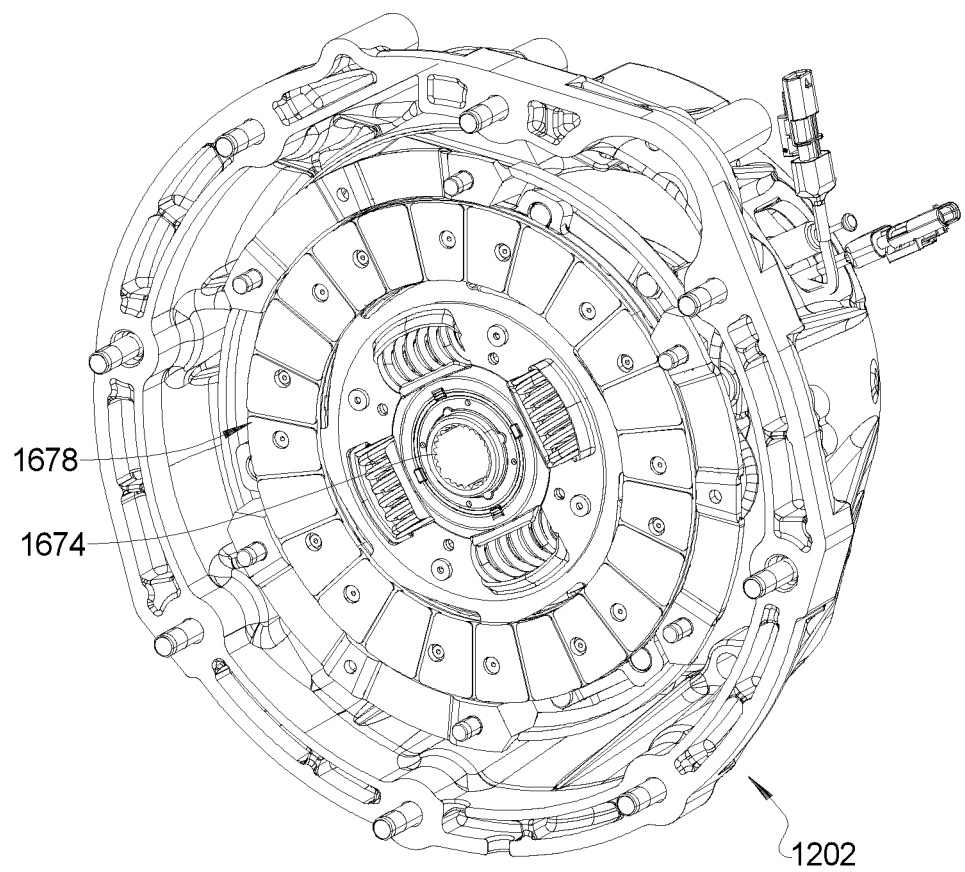
FIG. 37 is a detailed view of the transmission assembly and the clutch assembly.

Movement of the shifting portion, such as the socket 1500 may also be lessened or selected in light of the connection position relative to the transmission 1000. As illustrated in FIG. 35, the socket 1500 may be in a first or forward position. As illustrated in FIG. 36, the socket 1500 may be in a rearward position. The two positions may be a selected distance 1500' apart, such as about 15 mm to about 30 mm, including about 20 mm to about 22 mm.

With reference to FIGS. 37-40, the transmission assembly 1000 interacts with the engine 510 via an input shaft 1650 that is engaged by a clutch assembly 1670. The clutch assembly 1670 may include various components such as an input shaft engagement portion 1674 and various clutch plates and other elements of a clutch plate assembly 1678, as is generally understood by one skilled in the art. The clutch plate assembly 1678 may be engaged onto the input engaging shaft portion 1674.

The clutch plate assembly 1678 may be engaged by a clutch plate slave cylinder (CSC) 1690. The CSC 1690 may include various portions such as a cotch plate engaging member 1700 that may be moved relative to the input shaft 1650 and held in engagement with the clutch plate assembly 1678 with an internal spring or biasing member 1704. The CSC 1690 may further include a non-moving or fixed portion 1710 that is maintained at a fixed position relative to the transmission housing 1200, such as within the bell housing 1202. The biasing spring 1704 may be provided to assist in matining a minimale to selected contact of the moveable portion 1700 with the clutch assembly 1670 and/or other selected portions of the transmission assembly 1000. Accordingly, the movable portion or bushing 1700 may move relative to the input shaft 1650 to engage and disengage the clutch assembly 1678.

Generally, a force may be applied to the CSC assembly 1690, such as through a hydraulic input 1707. The force of the hydraulic pressure moves the moveable portion 1700 to apply a force to disengage the clutch assembly 1670 from the engine 510 to allow shifting gear ratios. Release or removal of the hydraulic pressure allows the clutch assembly to re-engage or engage the engine 510.

With continuing reference to FIGS. 37-40, a position sensor 1720 may be connected with the CSC 1690 to determine a position of the movable portion or bushing 1700, such as at or between the clutch engagement and disengagement positions. Further, as discussed herein, a drive or shifting mode may be selected to select a speed or force fo clutch engagement. The movable portion 1700 may include a first member or sliding portion 1722 that may be engaged within a sensing portion 1726 of the sensor 1720. The sensing portion 1726 may include a slot or rail 1728 to receive the moving portion 1722. As the moving portion 1722 moves within the rail 1728 of the sensor 1726, the sensor 1726 may output a signal via an output line 1732 regarding a position of the movable portion 1700. The output line 1732 may be connected to a selected portion, such as transmitting a position to the shifting assembly 1100 and/or the ECU assembly 844 regarding a position of the movable portion 1700. Thus the operation of the transmission assembly 1000, may include engagement and disengagement of the clutch assembly 1678 by the CSC 1690.

Figure 38:
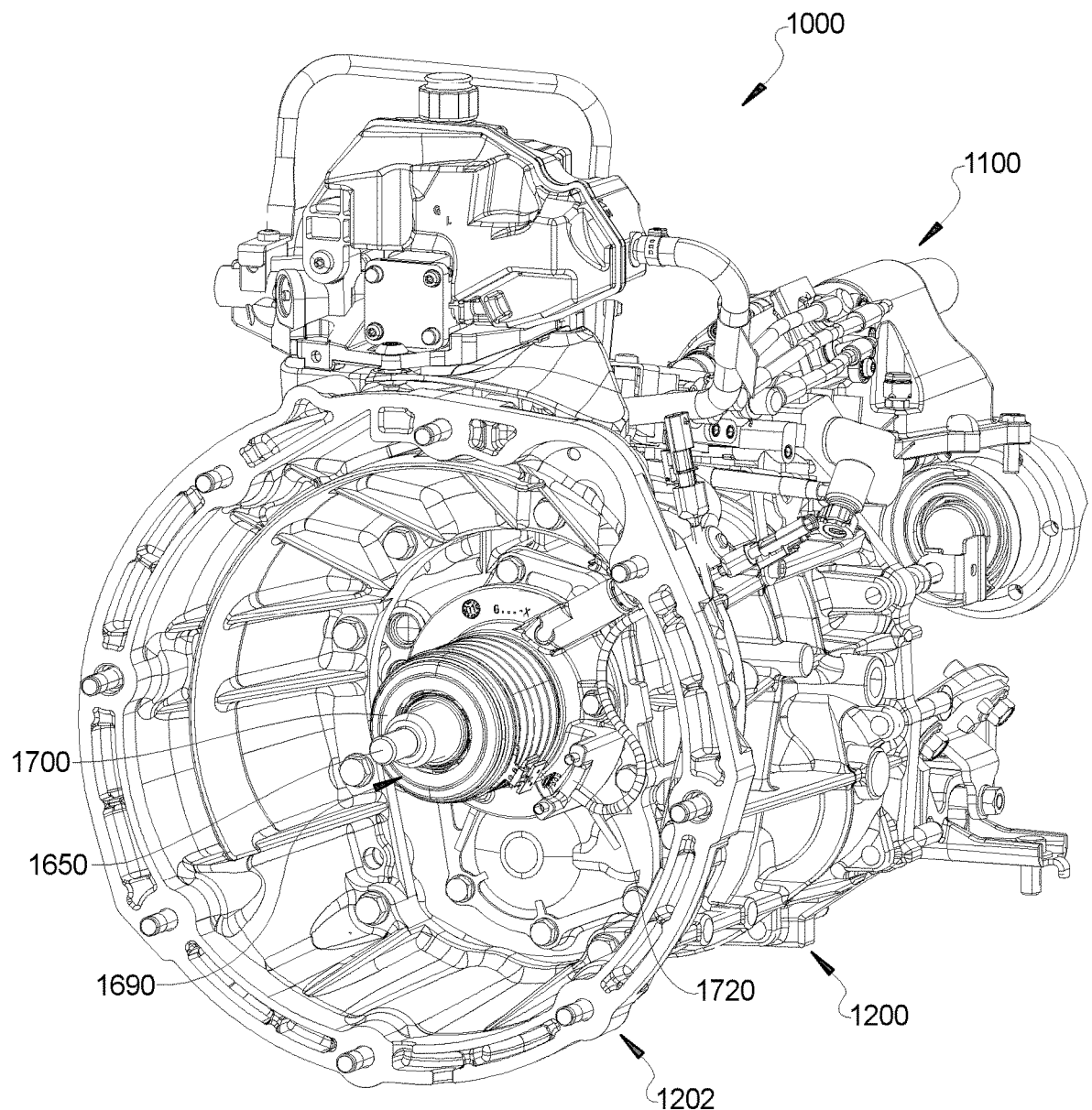
FIG. 38 is an assembled view of the transmission assembly and the shifting assembly and a clutch engagement assembly.
Figure 39:
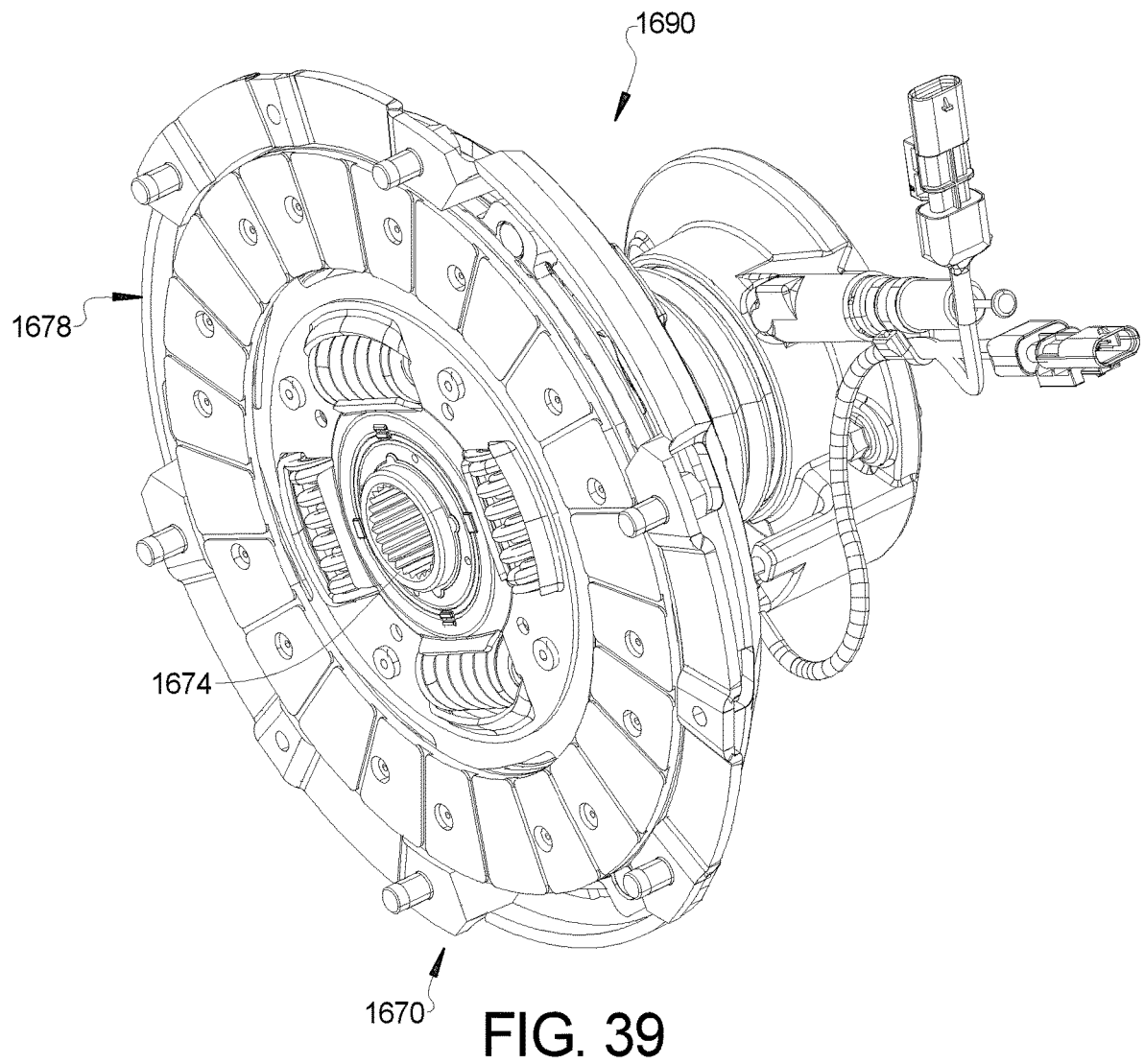
FIG. 39 is a detailed view of a clutch assembly and an engagement assembly.
Figure 40:
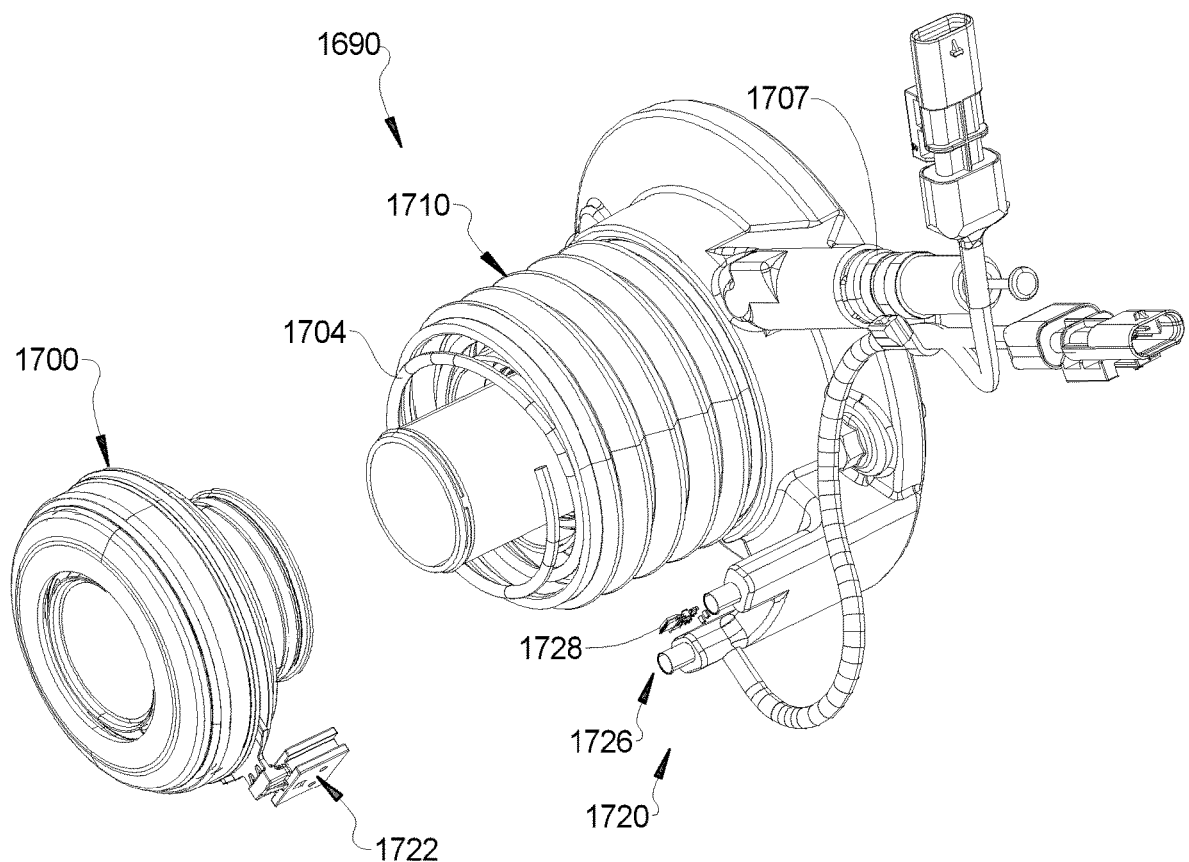
FIG. 40 is an exploded view of a clutch engagement assembly.

The CSC 1690 may be positioned about the input shaft 1650 within the bell housing 1202. The CSC 1690 may have the non-moving portion 1710 fixed within the bell housing 1202, as illustrated in FIG. 38. Therefore, engagement and disengagement of the clutch assembly may be concentric with the input shaft 1650 and provide a compact assembly.

Moreover, the position sensor 1720, also within the bell housing 1202, may be used to determine a position of the movable portion 1700 to determine engagement of the clutch assembly or clutch plate 1678. Thus, the shifting assembly 1100 may determine whether the clutch plate assembly 1678 is engaged or disengaged, or the amount of engagement (e.g. friction zone) during operation of the transmission assembly 1000.

As discussed above the shift assembly 1100 may allow for shifting between a plurality of gear ratios (also referred to as gears) in the transmission assembly 1000. The various gear selection may be performed by the shift tower moving the engagement portion or member 1500 to move or engage the shift shaft 1511. The shift shaft 1511 may include the ball 1510, as discussed above and illustrated in FIGS. 34 and 35.

A shift shaft assembly 1511*a*, schematically illustrated in FIGS. 41A-44, may move a shift finger 1800 that extends from the shift shaft assembly 1511*a* to engage one or more shaft ranks 1810. Generally, the shift shaft 1511 may be engaged by portions within the shift assembly 1100. The shift assembly 1100 may include a cam portion 1884, as discussed herein, that may allow for interation with the ball 1510. Movement of the ball 1510 may cause movement of the shift shaft 1511 within the transmission assembly 1000.

Movement of the shift finger 1800 may move one or more ranks of gear to select a gear ratio and/or direction. As discussed above, the operator of the vehicle 30 may select a selected transmission mode or gear selection, such as drive, reverse, or neutral, with the selector 70. Based on the selection, such as in response to a signal from the selector 70, and the shifting assembly 1100 may select the gear for operation of the transmission and movement of the vehicle 30 in a selected manner.

The shift finger 1800 may move between a plurality of gear ranks 1810, which may include a first gear rank or position 1812, a second gear rank 1814, a third gear rank 1816, and a fourth gear rank 1818. The various gear ranks may include a neutral or non-powered gear rank 1812, first and second gear in the second gear rank 1814, third and fourth gear in the third gear rank 1816, and fifth gear and reverse in the fourth gear rank 1818. It is understood that any appropriate number of gear ranks may be provided depending on the number of gears selected for the transmission 1000, and the five gears and reverse is merely exemplary.

The shift shaft 1511 may move in various directions, such as generally along an axis 1830 and is also able to generally rotate around the axis 1830, such as in the direction of 1832. The shift shaft 1511 may move in two directions along the axis 1830 and may also rotate in at least two directions around the axis 1830, as illustrated by the double headed arrow 1832. Movement of the shift shaft 1511 may be directed or cause, at least in part, by a directing or engagement pin or projection 1840 that may move along a groove or direction surface or path 1842 within a cam member 1844. The shift shaft 1511 may be moved by movement of portions within the shift assembly 1100 that are moved by the cam 1844 and/or the pin 1840. The shift shaft assembly 1511*a*, as illustrated in FIGS. 41A-41C are understood to be schematic of the assembly within the transmission assembly 1000, by one skilled in the art.

The pin 1840 may also be referred to as a follower pin that follows the path 1842. The path 1842 may be formed in a cam member 1844. The groove 1842, which may also be referred to as a cam groove may have a first section 1850, and a second section 1852 that both extend along respective axis 1850*a* and 1852*a*. The axis 1850*a*, 1852*a* may be offset from one another by a selected distance. A transition section 1856 may extend along a third axis 1856*a* that is at an angle to both of the first axis 1850*a*, 1852*a*.

The shifting assembly further includes a cam break or fixing assembly 1860 that may include one or more fingers or breaks that engage the cam 1844 to hold the cam 1844 in a selected position. As illustrated in FIG. 41A, during movement of the shift shaft assembly 1511*a*, which may include the shift shaft 1511, the follower pin or pin 1844 may move within the cam grove 1842 and cause the cam 1844 to also rotate around the axis 1830, such in the direction of the double headed arrow 1832. With reference to FIG. 41B, however, the cam break 1860 may engage the cam member 1844 such that the follower pin 1840, during movement of the shift shaft 1511 may not rotate the cam member 1844. When the cam member 1844 is locked or fixed in a selected rotational position with the breaks 1860, a portion of the shift shaft assembly 1511*a* may rotate around the axis 1830, such as generally in the direction of the double headed arrow 1832. Accordingly, either the cam member 1844 may rotate and/or the portion of the shift shaft assembly 1511*a* may rotate depending upon the engagement or disengagement of the cam break 1860 relative to the cam member 1844.

This assembly allows the shift finger 1800 to move between the different ranks 1810 of gears based upon movement of the shift shaft 1511 and engagement or disengagement of the cam member 1844. The cam member 1844 engaging or not engaging the portion of shift shaft assembly 1511*a* may rotate or move the shift finger 1800 relative to the gear ranks 1810 when movement of the follower pin 1840 in the cam groove 1842.

With continuing reference to FIGS. 41A-41C, the shift finger 1800 may move between the different gear ranks 1810 in a selected sequence. With initial reference to FIG. 41A when the cam 1844 is not engaged by the cam breaks 1860, the follower 1840 may move or rotate the cam member 1844 to a selected position, as illustrated in FIG. 41A. As the follower 1840 moves in the direction of arrow 1870 along the axis 1830, the cam member 1844 will rotate around the axis 1830 due to its free rotation as it is not engaged by the cam breaks 1860. Thus, the gear rank 1816 may be moved along the axis 1830 and/or parallel thereto.

At a selected time, however, the cam member 1844 may be locked or fixed with the cam breaks 1860. The portion of the shift shaft assembly 1511*a*, therefore, when moved in a direction of arrow 1874 may rotate or move in the direction of arrow 1876 to move or translate the shift finger 1800 from the third rank 1816 to the fourth rank 1818, as illustrated in FIG. 41B. As the portion of the shift shaft assembly 1511*a* moves in the direction of 1874 the follower pin 1840 moves along the cam groove 1842 from the first section 1850 to the second section 1852. Thus, the shift finger 1800 moves from the third gear rank to the first gear rank. The selected gear in the gear rank may be determined or achieved by movement of the shift shaft along the axis 1830 in the selected position, as illustrated in FIG. 41B.

As illustrated in FIG. 41C, the portion of the shift shaft assembly 1511*a* may move along the axis 1830 to move the cam member 1844 when the cam breaks 1860 are disengaged. As illustrated in FIG. 41C, the shift finger 1800 may move between the gear ranks when the gear ranks are positioned in a neutral position. To achieve movement between the gear ranks, such as in a direction at an angle relative to the axis 1830, the shift finger 1800 must disengage from a gear rank, at least for movement thereof.

The shift finger 1800 may include a dimension 1880 between two edges of about 6 mm to about 8 mm, and further including about 7.4 mm to about 7.9 mm, and further including about 7.7 mm plus or minus 0.1 mm. The shift finger 1800 may move within a shifting or selector gate area 1890 that has a dimension 1892 of about 8 mm to about 12 mm, and further including a dimension of about 10 mm to about 11 mm. The shift finger 1800 may have a clearance dimension 1896, relative to engaging movement of the selected ranks or the gears 1810, of about 1 mm to about 4 mm, further including about 2 mm to about 3 mm, and further including about 2.6 mm with a tolerance of about 0.2 mm.

The achievement of the clearance may be done by providing a distance 1900 between neutral detent peaks 1904 and 1906 formed on the shift rank shafts, as illustrated in FIG. 44. The neutral detent distance 1900 may be about 2 mm to about 11 mm, and further including a distance of about 3 mm to about 9 mm, and further including bout 4 mm to about 9 mm. The shift rank shafts further includes selector or engagement surfaces or portions such as a first engagement or selector surface 1920 and a second selector or engagement surface 1924.

Accordingly, the movement between the ranks of gears may occur between the neutral detent peaks 1904, 1906 in the neutral detent distance or space 1900 to ensure the shift finger 1800 may move between the gear ranks during movement of the shift shaft assembly 1511*a* through the cam member 1844. Thus, the clearance may allow for movement of the shift finger 1800 freely between the gear selector ranks 1810 in an efficient manner.

In addition to the AMT system 1100, the AMT system 1100 may be programmed to operate and/or shift the transmission according to selected or different drive modes. In various embodiments, the ECU assembly 844 may include one or more processors and/or one or more memory systems. The processors may include general purpose processors that execute instructions and/or specific built processors to execute instructions based upon selected inputs. In addition, the shift assembly 1100 may include a dedicated or selected modules such as processor and/or memory.

The processors may receive instructions, such as from the operator of the vehicle 30, to operate the shifting of the vehicle 30 in different or alternative manners. In various embodiments, for example, with reference to FIG. 45, a drive mode selection and/or method 2000 is illustrated. The drive mode selection 2000 may begin in a start block 2010. The start block 2010 may include initiating operation of the vehicle 30, starting selection of a drive mode, or other appropriate start portion. It is understood that the vehicle 30 may include the display 58 that may include soft buttons and/or the hard buttons 64 for selection of various features. Accordingly, the selection of a drive mode may be made with any appropriate input by the operator of the vehicle 30.

The method 2000 may include receiving a drive mode selection in block 2020. The receiving of a selection of a drive mode may include the receiving of any appropriate selection of a drive mode, such as a sport mode and/or comfort mode. It is understood, however, that any appropriate number of drive modes may be determined and the indication of a sport mode and comfort mode as two separate and distinct modes is merely optional. Nevertheless, in various embodiments, the operator may select either a comfort mode or a sport mode.

After the user selects the drive mode, the drive mode selection may be received in block 2020 by a selected processor system, as discussed above. Accordingly, a processor may then recall parameters for the selected drive mode in block 2030. Selection of recalled parameters in block 2030 may include selection of shift points or shift features for various parameters such as engine speed, throttle position, pedal position, wheel or vehicle speed, shift speed, and rate of clutch engagement. The vehicle 30 may include various sensors that transmit information to the ECU assembly 844 such as engine speed, throttle position, pedal position and wheel or vehicle speed.

The information may be received by the processor for the shift assembly 1100 to select various shift points, speeds of shifts, rate of clutch engagement, and other features. Accordingly, the recalled parameters for shift speed and rate of clutch engagement may be based upon the selected drive mode that is received in block 2020. For example, the rate of shift speed may differ between a sport mode and a comfort mode to alter the speed of change between gears (e.g. between first gear and second gear). In various embodiments, for example, sport mode may include a faster shift between selected gears. Further, selected modes may include different parameters, such as a greater engine speed, for a sport mode, before shifting between gears. Accordingly, parameters recalled in block 2030 may be based upon the mode received in block 2020.

The parameters may then be sensed or received in block 2040. As discussed above various sensors may be provided in the vehicle 30 to sense various parameters of the vehicle such as wheel speed, such as of the rear wheel 38, engine speed, and the like. Thus the parameters sensed in block 2040 may be compared to the recalled parameters from block 2030.

The comparison of the sensed parameters in block 2040 to a recalled parameters in block 2030 may cause the AMT system 1100 to receive a signal of a signal for a shift or change of gear per the recalled parameters of the received drive mode selection in block 2050. For example, the recalled parameters may include a shift speed based upon a selected engine speed and throttle position in block 2030. Once the sensed parameters match or are within a selected threshold of the recalled parameters, in block 2040, a transmission signal to shift gears may be made in block 2050. The transmission of the signal in block 2050 may include a selected gear for shifting or shifting into. Thus, the transmission of the signal may be made to transmit a signal to cause the shifting assembly 1100 to shift to a selected gear or an alternate gear based upon the signal transmitted in block 2050.

After transmitting the signal in block 2050, the method 2000 may proceed to a decision block in block 2060. The decision block 2060 may be to determine whether the vehicle or engine is being operated. If the vehicle or engine is being operated (e.g. the engine is still on and/or the vehicle 30 is still on), a YES path 2070 may be followed. The YES path 2070 may return to the received drive mode selection in block 2020 to ensure the drive mode is constantly updated in the method 2000. For example, during operation of the vehicle 30, the operator may select to change the drive mode from time to time. Accordingly the method 2000 may be operated to ensure that the drive mode selected by the user is the current drive mode being used to operate the vehicle 30.

If the decision block 2060 determines that the vehicle or engine is stopped or not being operated a NO path 2080 may be followed. If the NO path 2080 is followed the method may end in block 2090. The ending in block 2090 may include resetting the system, turning off the method, or ceasing operation for a selected period of time. For example, the method 2000 may be initiating during a startup of the vehicle and/or an initial selection by the operator of the vehicle 30.

Accordingly, the vehicle 30 may be driven by a user in a substantially automatic manner. The operator or user of the vehicle 30 may select a selected gear or drive selection with the selection panel 70, such as to select a forward drive mode. The operator of the vehicle 30 may also select a selected drive mode, such as a sport or comfort drive mode, for operation of the engine 500 and the transmission assembly 1000. The operator of the vehicle 30, however, may select only to have a forward drive selected and the gear selection system 1100 may select and appropriate gear based upon selected parameters, including those discussed above in the method 2000. The gear selection system 1100 may be used to operate the vehicle 30 in an appropriate or selected manner, such as one selected by the operator of the vehicle 30.

The automatic gear selector 1100 may allow an operator to operate or drive the vehicle 30 without manually selecting gears in the transmission assembly 1000. Thus the gear selector 1100 may be used to select gears for operation of the vehicle 30 during driving and operation of the vehicle 30. The user or operator of the vehicle 30, therefore, need not manually select gears and/or continuously monitor or determine various vehicle parameters such as engine speed, road speed, or the like for a selected operation of the vehicle 30.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit or processor for purposes of clarity, it should be understood that the techniques of this disclosure may be performed by a combination of units or modules associated with, for example, a medical device or vehicle.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A wheeled vehicle, comprising:
   an engine;
   a transmission having a transmission housing coupled to the engine and configured to allow transfer of power from the engine to a drive wheel;
   a plurality of gears housed within the transmission housing to allow for a changing of an input speed from the engine and an output speed to the drive wheel;
   an automatic shifting mechanism configured to selectively change a connection between an input shaft and an output shaft by changing between at least a first gear of the plurality of gears and a second gear of the plurality of gears; and
   a user input system configured to select a drive selection from a user;
   wherein the automatic shifting mechanism is mounted to the transmission housing.

2. The wheeled vehicle of claim 1, further comprising:
   a total of not more than three wheels and only a single driven wheel.

3. The wheeled vehicle of claim 2, further comprising:
   a chassis;
   wherein the wheels are configured to be driven on a surface;
   wherein the transmission housing includes a first region that is further from the surface than a second region when assembled within the chassis.

4. The wheeled vehicle of claim 1, wherein the automatic shifting mechanism includes a shifting tower;
   wherein the shifting tower is connected to an exterior portion of the transmission housing;
   wherein the shifting tower includes a portion operable to move at least a selected one of the plurality of gears.

5. The wheeled vehicle of claim 4, wherein the automatic shifting mechanism includes at least a fluid reservoir and a shifting tower;
   wherein the fluid reservoir is mounted at the first region and the shifting tower is mounted at the second region.

6. The wheeled vehicle of claim 5, wherein the transmission housing further includes a third region between the first region and the second region, wherein the third region is closer to the surface than the first region and further from the surface than the second region;
   wherein the automatic shifting mechanism further includes a valve body;
   wherein the valve body is mounted to the transmission housing at the third region.

7. The wheeled vehicle of claim 1, wherein the center of gravity of the wheeled vehicle is adjacent or within the output shaft of the transmission.

8. The wheeled vehicle of claim 1, wherein the transmission further includes:
   a shift shaft;
   a finger extending from the shift shaft;

a cam member defining a cam surface extending through the cam member;
wherein the cam member is rotatably mounted on the shift shaft;
wherein the shift shaft includes a neutral detent configured to allow the shift finger to move between ranks of gears of the plurality of gears.

9. The wheeled vehicle of claim 1, wherein the transmission housing is substantially rigid and the automatic shifting mechanism is rigidly mounted to the transmission housing to substantially eliminate movement of the automatic shifting mechanism.

10. The wheeled vehicle of claim 9 wherein the transmission housing is substantially rigid and the automatic shifting mechanism is rigidly mounted to the transmission housing to substantially eliminate flexing of hydraulic lines of the automatic shifting mechanism.

11. The wheeled vehicle of claim 1, further comprising:
a processor system operable to receive a user input from the user input system;
wherein the processor system is operable to execute instructions to control the automatic shifting mechanism to select between at least a first gear ratio and a second gear ratio based on the user input.

12. The wheeled vehicle of claim 1, further comprising:
a total of three wheels and only a single driven wheel;
wherein the user input system comprises at least one switch component connected to a steering wheel.

\* \* \* \* \*

UNITED STATES PATENT AND TRADEMARK OFFICE
CERTIFICATE OF CORRECTION

| | | |
|---|---|---|
| PATENT NO. | : 11,834,125 B2 | |
| APPLICATION NO. | : 17/128837 | |
| DATED | : December 5, 2023 | |
| INVENTOR(S) | : Jenika Bishop et al. | |

It is certified that error appears in the above-identified patent and that said Letters Patent is hereby corrected as shown below:

On the Title Page

Item (72) Please add Inventors:
Michael J. Whiting, North Branch, MN

Signed and Sealed this
Sixteenth Day of July, 2024

*Katherine Kelly Vidal*

Katherine Kelly Vidal
*Director of the United States Patent and Trademark Office*